United States Patent
Kamei et al.

(10) Patent No.: US 6,615,291 B1
(45) Date of Patent: Sep. 2, 2003

(54) DMA CONTROLLER WITH DYNAMICALLY VARIABLE ACCESS PRIORITY

(75) Inventors: Nobuo Kamei, Toyokawa (JP); Kenichi Morita, Toyohashi (JP); Takeshi Minami, Toyokawa (JP); Kazunori Shionoya, Toyohashi (JP); Munehiro Nakatani, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/521,196

(22) Filed: Mar. 7, 2000

(30) Foreign Application Priority Data

| Mar. 8, 1999 | (JP) | 11-060441 |
| Mar. 11, 1999 | (JP) | 11-064388 |
| Mar. 12, 1999 | (JP) | 11-066451 |
| Mar. 18, 1999 | (JP) | 11-073181 |
| Mar. 25, 1999 | (JP) | 11-081218 |
| Mar. 29, 1999 | (JP) | 11-085210 |
| Dec. 16, 1999 | (JP) | 11-357320 |

(51) Int. Cl.[7] ............................................. G06F 13/28
(52) U.S. Cl. ........................ 710/22; 710/33; 710/52; 711/105
(58) Field of Search ........................ 710/1, 15, 20, 710/22, 23–28, 52, 64, 107, 111, 114, 121, 123, 244, 33, 36; 712/225; 711/105, 111–112

(56) References Cited

U.S. PATENT DOCUMENTS

| 5,428,553 A | * | 6/1995 | Chiba et al. | 711/165 |
| 5,450,551 A | * | 9/1995 | Amini et al. | 710/119 |
| 5,450,591 A | | 9/1995 | Palmer | |
| 5,754,803 A | * | 5/1998 | Regis | 395/299 |
| 5,765,023 A | * | 6/1998 | Leger et al. | 710/22 |
| 5,787,264 A | * | 7/1998 | Christiansen et al. | |
| 5,983,302 A | * | 11/1999 | Christiansen et al. | 710/13 |
| 6,128,676 A | * | 10/2000 | Ohkubo | 710/28 |
| 6,405,272 B1 | * | 6/2002 | Regis | 710/121 |

FOREIGN PATENT DOCUMENTS

| JP | 05035653 | 2/1993 |
| JP | 07036821 | 2/1995 |

* cited by examiner

Primary Examiner—Jeffrey Gaffin
Assistant Examiner—Rijue Mai
(74) Attorney, Agent, or Firm—Burns, Doane, Swecker & Mathis, LLP

(57) ABSTRACT

A bus monitor section 8 calculates bus-occupancy rate for each of the DMA control sections 1 to 3 connected to a bus 5 in accordance with bus-use permission signals ack1 to ack3, respectively. Furthermore, a bus-use reconcilement section 6 changes manners of bus-use reconcilement control when the sum of a plurality of bus-occupancy rate exceeds "50", a predetermined threshold. Thereby, this method avoids occurrences such that a specific device occupies the bus 5 or vice versa, a specific device cannot get access to the bus 5.

25 Claims, 48 Drawing Sheets

FIG. 8

| ADDRESS | CONTROL SECTION | REGIOANL SIGNAL |
|---|---|---|
| 0000000h - 0FFFFFFh | DMA CONTROL SECTION (PRINTER) | R1 |
| 1000000h - 1FFFFFFh | DMA CONTROL SECTION (SCANNER) | R2 |
| 2000000h - 2FFFFFFh | DMA CONTROL SECTION (HARD DISK) | R3 |
| 3000000h - 3FFFFFFh | ACCESS CONTROL SECTION (CPU) | — |

| PRIORITY | FIRST TABLE T1 | SECOND TABLE T2 |
|---|---|---|
| 1 | DMA CONTROL SECTION (PRINTER) | DMA CONTROL SECTION (PRINTER) |
| 2 | DMA CONTROL SECTION (SCANNER) | DMA CONTROL SECTION (SCANNER) |
| 3 | DMA CONTROL SECTION (HARD DISK) | ACCESS CONTROL SECTION (CPU) |
| 4 | ACCESS CONTROL SECTION (CPU) | DMA CONTROL SECTION (HARD DISK) |

FIG. 20

| COMBINATION OF DMA | TABLE |
|---|---|
| PRINTER AND SCANNER IN OPERATION | SECOND PRIORITY TABLE Tr2 |
| PRINTER IN OPERATION | SECOND PRIORITY TABLE Tr2 |
| SCANNER IN OPERATION | FIRST PRIORITY TABLE Tr1 |
| ANY COMBINATIONS OTHER THAN THE ABOVE | FIRST PRIORITY TABLE Tr1 |

Tcr

FIG. 21

| PRIORITY | FIRST PRIORITY TABLE Tr1 | SECOND PRIORITY TABLE Tr2 |
|---|---|---|
| 1 | DMA CONTROL SECTION(PRINTER) | DMA CONTROL SECTION(PRINTER) |
| 2 | DMA CONTROL SECTION(SCANNER) | DMA CONTROL SECTION(SCANNER) |
| 3 | DMA CONTROL SECTION(HARD DISK) | ACCESS CONTROL SECTION(CPU) |
| 4 | ACCESS CONTROL SECTION(CPU) | DMA CONTROL SECTION(HARD DISK) |

FIG. 24

| COMBINATION OF DMA | TABLE |
|---|---|
| PRINTER AND SCANNER IN OPERATION | SECOND ACCESS INTERVAL TABLE Ta2 |
| PRINTER IN OPERATION | SECOND ACCESS INTERVAL TABLE Ta2 |
| SCANNER IN OPERATION | FIRST ACCESS INTERVAL TABLE Ta1 |
| ANY COMBINATIONS OTHER THAN THE ABOVE | FIRST ACCESS INTERVAL TABLE Ta1 |

Tca

FIG. 25

| BUS-USE REQUEST CHANNEL | FIRST ACCESS INTERVAL TABLE Ta1 | SECOND ACCESS INTERVAL TABLE Ta2 |
|---|---|---|
| PRINTER OUTPUT | 2000 nsec | 2000 nsec |
| SCANNER INPUT | 3000 nsec | 3000 nsec |
| HARD DISK OUTPUT | 5000 nsec | 50000 nsec |
| CPU ACCESS | 0 nsec | 0 nsec |

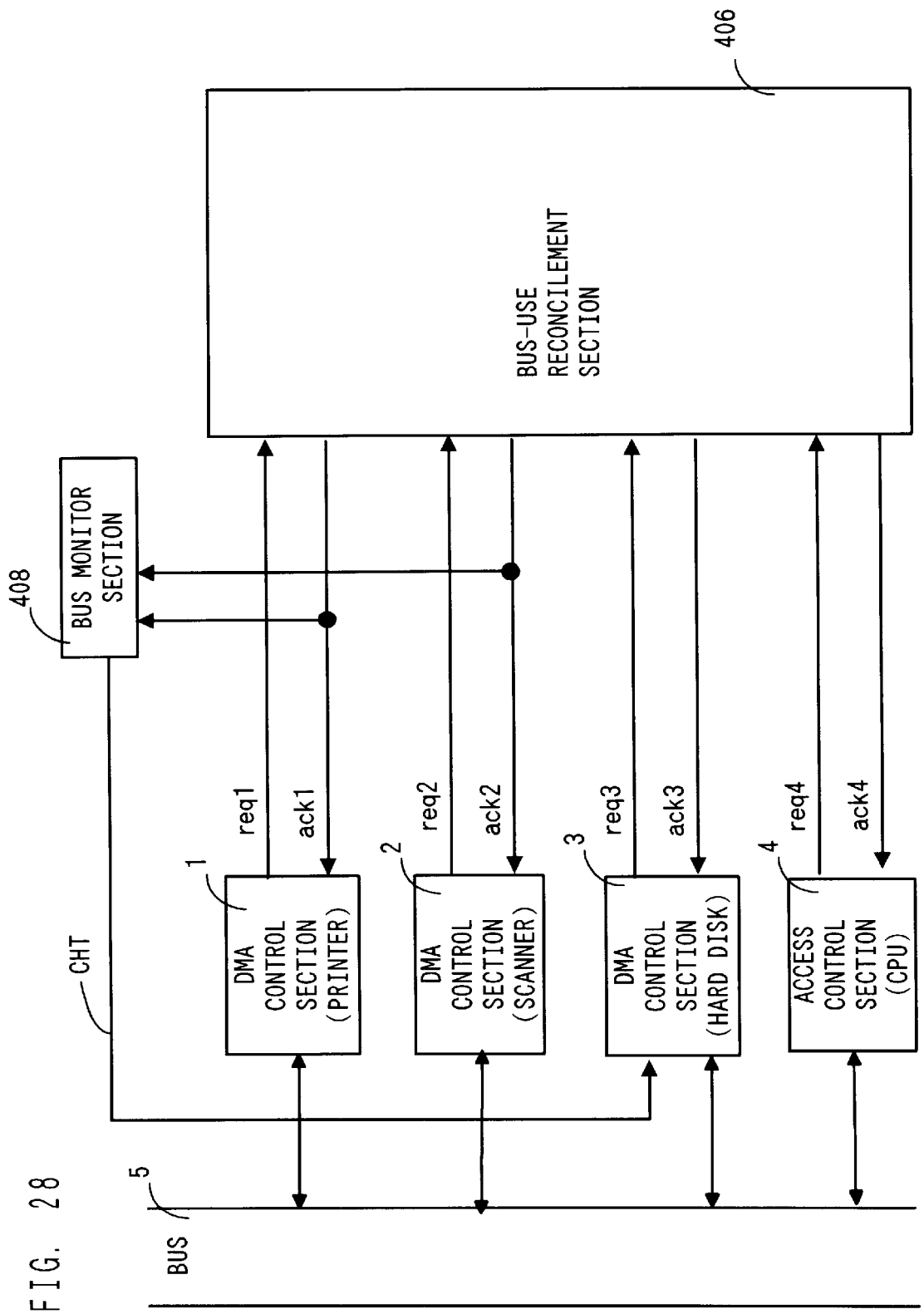
F I G. 28

FIG. 40

Table Tm

| BS | ACTIVE | INACTIVE | INACTIVE | INACTIVE | INACTIVE | INACTIVE | INACTIVE | INACTIVE | INACTIVE |
|---|---|---|---|---|---|---|---|---|---|
| ac1 | NOT-RELATIVE | INACTIVE | INACTIVE | INACTIVE | ACTIVE | INACTIVE | INACTIVE | ACTIVE | ACTIVE |
| ac2 | NOT-RELATIVE | INACTIVE | ACTIVE | INACTIVE | INACTIVE | INACTIVE | ACTIVE | INACTIVE | ACTIVE |
| ac3 | NOT-RELATIVE | INACTIVE | INACTIVE | INACTIVE | INACTIVE | ACTIVE | ACTIVE | ACTIVE | ACTIVE |
| MEMORY BLOCK 71 | NORMAL | POWER-DOWN | POWER-DOWN | POWER-DOWN | POWER-DOWN | POWER-DOWN | POWER-DOWN | POWER-DOWN | POWER-DOWN |
| MEMORY BLOCK 72 | NORMAL | POWER-DOWN | POWER-DOWN | POWER-DOWN | POWER-DOWN | POWER-DOWN | POWER-DOWN | POWER-DOWN | POWER-DOWN |
| MEMORY BLOCK 73 | NORMAL | SELF-REFLESH | SELF-REFLESH | POWER-DOWN | POWER-DOWN | POWER-DOWN | POWER-DOWN | POWER-DOWN | POWER-DOWN |
| MEMORY BLOCK 74 | NORMAL | POWER-DOWN | POWER-DOWN | POWER-DOWN | POWER-DOWN | POWER-DOWN | POWER-DOWN | POWER-DOWN | NORMAL |

FIG. 43

| ADDRESS | CONTROL SECTION | REGIOANL SIGNAL |
|---|---|---|
| 0000000h – 0FFFFFFh | DMA CONTROL SECTION (PRINTER) | R1 |
| 1000000h – 1FFFFFFh | DMA CONTROL SECTION (SCANNER) | R2 |
| 2000000h – 2FFFFFFh | DMA CONTROL SECTION (COMPRESSION/EXPANSION) | R3 |
| 3000000h – 3FFFFFFh | ACCESS CONTROL SECTION (CPU) | — |

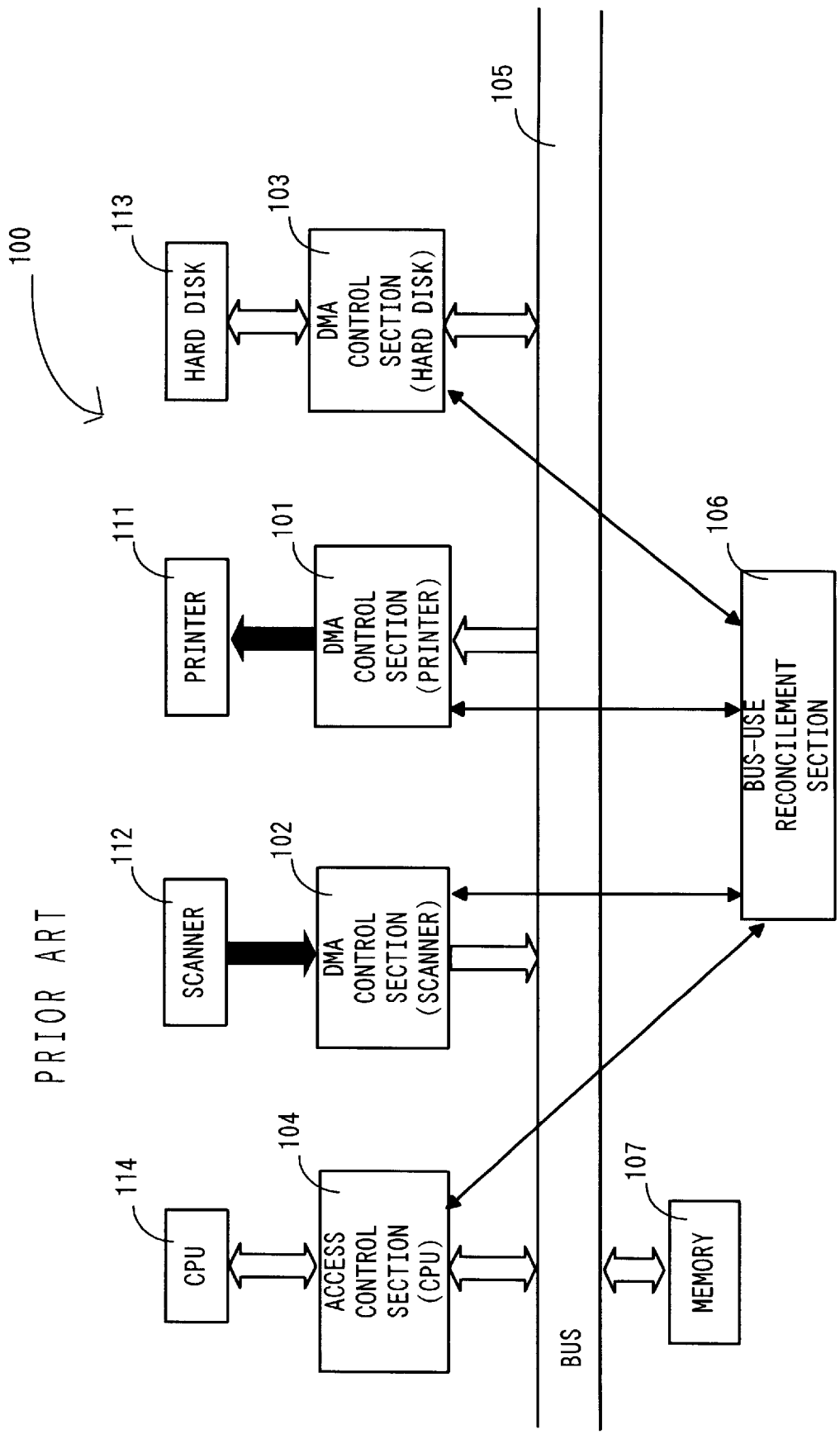

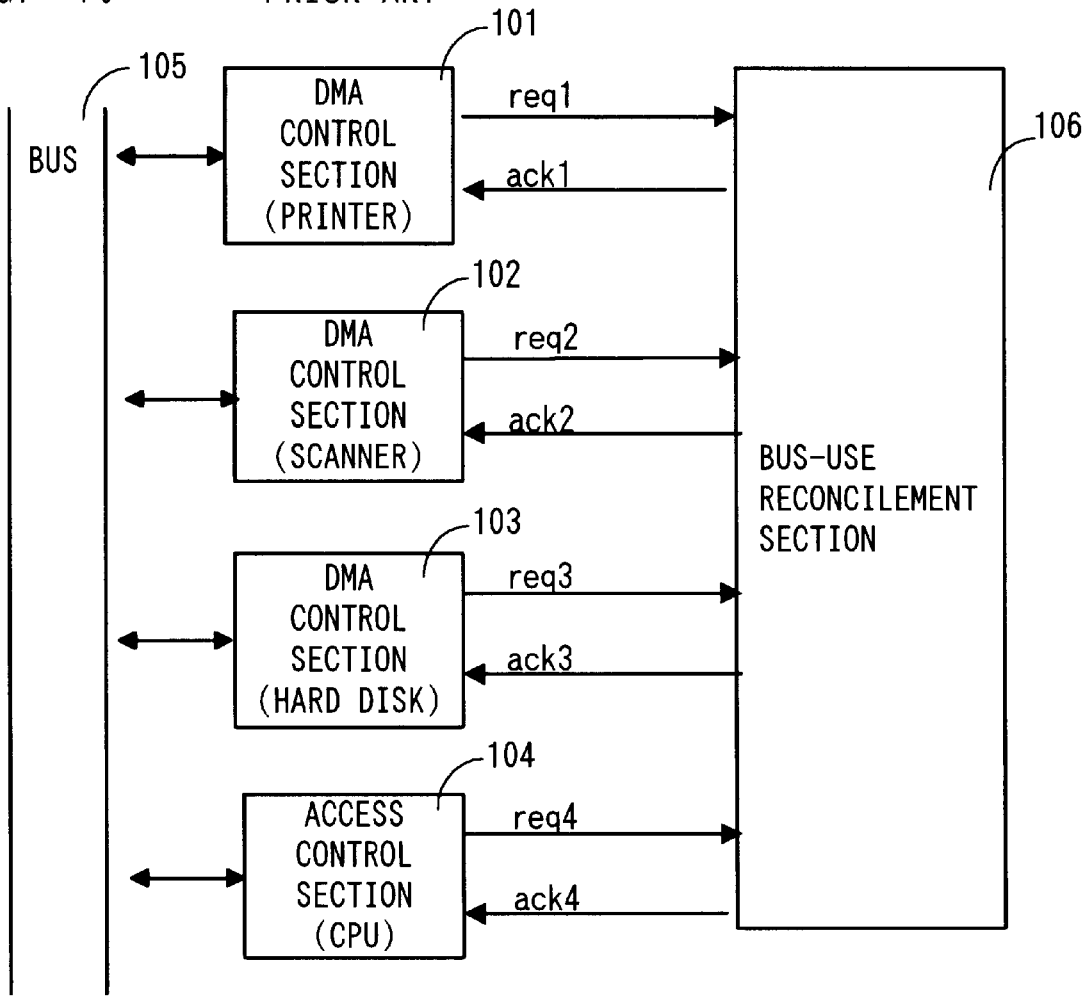

DMA CONTROLLER WITH DYNAMICALLY VARIABLE ACCESS PRIORITY

This application is based on applications Nos. 11-060441, 11-064388, 11-066451, 11-073181, 11-081218, 11-085210 and 11-357320 filed in Japan, the contents of which are hereby incorporated by reference.

BACKGROUND OF THE INVENTION

1. Field of the Invention

The present invention relates to direct memory access control (referred to as DMA control hereinafter). More particularly, the present invention relates to a direct memory access controller which can appropriately reconcile pluralities of memory access made by a plurality of devices connected to a common bus in accordance with operation state of the devices. For example, such a DMA controller is applicable to a copier wherein CPU and other devices such as scanner and printer share a bus.

2. Description of the Prior Art

There has conventionally been known a DMA controller including a bus-use reconcilement section for reconciling pluralities of bus-access based on bus-access requests generated from a plurality of devices. FIG. 48 shows an example of a conventional DMA control system. Basically, the system shown in FIG. 48 includes a memory 107, DMA control sections 101, 102, 103, and an access control section 104. In the conventional system, the DMA control sections 101 to 103 and the access control section 104 get access to the memory 107 via a common bus 105. Furthermore, the system has a bus-use reconcilement section 106 for reconciling pluralities of bus-access between the bus 105 and each of the DMA control sections 101 to 103 and the access control section 104. Still further, DMA control sections 101, 102, and 103 are connected to a printer 111, a scanner 112, a hard disk 113, respectively. The access control section 104 is connected to a CPU 114.

The conventional DMA control system works as follows. See FIG. 49. For instance, when the DMA control section 101 needs access to the bus 105, the DMA control section 101 sends a request signal req1 to the bus-use reconcilement section 106. If the request is acceptable, the bus-use reconcilement section 106 returns a bus-use permission signal ack1 in response to the req1. While the ack1 is in an active state, the printer 111 can get access to the bus 105 through the DMA control section 101. It is same for other devices connected to other DMA control sections.

When those control sections send requests concurrently, the bus-use reconcilement section 106 is designed to return bus-use permission signals to each of the requests in order based on a predetermined priority ranking. FIG. 50 shows an example of priority ranking for bus-access. In case of FIG. 50, when request signals req1, req2, req3, and req4 are generated concurrently, the bus-use reconcilement section 106 returns a bus-use permission signal ack1 only since the DMA control section 101 is assigned to the highest in the predetermined priority ranking. Thereby, the DMA control section 101 gets access to the bus 105 prior to the other control sections 102 to 104. Similarly, when request signals req2, req3, and req4 are generated concurrently, the bus-use reconcilement section 106 returns a bus-use permission signal ack2 only since the DMA control section 102 is assigned to the highest among control sections 102 to 104. Therefore, the DMA control section 102 gets access to the bus 105 prior to the control sections 103 and 104.

However, since the conventional DMA controller 100 controls bus-use reconcilement in accordance with the access priority ranking shown in FIG. 50, there has been a fear that a device assigned to higher priority such as printer 101 is likely to occupy the system. Furthermore, in a case that request signals req1, req2, req3, and req4 generated at the DMA control sections 101, 102, 103, and the access control section 104, respectively, go out to the bus-use reconcilement section 106 intensively, there has been a fear that a device assigned to lower priority, such as the CPU 114, can hardly get access to the bus 105. Under such a situation, program for the system is likely to stop because the CPU 114 cannot get access to the bus 105. What is more, it has been a problem that the conventional DMA controller 100 cannot lower power consumption effectively.

SUMMARY OF THE INVENTION

The present invention is intended to solve the above-described problems of the conventional DMA controller. Its prime object is to provide a DMA controller wherein use-state of a common bus is detected with respect to a plurality of devices so that each of the devices can appropriately get access to a common bus under bus-use reconcilement control based on the detection result. Another object is to provide a DMA controller capable of lowering power consumption appropriately in response to use-sate of a common bus.

In order to achieve the above objectives, the inventive DMA controller includes: a memory; a common bus connected to the memory; a plurality of devices connected to the common bus and accessible to the memory through the common bus; bus monitor means for detecting use-state of the common bus with respect to each of the devices every predetermined period; and bus-use reconcilement means for reconciling pluralities of bus-access made by the devices based on a detection result obtained by the bus monitor means.

The bus monitor means for the DMA controller detects use-state of the common bus with respect to each of the devices every predetermined period. Then, the bus-use reconcilement means reconciles pluralities of bus-access among each of the devices based on the detection result obtained by the bus monitor means. Thereby, pluralities of bus-access among each of the devices are appropriately reconciled in proportion to bus use rate for each of the devices. As a result, bus-occupation by a device assigned to higher priority is avoided even when devices generate requests intensively. Thereby, a device assigned to lower priority can obtain necessary access time. That is, this system enables all the devices connected to the common bus to get access to the bus appropriately. Particularly, this can surely prevent program from stopping.

For detecting use-state of the common bus, the bus monitor means may integrate generation time of bus-use permission signals output from the bus-use reconcilement means. Alternatively, the use-state of the common bus may be detected based on an in-use-state signal the common bus generates. Further, the inventive DMA controller may reject a request from at least one of the devices so as to achieve access reconcilement in accordance with the detection result obtained by the bus monitor means. Preferably, such a request rejection is given to a device assigned to higher priority ranking than a device the ranking of which should be made higher and does not need real time processing.

Thus, the inventive DMA controller changes manners of bus-use reconcilement along with use-state of the common bus with respect to each of the devices connected the bus. Thereby, problems such as that particular device occupies the common bus or, vice versa, particular device can hardly get access to the bus can be avoided.

Furthermore, the inventive DMA controller includes: a memory; a common bus connected to the memory; a plurality of devices connected to the common bus and accessible to the memory through the common bus; bus monitor means for detecting use-state of the common bus with respect to each of the devices every predetermined period; and priority determining means for determining bus-use priority ranking for each of the devices in accordance with a detection result obtained by the bus monitor means. For this type of DMA controller, the bus-use reconcilement means may reconcile pluralities of bus-access made by each of the devices in accordance with the bus-use priority determined by the priority determining means.

In the inventive DMA controller, when the bus monitor means detects use-state of the common bus with respect to each of the devices every predetermined period, the priority determining means determines priority of the common-bus use for each of the devices in accordance with the use-state result. Following the determined priority, the bus-use reconcilement reconciles pluralities of bus-access made by the devices. Thereby, pluralities of access made by each of the devices are properly reconciled in accordance with use-state of the common bus.

For determining bus-use priority, the inventive DMA controller may include either a plurality of priority tables one of which is selected in accordance with a detection result obtained by the bus monitor means or a standard priority table which is changeable in accordance with a detection result obtained by the monitor means. As to the latter case, the standard table may be used without a change, if a detection result does not require priority-ranking change.

This DMA controller is significant in a particular case that one of the devices is a processor. In this case, it is preferable that the bus monitor means calculates bus-use rate of devices every predetermined period except for the processor. Then, in case the use-rate exceeds a predetermined value, the bus-use reconcilement means may allow the processor to get access to the common bus prior to other devices during a predetermined period.

In this DMA controller, when bus-use by a device other than the processor exceeds a predetermined value, the bus-use reconcilement means allows the processor to use the common bus prior to other devices during a predetermined period. Thereby, even if requests concentrate in a short time and bus-use rate by other devices becomes high, the processor can surely get access to the bus. Accordingly, the above system surely avoids a case such that the processor cannot get access to the common bus and stops program. A predetermined period may be set to a bus-use rate that can possibly prevent the processor from getting access to the common bus. In addition, a predetermined period of bus-use opened to the processor may be set to a maximum length of time that devices which need real time processing can await processing. This is to avoid affecting real time processing.

For achieving the above object, the bus-use reconcilement means may cancel requests from devices other than the processor when bus-use rate obtained by the bus monitor means exceeds a predetermined value.

Another aspects of the inventive DMA controller includes: a memory; a common bus connected to the memory; a plurality of devices connected to the common bus and accessible to the memory through the common bus; device monitor means for detecting operation state of each of the devices; and bus-use reconcilement means for reconciling pluralities of access to the common bus made by the devices based on a detection result obtained by the bus monitor means.

In this DMA controller, the device monitor means detects operation-state of devices connected to the common bus. Next, the bus-use reconcilement means reconciles bus-use permission in response to requests sent by each of the devices. Thereby, pluralities of bus access made by each of the devices and the processor are properly reconciled in accordance with operation-state of the devices. Operation-state mentioned herein indicates bus-access state for each of the devices, i.e., presence/absence of access.

For an access reconcilement method, the inventive DMA controller includes a plurality of different priority tables and selects one of the tables based on a detection result obtained by the device monitor means, whereby pluralities of bus-access are reconciled in accordance with a priority table selected. As another method, the DMA controller includes a plurality of different access-interval tables on which minimum bus-access time for each of the devices is recorded and selects one of the tables in accordance with a detection result obtained by the device monitor means, whereby permission/rejection of bus-access for each of the devices are determined in accordance with an access-interval table selected.

Still further, another aspect of the inventive DMA controller includes: a memory; a common bus connected to the memory; a plurality of devices connected to the common bus and accessible to the memory through the common bus; device monitor means for detecting operation state of each of the devices; and DMA-transfer-method changing means for changing DMA-transfer methods between the memory and at least one of the devices in accordance with a detection result obtained by the bus monitor means.

The bus monitor means for the inventive DMA controller detects use-state of the common bus. Then, DMA-transfer-method changing means changes DMA-transfer methods between the memory and each of the devices in accordance with a detection result obtained by the bus monitor means. Therefore, data are transferred between each of the devices and the memory in accordance with an optimum transfer method selected in accordance with use-state of the common bus. Accordingly, DMA transfer is exercised efficiently. In addition, those methods surely avoid problems such that real time processing cannot be made in time and that processing by a processor cannot be made in time.

Preferably, the bus monitor means detects operation-state of a device which needs real time processing when both data to be processed in real time and data not to be in real time are included. Furthermore, the transfer-method changing means preferably changes units of transfer-word for DMA transfer. More specifically, as for the case that real time processing is needed, DMA may be transferred by small amount of data unit and as for the case that real time processing is not needed, DMA may be transferred by large amount of data unit. Thereby, DMA is transferred significantly effectively within a range that does not affect real time processing.

Furthermore, the inventive DMA controller includes: a memory; a common bus connected to the memory; a plurality of devices connected to the common bus and accessible to the memory through the common bus; bus monitor means for detecting use-state of the common bus with respect to each of the devices every predetermined period; and mode-switch means for switching to low-power-consumption mode in accordance with a detection result obtained by the bus monitor means.

The mode-switch means for the inventive DMA controller switches operation modes from normal mode to low-power-consumption mode in accordance with a detection result obtained by the bus monitor means. Thereby, a switch to low-power-consumption mode is surely exercised when a device is in little active. Accordingly, power consumption can be lowered effectively.

The mode-switch means may be clock-decrease means for decreasing frequency of system clock. The clock-decrease means may be means for decreasing operational frequency of processor control signal when one of the devices is a processor. In case the memory includes recording means capable of writing and reading data on demand (DRAM, for example), the clock-decrease means may be means for decreasing operational frequency of control signal for the recording means. A processor control signal referred to herein indicates a control signal sent to the processor.

In case the memory is capable of writing and reading data on demand, the mode-switch means may be a manner that switches an operation mode to a self-refresh mode. Self-refresh mode herein means a mode to exercise refresh operation automatically within the recording means. In general, some commands are required for a switch between self-refresh mode and normal mode.

Further, the inventive DMA controller may include: a memory having a plurality of memory blocks; a common bus connected to the memory; a plurality of devices connected to the common bus and accessible to the memory through the common bus; bus monitor means for detecting use-state of the common bus with respect to each of the devices every predetermined period; and memory controller means for controlling operation mode of each of the memory blocks in accordance with a detection result obtained by the bus monitor means.

The bus monitor means for the inventive DMA controller detects use-state of the common bus with respect to each of the devices every predetermined period. The memory controller means controls operation mode of each of the memory blocks in accordance with a detection result obtained by the bus monitor means. Thereby, operational mode suitably capable of coping with processing speed is selected for each of the memory blocks. Accordingly, when high-speed processing is not required, operation mode switches to low power consumption mode to lower power consumption effectively.

In general, each of the memory blocks is recording means capable of writing and reading on demand, and the memory controller means sets operational mode of the recording means in any one of the three modes, namely, normal mode, power-down mode, and self-refresh mode. Power-down mode and self-refresh mode lower power consumption much more than normal mode (about 1/50).

BRIEF DESCRIPTION OF THE DRAWINGS

FIG. 8 is a diagram to explain correspondence among respective address signals, devices and regional signals;

FIG. 20 is a diagram to explain a selection table for selecting a priority table;

FIG. 21 is a diagram to explain priority tables stored in a priority-table selecting section;

FIG. 24 is a diagram to explain a selection table for selecting an access-interval table;

FIG. 25 is a diagram to explain an access-interval table stored in the access-interval-table selecting section;

FIG. 28 is a diagram to explain the operation of a bus-use reconcilement section and a bus monitor section shown in FIG. 27;

FIG. 40 is a diagram to explain contents of an operation-mode selecting table stored in a memory controller section;

FIG. 43 is a diagram to explain correspondence among respective address signals, devices and regional signals;

FIG. 48 is a diagram showing the structure of a conventional DMA controller;

FIG. 49 is a chart to explain bus-use reconcilement control in a bus-use reconcilement section; and FIG. 50 is a chart to explain priority ranking of bus-use reconcilement control in a bus-use reconcilement section.

DESCRIPTION OF THE PREFERRED EMBODIMENTS

The detailed aspects of a preferred embodiment of the present invention will be explained based on the drawings. The preferred embodiment relates to a DMA controller for copier which controls bus-access made by CPUs and various types of peripheral devices.

[First Embodiment]

Figure 1:
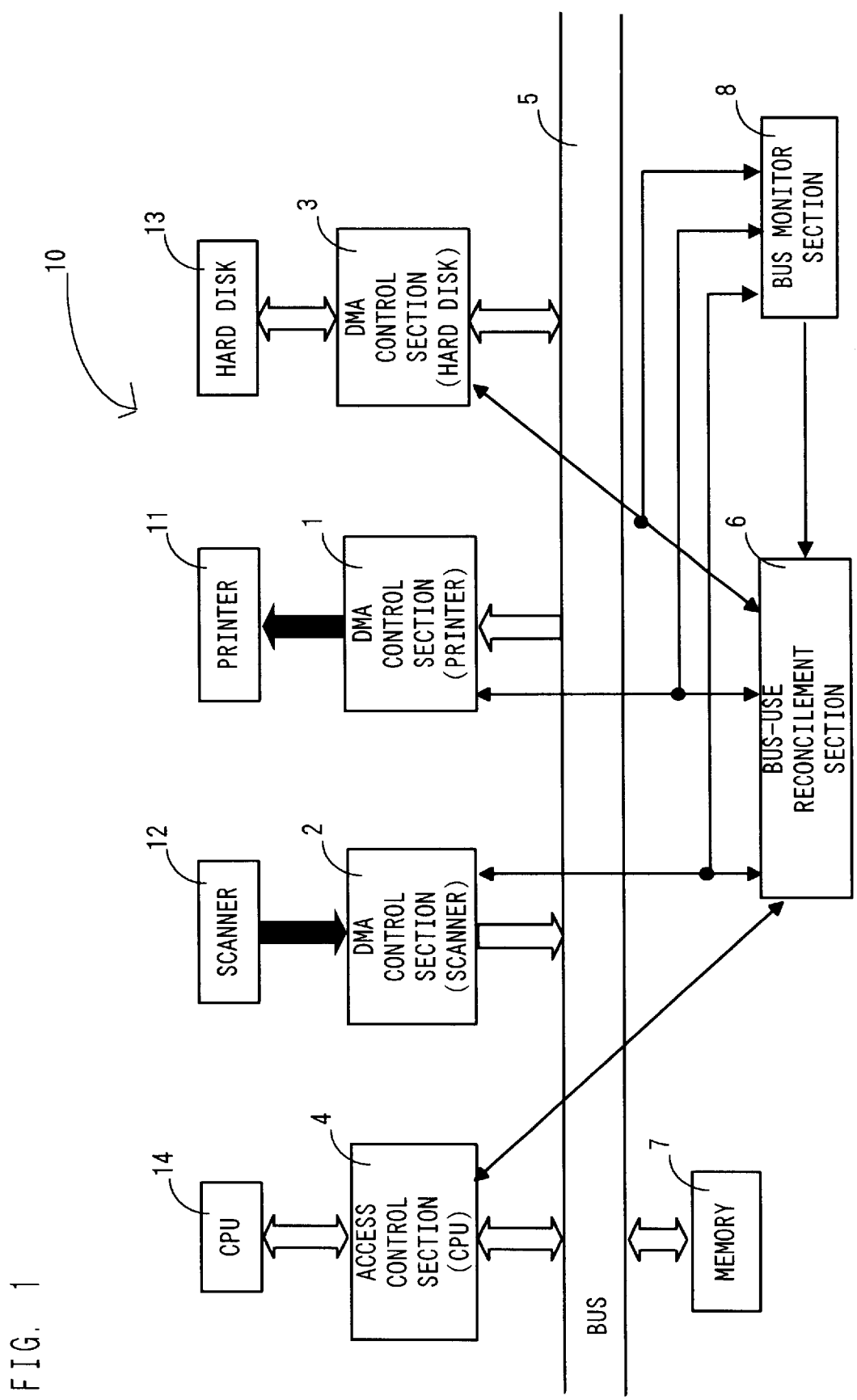
FIG. 1 is a schematic diagram of a DMA controller directed to a first embodiment.

A First Embodiment will be described. As shown in FIG. 1, a DMA controller 10 includes: a memory 7; DMA control sections 1, 2, and 3; an access control section 4; and a bus monitor section 8, wherein the DMA control sections 1 to 3 and the access control section 4 get access to the memory through a common bus 5. The DMA controller 10 further includes a bus-use reconcilement section 6 which reconciles pluralities of bus-access made by each of the DMA control sections and the access control section 4 in accordance with bus-use rate calculated by the bus monitor section 8. A printer 11, a scanner 12, and a hard disk 13 are connected to the DMA control section 1, section 2, and section 3, respectively and a CPU 14 is connected to the access control section 4. The CPU 14 controls the entire system of a copier including this DMA control system. The printer 11, scanner 12, and hard disk 13 can directly get access to the memory 7 without access to the CPU 14. That is, the DMA control sections 1, 2, and 3 help get access to the memory for respective devices.

Figure 2:
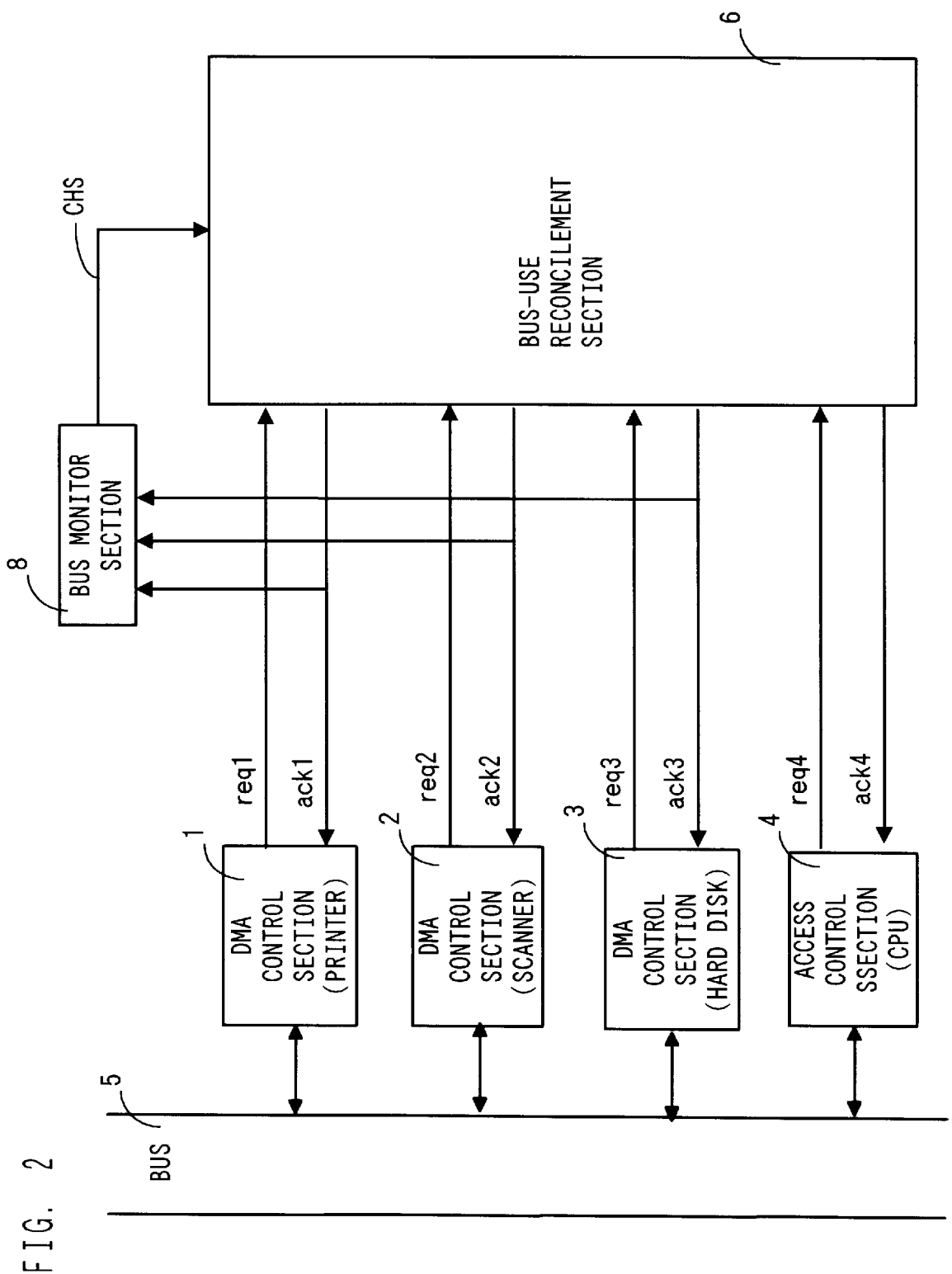
FIG. 2 is a diagram to explain the operation of a bus monitor section shown in FIG. 1.

As shown in FIG. 2, when each of the DMA control sections 1 to 3 and the access control section 4 send request signals req1, req2, req3, and req4, respectively, to the bus-use reconcilement section 6, the section 6 appropriately returns bus-use permission signals ack1, ack2, ack3, and ack4 to the DMA control sections 1 to 3 and the access control section 4, respectively. A control section which has received a bus-use permission signal can get access to the bus 5 only while the permission signal is in an active state. If the DMA control sections 1, 2, and 3, and the access control section 4 concurrently send request signals req1, req2, req3, and req4, respectively, one of the bus-use permission signals ack1, ack2, ack3, and ack4 is returned in accordance with a predetermined priority ranking. (See FIG. 50.) The ranking is set such that the DMA control section 1 for the printer 11 and the DMA control section 2 for the scanner 12 are assigned to higher priority because they need real time processing. On the other hand, the DMA control section 3 for the hard disk 13 and the access control section 4 for the CPU 14 are assigned to lower priorities because they do not need real time processing.

Figure 3:
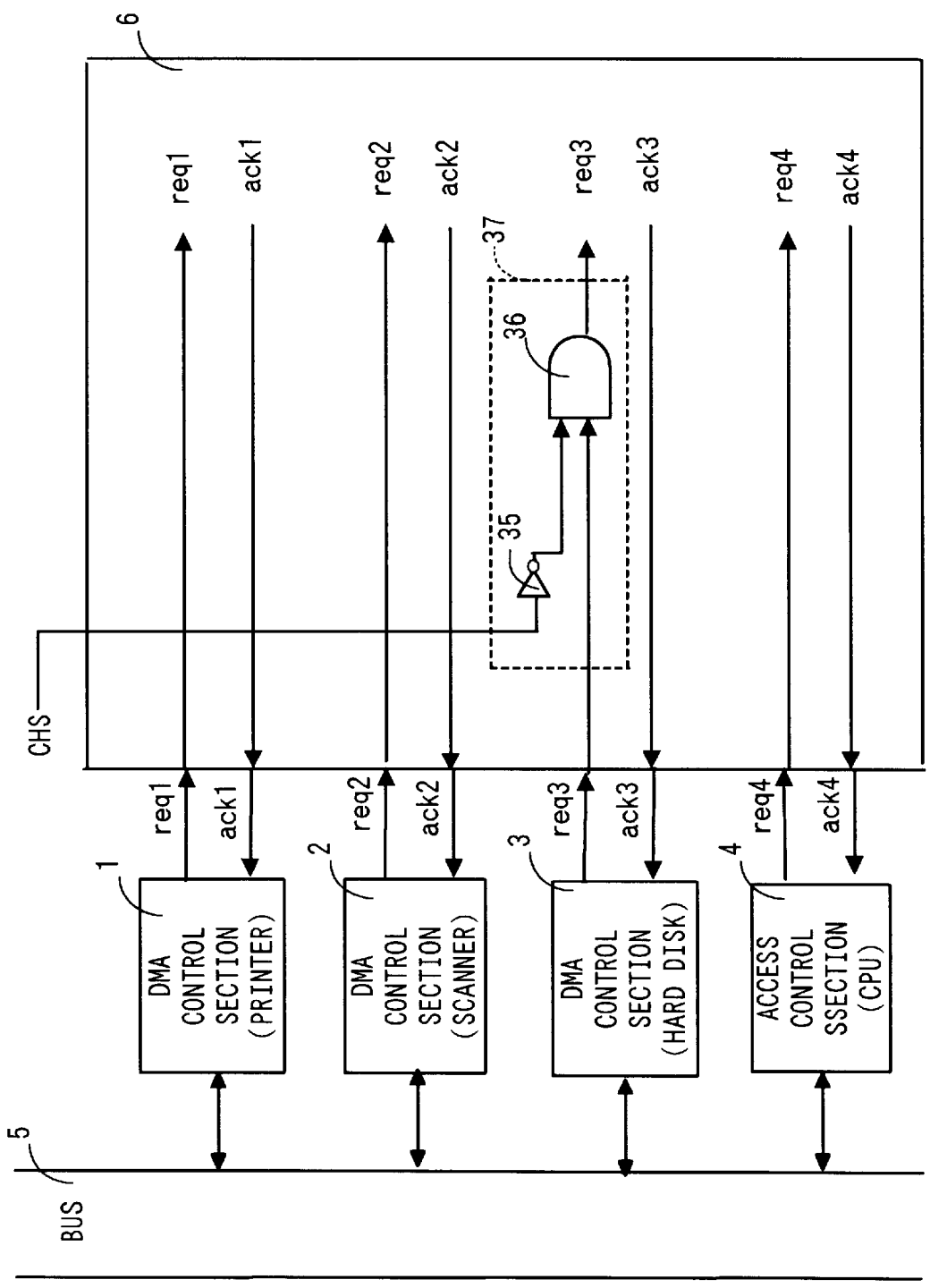
FIG. 3 is a block diagram showing the structure of a bus-use reconcilement section shown in FIG. 1.

The bus-use reconcilement section 6 is equipped with a gate 37 shown in FIG. 3 so that the section 6 can change manners of bus-use reconcilement control in accordance with use-rate of the common bus 5. The gate 37 corresponds to request-canceling means and comprises a NOT-circuit 35 and an AND-circuit 36. That is, a control signal CHS gets through the NOT-circuit 35 firstly, next, both a resultant output signal obtained through the circuit 35 and a request signal req3 get through the AND-circuit 36, and then, another resultant output obtained through the circuit 36 is input in the bus-use reconcilement section 6 as a request signal req3. Thus, the gate 37 is provided for a request signal req3 because the hard disk 13 does not need real time processing and is assigned to higher than the CPU 14 which is subject to change in the priority ranking. Thus, since the gate 37 switches the control change signal CHS to active and inactive, the priority between the DMA control section 3 and the access control section 4 can be switched. The control change signal CHS is generated from the bus monitor section 8.

Even if the DMA control section 3 sends a request signal req3, the req3 is cancelled as long as the control change signal CHS is active. Thereby, in case request signals req1, req2, req3, and req4 are concurrently sent from the DMA control sections 1, 2, 3, and the access control section 4, respectively, and the concurrence makes bus-use rate high, bus access by the hard disk 3 which does not need real time processing is prohibited so that bus-use rate for the CPU 4 assigned to the lowest ranking can be made higher.

Figure 4:
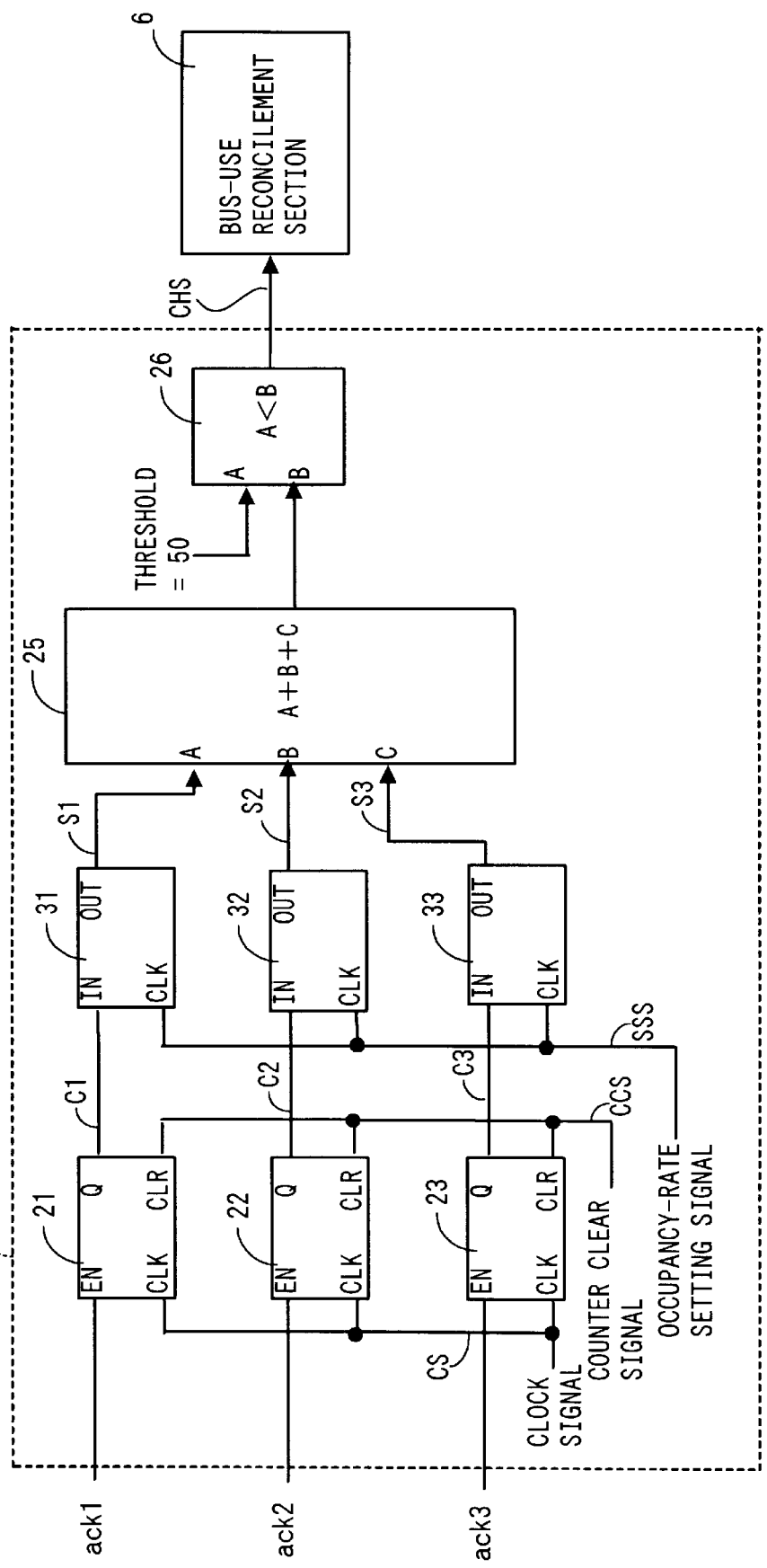
FIG. 4 is a block diagram showing the structure of a bus monitor section shown in FIG. 1.

As shown in FIG. 2, the bus monitor section 8 counts active periods of bus-use permission signals ack1, ack2, and ack3 going out from the bus-use reconcilement section 6 and sends back a control change signal CHS to the section 6 to change manners of bus-use reconcilement control thereat based on the count result. That is, as shown in FIG. 4, the bus monitor section 8 comprises counters 21, 22, 23, Delay Flip-Flops (referred to as DFF, hereinafter) 31, 32, 33, an adder 25, and a comparator 26. A bus-use permission signal ack1 comes into a terminal EN for the counter 21, a clock signal CS comes into a terminal CLK, and a counter-clear signal CCS comes into a terminal CLR. On the other hand, C1, a count value at the counter 21, goes out from a terminal Q and comes into a terminal IN for the DFF 31. Further, an occupancy-rate setting signal SSS comes into a terminal CLK for the DFF 31 and occupancy rate S1 goes out from a terminal OUT, and then, the occupancy rate S1 is input in the adder 25.

When a clock signal CS input to the terminal CLK starts up, the counter 21 counts the signal if a bus-use permission signal ack1 which has come in to the terminal EN is active. Then, the counter 21 outputs C1, a count value of the signal, from the terminal Q and sends C1 to the terminal IN for the DFF 31. Once a counter-clear signal CCS generated in every predetermined period is sent to the terminal CLK for the counter 21, the count value C1 is reset. The counters 22 and 23 operate the same as the counter 21.

When an occupancy-rate setting signal SSS generated every predetermined period is sent to the terminal CLK, the DFF 31 outputs the count value C1 sent from the terminal OUT for the DFF 31. That is, the DFF 31 calculates generation rate of bus-use permission signal ack1 within an input period of the occupancy-rate setting signal SSS, in other words, bus-use rate of the DMA control section 1. The DFFs 32 and 33 also operate the same as the DFF 31: DFF 32 and DFF 33 calculate bus-use rate of DMA control section 2 and that of DMA control section 3, respectively. All of the clock signal CS, counter-clear signal CCS, and occupancy-rate setting signal SSS are generated in the bus monitor section 8.

The adder 25 sums up bus-occupancy rate S1 to S3 calculated by the DFFs 31 to 33. The comparator 26 compares a sum obtained by the adder 25 and a threshold (a threshold is set to "50" in this embodiment). If the sum is larger than the threshold, the adder 25 makes a control change signal input in the bus-use reconcilement section 6 active.

Figure 5:
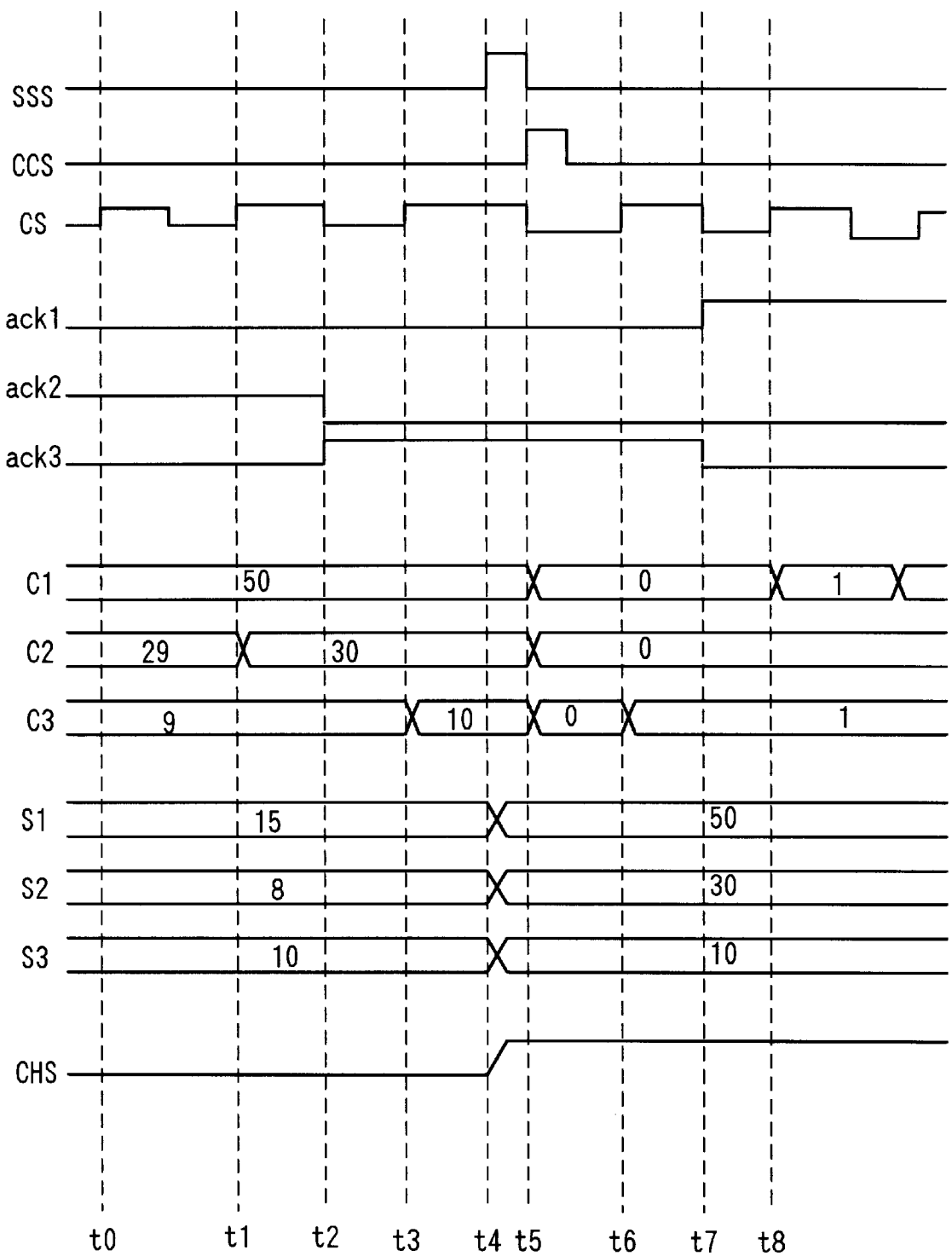
FIG. 5 is a timing chart showing states of respective signals.

Next, operation of the DMA controller 10 will be described by referring to FIG. 5. FIG. 5 is a timing chart showing states of various signals. In this embodiment, both an occupancy-rate setting signal SSS and a counter-clear signal CCS are generated every 100 $\mu$sec and immediately after an occupancy-rate setting signal SSS is generated (125 nsec later), a counter-clear signal CCS is generated. A period of clock signal CS is set to 1$\mu$sec and the following relationship is satisfied:

(clock signal CS)×100=(occupancy-rate setting signal SSS).

Before time $t_0$, count values C1, C2, and C3 are "50", "28", and "9", respectively. As to bus-occupancy rate S1 to S3 for each of the DMA control sections 1 to 3, values "15", "8", and "10" have been input in the adder 25. This means those respective values were read-out when an occupancy-rate setting signal SSS was last generated. Accordingly, the adder 25 summed up those three values and output "33" as a result. Although the value "33" has been input in the comparator 26, a control change signal CHS at time $t_0$ is in inactive (Lo) because the value "33" does not exceeds the threshold "50". Therefore, manners of reconcilement control at the bus-use reconcilement section 6 are not changed. Bus-occupancy rate mentioned herein indicates bus-use rate at every predetermined period.

When a clock signal CS starts up at time $t_0$, the counter 22 counts the signal and its count value C2 becomes "29" because only a bus-use permission signal ack2 is active (Hi). On the other hand, count values "50" for C1 and "9" for C3 remain unchanged at time $t_0$ because bus-use permission signals ack1 and ack3 are active (Lo) and the counters 21 and 23 do not count the signals.

A clock signal CS starts up again at time $t_1$, 1 $\mu$sec after $t_0$, the counter 22 counts the signal and its count value C2 becomes "30" because only a bus-use permission signal ack2 is active (Hi) this time again. On the other hand, count values "50" for C1 and "9" for C3 remain unchanged at $t_1$ because bus-use permission signals ack1 and ack2 are inactive (Lo) and the counters 21 and 23 do not count the signals.

A bus-use permission signal ack2 is active (Lo) and a bus-use permission signal ack3 is active (Hi) at time $t_2$, 500 nsec after $t_1$. The counter 23 counts the signal and its count value C3 becomes "10" because a clock signal CS starts up at time $t_3$, 1 $\mu$sec after $t_1$. On the other hand, count values "50" for C1 and "30" for C2 remain unchanged at $t_3$ because bus-use permission signals ack1 and ack2 are inactive (Lo) and the counters 21 and 22 do not count their signals.

An occupancy-rate setting signal SSS is sent to each of the DFFs 31 to 33 at time $t_4$, 375 nsec after $t_3$. Then, the DFFs 31 to 33 output count values C1 to C3 obtained at time $t_4$ as bus-occupancy rate S1 to S3, respectively. That is, the DFF 31 outputs "50" as its bus-occupancy rate S1, the DFF 32 outputs "30", as S2, and the DFF 33 outputs "10" as S3. Since an occupancy-rate setting signal SSS and a counter-clear signal CCS are sent to the DFFs 31 to 33 and their respective counters 21 to 23 every 100 $\mu$sec period, count values C1 to C3 thus can be output as respective bus-occupancy rate S1 to S3.

Next, the above bus-occupancy rate S1 to S3 are input in the adder 25. Then, the adder 25 outputs "90" as a calculation result and inputs the resultant value in the comparator 26. Since the comparator 26 determines that the value "90" exceeds the threshold "50", a control change signal CHS sent from the bus monitor section 8 to the bus-use reconcilement section 6 becomes active (Hi). While the control change signal CHS is active (Hi), a request signal req3 sent from the DMA control section 3 is canceled by the gate 37 (see FIG. 3), whereby the cancellation prohibits the hard disk 13 from getting access to the bus 5. As a result, original 10% of bus-occupancy rate for the CPU 14 is raised up to 20%. Accordingly, this manner avoids a problem such that program stops since the CPU 14 cannot get access to the bus 5.

Furthermore, a counter-clear signal CSS is sent to each of the counter 21 to 23 at time $t_5$, 125 nsec after $t_4$ (500 nsec after $t_3$). This counter-clear signal CSS makes all of the count values C1 to C3 "0".

A clock signal CS starts up again at time $t_6$, 500 nsec after $t_5$. Since only a bus-use permission signal ack3 is active (Hi) this time, the counter 23 counts the signal and its count value is renewed to "1". On the other hand, since bus-use permission signals ack1 and ack2 are inactive (Lo), the counters 21 and 22 do not count their respective signals, whereby their count values C1 and C2 remain "0".

Next, a bus-use permission signal ack1 is active (Hi) and a bus-use permission signal ack3 is inactive (Lo) at time $t_7$, 500 nsec after $t_6$. After that, a clock signal CS starts up again at time $t_8$, 1 $\mu$sec after $t_6$. The counter 21 counts a signal this time and its count value C1 becomes "1". On the other hand, since bus-use permission signals ack2 and ack3 are inactive (Lo), the counters 22 and 23 do not count their respective signals, whereby their count values, "0" for C2 and "1" for C3, remain unchanged.

Afterward, each of the counters 21 to 23 counts signals. When an occupancy-rate setting signal SSS is sent to their respective DFFs 31 to 33, occupancy rate S1 to S3 for each of the DMA control sections 1 to 3 are calculated. Then, the bus-use reconcilement section 6 changes manners of reconcilement control in accordance with the calculation result.

As described in detail, according to the DMA controller 10 directed to the First Embodiment, the bus monitor section 8 calculates bus-occupancy rate S1 to S3 for the DMA control sections 1 to 3, respectively, based on how many times each of the DMA control sections 1 to 3 connected to the bus 5 send their respective bus-use permission signals ack1 to ack3 to the bus 5. Furthermore, if a sum of the occupancy-rate S1 to S3 exceeds the predetermined threshold "50", the bus-use reconcilement section 6 changes manners of reconcilement control. Thereby, the above manners prevent the DMA control sections 1 to 3 from occupying the bus 5 and surely give the access control section 4 opportunities to get access to the bus 5.

The present embodiment is only an example and does not limit the present invention in any respect. Accordingly, the present invention can be variously improved and changed within the scope not departing the subject matter thereof. For example, the gate 37 for the DMA controller of the First Embodiment is integrated into the bus-use reconcilement section 6, however, the gate may be integrated into the DMA control section 3 or may be disposed between the DMA control section 3 and the bus-use reconcilement section 6.

[Second Embodiment]

Next, a Second Embodiment will be described. A DMA controller directed to the Second Embodiment is basically structured the same as the DMA controller directed to the First Embodiment other than the structure of a bus monitor section. Accordingly, descriptions for the same aspects as the First Embodiment will be omitted and only different aspects will be described in this Embodiment. For figures directed to this Embodiment, the same numerals are assigned to the parts structured the same as those of the First Embodiment.

Figure 6:
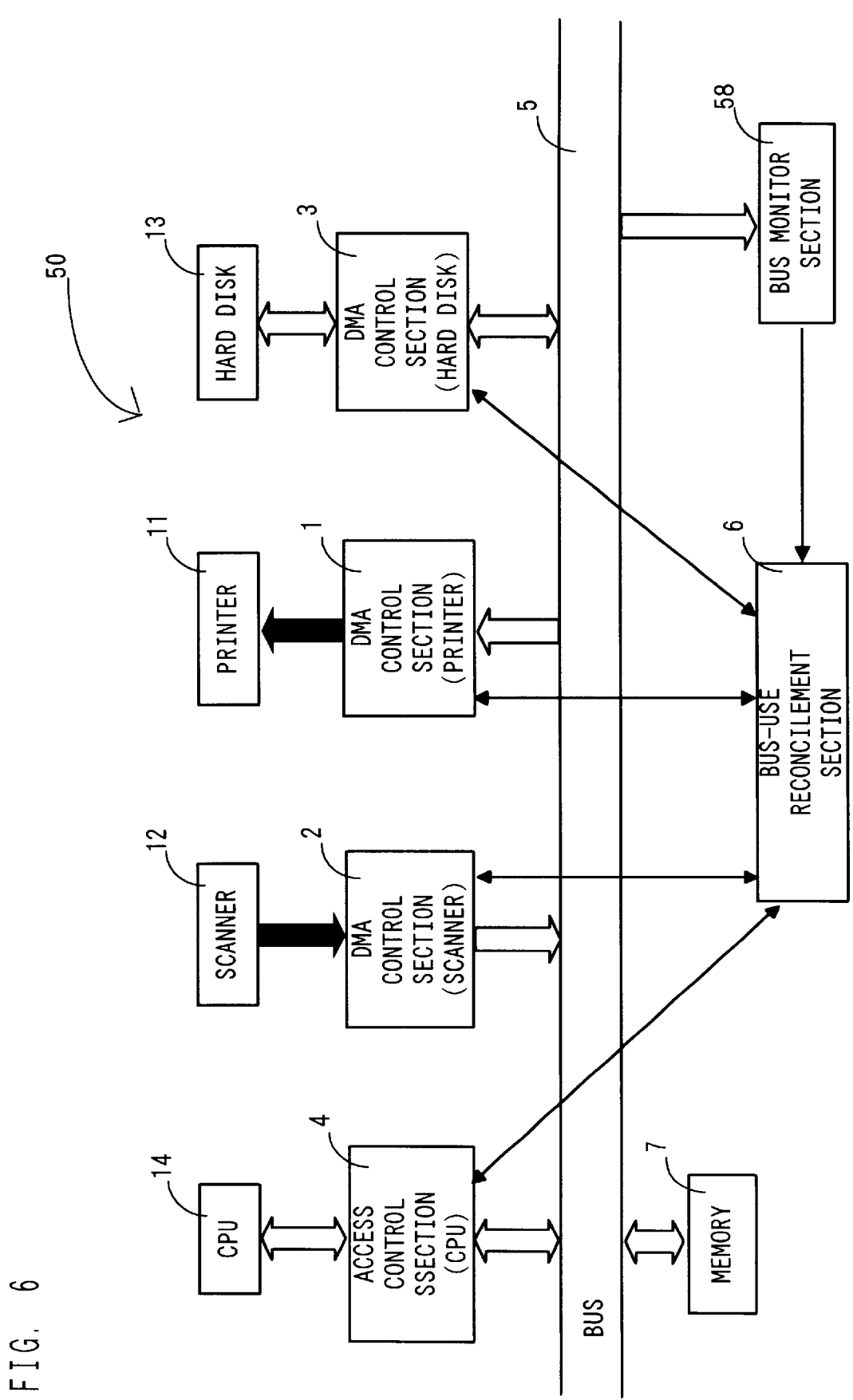
FIG. 6 is a schematic diagram of a DMA controller directed to a second embodiment.

As shown in FIG. 6, similar to the First Embodiment, a DMA controller 50 includes: a memory 7; DMA control sections 1, 2, and 3; an access control section 4; and a bus monitor section 58, wherein the DMA control sections 1 to 3 and the access control section 4 get access to the memory 7 through a common bus 5. The DMA controller 50 further includes a bus-use reconcilement section 6 which reconciles pluralities of bus-access made by each of the DMA control sections and the access control section 4 in accordance with bus-use rate calculated by the bus monitor section 58.

Figure 7:
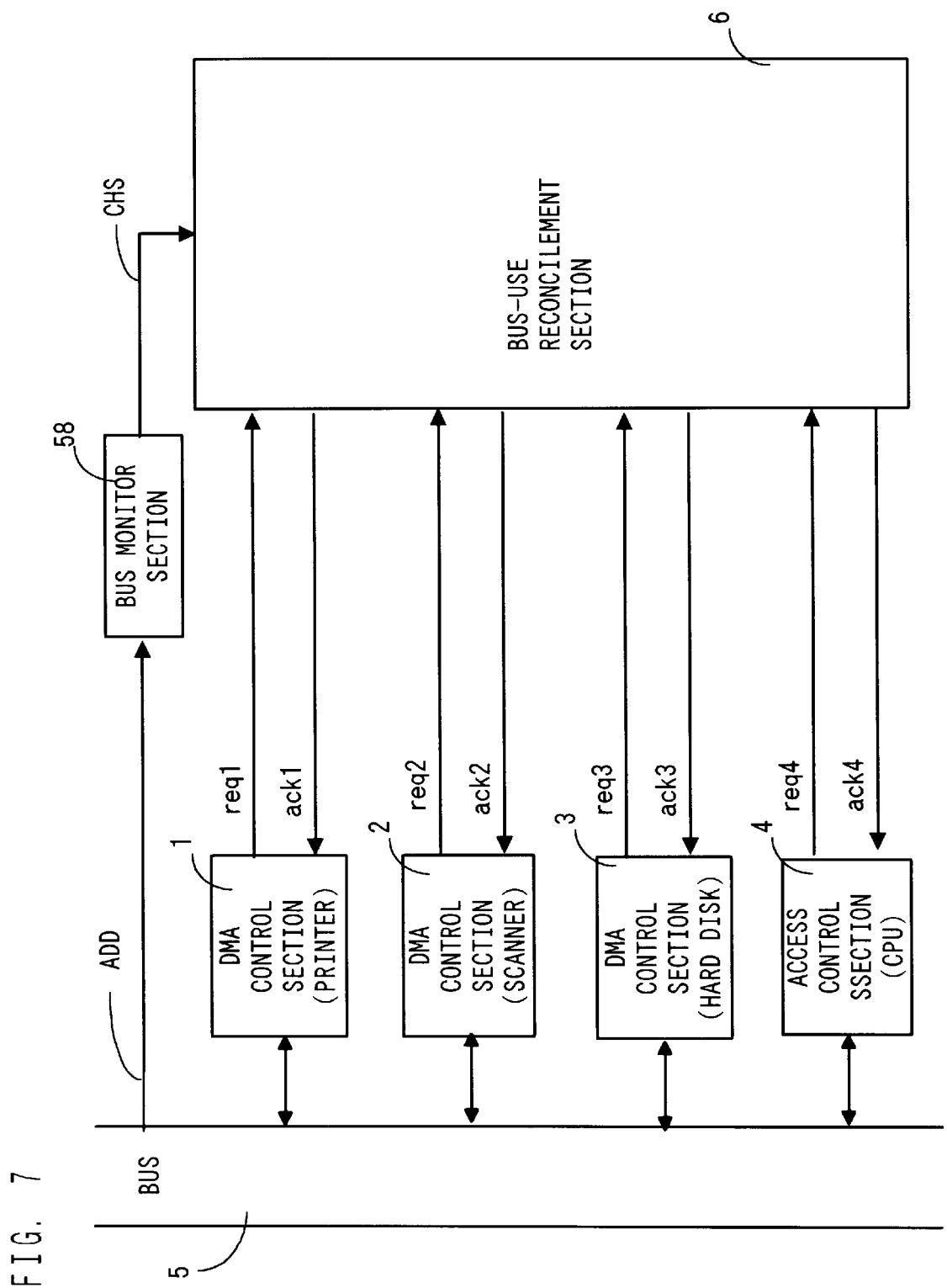
FIG. 7 is a diagram to explain the operation of a bus monitor section shown in FIG. 6.

As shown in FIG. 7, the bus monitor section 58 detects generation-state of bus address signal ADD sent from the bus 5 in stead of that the bus monitor section 8 directed to the First Embodiment detects generation-state of bus-use permission signals ack1 to ack3 sent to the DMA control sections 1 to 3, respectively. Since addresses available to the each of the DMA control sections 1 to 3 and the access control section 4 are previously allocated within the bus 5, the bus monitor section 58 can find out which control section has got access to the bus 5 by detecting an address signal ADD sent therefrom.

As shown in FIG. 8, in this embodiment, for example, addresses 0000000h–0FFFFFFh are allocated to the DMA control section 1, and so are addresses 1000000h–1FFFFFFh to the DMA control section 2, 2000000h–2FFFFFFh to the DMA control section 3, and 4000000h–4FFFFFFh to the access control section 4. Regional signals R1 to R3 indicated in FIG. 8 will be described later. Since a 24th bit and a 25th bit indicate the highest two-digit numerical values in an address group, any one of the regional signals R1 to R3 is made active when numerical values for the 24th bit and the 25th bit are detected. For example, if 24th and 25th bits indicate "10", a regional signal R3 is made active because "10" in binary notation corresponds to "2" in hexadecimal notation.

Figure 9:
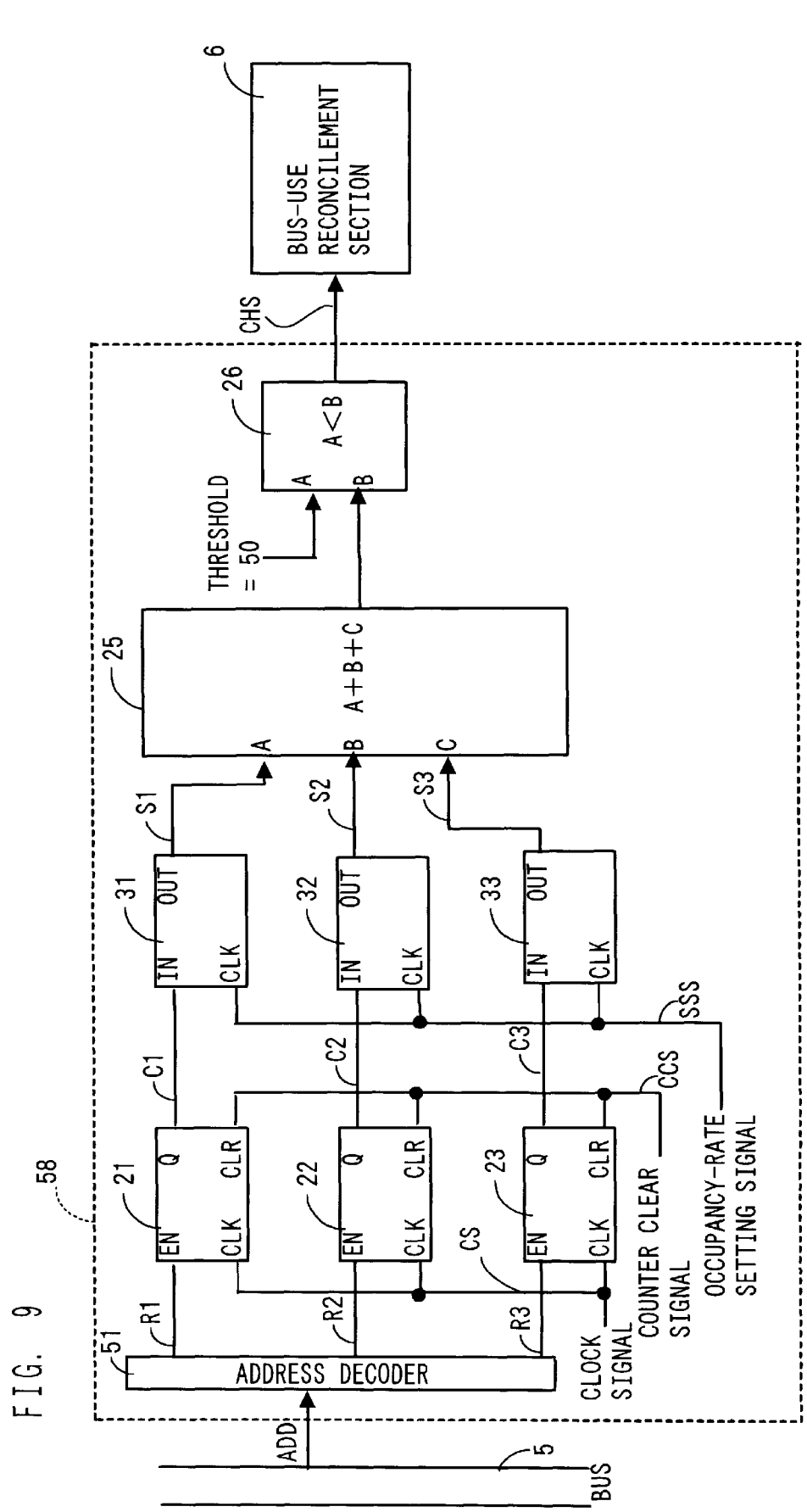
FIG. 9 is a block diagram showing the structure of a bus monitor section shown in FIG. 6.

As shown in FIG. 9, the bus monitor section 58 includes counters 21, 22, 23, DFFs 31, 32, 33, an adder 25, and a comparator 26 which are identical to those of the First Embodiment, and address decoder 51 in addition. The address decoder 51 reads-out an address signal ADD sent from the bus 5 and makes any one of the regional signals R1 to R3 active in accordance with the signal address ADD. As shown in FIG. 8, the relationship between regional signals R1 to R3 and address signal ADD is as follows: Regional signal R1 is made active in response to addresses 0000000h–0FFFFFFh; Regional signal R2 is made active in response to addresses 1000000h–1FFFFFFh; and Regional signal R3 is made active in response to addresses 2000000h–2FFFFFFh.

If a regional signal R1 the address decoder 51 outputs therefrom and inputs in a terminal EN for the counter 21 is active when a clock signal CS input to a terminal CLK starts up, the counter 21 counts the regional signal R1 and delivers its count value C1 from a terminal Q to a terminal IN for the DFF 31. When a counter-clear signal CCS generated periodically is sent to a terminal CLK for the counter 21, the count value is reset. The counters 22 and 23 operate in the same as the counter 21.

The DFF 31 outputs the count value C1 delivered thereto from a terminal OUT for the counter 21 when an occupancy-rate setting signal SSS generated periodically reaches a terminal CLK for the DFF 31. That is, the DFF 31 calculates generation rate of regional signal R1 in a generation period of occupancy-rate setting signal. In other words, bus-use rate of the DMA control section 1 is calculated by the DFF 31. The DFFs 32 and 33 do the same as the DFF 31 does, i.e., the DFF 32 and 33 calculate bus-use rate of the DMA control sections 2 and 3, respectively. As to clock signal CS, counter-clear signal CCS, and occupancy-rate setting signal SSS, all of them are generated within the bus monitor section 58. The adder 25 and a comparator 26 are identical to the ones in the First Embodiment.

Figure 10:
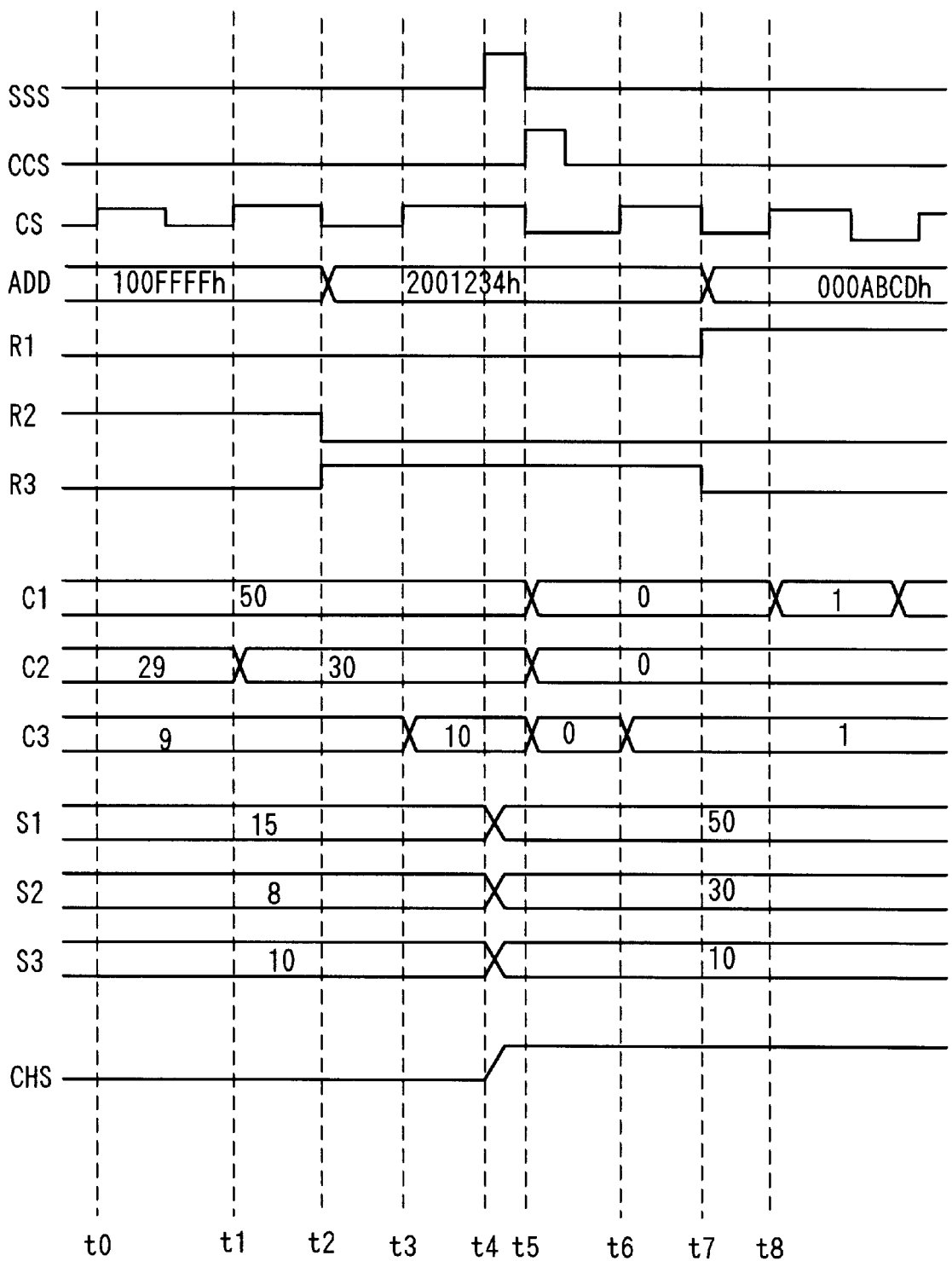
FIG. 10 is a timing chart showing states of respective signals.

Next, operation of the DMA controller 50 will be described by referring to FIG. 10. FIG. 10 is a timing chart showing states of various signals. In this embodiment, both an occupancy-rate setting signal SSS and counter-clear signal CCS are generated every 100 $\mu$sec and immediately after an occupancy-rate setting signal SSS is generated (125 nsec later), a counter-clear signal CCS is generated. A period of clock signal CS is set to 1 $\mu$sec.

Before time $t_0$, count values C1, C2, and C3 are "50", "28", and "9", respectively. A to bus-occupancy rate S1 to S3 for each of the DMA control sections 1 to 3, values "15", "8", and "10" have been input in the adder 25. Accordingly, the adder 25 summed up those three values and output "33" as a result. Although the value "33" has been input in the comparator 26, a control change signal CHS at time $t_0$ is in inactive (Lo) because the value "33" does not exceeds the threshold "50". Therefore, manners of reconcilement control at the bus-use reconcilement section 6 are not changed.

At time $t_0$, a clock signal CS starts up and an address signal ADD indicates "100FFFFh". Therefore, the address decoder 51 makes the regional signal R2 active(Hi), and makes R1 and R3 inactive (Lo). As a result, the counter 22 counts R2 and its count value C2 becomes "29". On the other hand, count values "50" for C1 and "9" for C3 remain unchanged at time $t_0$.

A clock signal CS starts up again at time $t_1$, 1 $\mu$sec after $t_0$. Since an address signal ADD at this point is "100FFFFh", the address decoder 51 makes the regional signal R2 active (Hi), and makes R1 and R3 inactive (Lo). Therefore, the counter 22 counts the signal and its count value C2 becomes "30". On the other hand, count values "50" for C1 and "9" for C3 remain unchanged at time $t_1$ because the counters 21 and 23 do not count their signals.

Provided that the address signal ADD changes to "2001234h" at time $t_2$, 500 nsec after $t_1$. Then, the address decoder 51 makes the regional signal R3 active (Hi), and makes R1 and R2 inactive (Lo). The counter 23 counts the signal and its count value C3 becomes "10" because a clock signal CS starts up again at time $t_3$, 1 μsec after $t_1$. On the other hand, count values "50" for C1 and "30", for C2 remain unchanged at $t_3$ because the counters 21 and 22 do not count their signals.

An occupancy-rate setting signal SSS is sent to each of the DFFs 31 to 33 at time $t_4$, 375 nsec after $t_3$. Then, the DFFs 31 to 33 output count values C1 to C3 at time $t_4$ as bus-occupancy rate S1 to S3, respectively. That is, the DFF 31 outputs "50" as its bus-occupancy rate S1, the DFF 32 outputs "30" as S2, and the DFF 33 outputs "10" as S3. Since an occupancy-rate setting signal SSS and a counter-clear signal CCS are sent to the DFFs 31 to 33 and their respective counters 21 to 23 with a 100 μsec period, count values C1 to C3 thus can be output as respective bus-occupancy rate S1 to S3.

Next, the above bus-occupancy rate S1 to S3 are input in the adder 25. Then, the adder 25 outputs "90" as a calculation result and inputs the resultant value in the comparator 26. Since the comparator 26 determines that the value "90" exceeds the threshold "50", a control change signal CHS is made active (Hi). Then, the gate 37 cancels a request signal req3 sent from the DMA control section 3 (see FIG. 3), whereby the cancellation prohibits the DMA control section 3 from getting access to the bus 5. As a result, original 10% of bus-occupancy rate for the access control section 4 is raised up to 20%. Accordingly, this manner avoids a problem such that program stops since the CPU 14 cannot get access to the bus 5.

Furthermore, a counter-clear signal CSS is sent to each of the counter 21 to 23 at time $t_5$, 125 nsec after $t_4$ (500 nsec after $t_3$). This counter-clear signal CSS makes all of the count values C1 to C3 "0".

A clock signal CS starts up again at time $t_6$, 500 nsec after $t_5$. Since the address signal ADD "2001234h" remains and the regional signal R3 is in active (Hi), the counter 23 counts the signal and its count value is renew to "1". On the other hand, since the regional signals R1 and R2 are in inactive (Lo) at this point, the counters 21 and 22 do not count their respective signals, whereby their count values C1 and C2 remain "0".

Next, provided that the address signal ADD changes to "000ABCDh" at time $t_7$, 500 nsec after $t_6$. Then, the address decoder 51 makes the regional signal R1 active (Hi), and makes R2 and R3 inactive (Lo). After that, a clock signal CS starts up again at time $t_8$, 1 μsec after $t_6$. The counter 21 counts this time and its count value C1 becomes "1". On the other hand, count values "0" for C2 and "1" for C3 remain unchanged at $t_8$ because the counters 22 and 23 do not count their signals.

Since the address decoder 51 makes any one of the regional signals R1 to R3 active (Hi) as similar as before, a counter corresponding to a regional signal counts the signal when a clock signal CS starts up. When an occupancy-rate setting signal is sent to each of the DFFs 31 to 33, occupancy rate S1 to S3 for each of the DMA control sections 1 to 3 are calculated. Then, the bus-use reconcilement section 6 changes manners of reconcilement control in accordance with the calculation result.

As described in detail, according to the DMA controller 50 directed to the Second Embodiment, the bus monitor section 58 calculates bus-occupancy rate S1 to S3 for the DMA control sections 1 to 3, respectively, based on how many times each of the DMA control sections 1 to 3 connected to the bus 5 send their respective address signals ADD to the bus 5. Furthermore, if a sum of the occupancy-rate S1 to S3 exceeds the predetermined threshold "50", the bus-use reconcilement section 6 changes manners of reconcilement control. Thereby, the above manners prevent the DMA control sections 1 to 3 from occupying the bus 5 and surely give the access control section 4 opportunities to get access to the bus 5.

The present embodiment is only an example and does not limit the present invention in any respect. Accordingly, the present invention can be variously improved and changed within the scope not departing the subject matter thereof. For example, the gate 37 for the DMA controller of the Second Embodiment may also be integrated into the DMA control section 3 or may be disposed between the DMA control section 3 and the bus-use reconcilement section 6.

[Third Embodiment]

Next, a Third Embodiment will be described. A DMA controller directed to the Third Embodiment is basically structured the same as the DMA controller directed to the First Embodiment other than the structure of a bus monitor section. Accordingly, descriptions for the same aspects as the First Embodiment will be omitted and only different aspects will be described in this Embodiment. For figures directed to this Embodiment, the same numerals are assigned to the parts structured the same as those of the First Embodiment.

The DMA controller of the Third Embodiment has a structure such that the bus-use reconcilement section 6 shown in FIG. 1 is replaced with a bus-use reconcilement section 156. That is, the DMA controller includes: a memory 7; DMA control sections 1, 2, and 3; an access control section 4; and a bus monitor section 8, wherein the DMA control sections 1 to 3 and the access control section 4 get access to the memory 7 through a common bus 5. The DMA controller further includes a bus-use reconcilement section 156 which reconciles pluralities of bus-access made by each of the DMA control sections and the access control section 4.

Figures 11, 12:
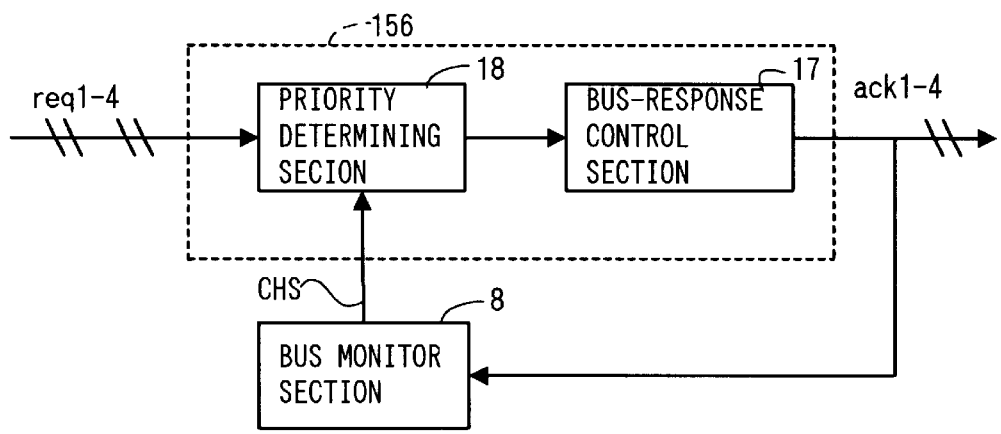
FIG. 11 is a block chart showing the structure of a bus-use reconcilement section for a DMA controller directed a third embodiment.
FIG. 12 is priority tables stored in a priority determining section.

As shown in FIG. 11, the bus-use reconcilement section 156 includes a priority determining section 18 and a bus-response control section 17. When request signals req1, req2, req3, and req4 sent by the DMA control sections 1, 2, 3, and the access control section 4, respectively, reach the priority determining section 18, the bus-response control section 17 appropriately returns bus-use permission signals ack1, ack2, ack3, and ack4 to the DMA control sections 1, 2, 3, and the access control section 4, respectively, in accordance with bus-use priority determined by the priority determining section 18. Control sections to which bus-use permission signals are returned can get access to the bus 5 while their bus-use permission signal are in active.

The priority determining section 18 has two priority tables, namely, a first table T1 and a second table T2 as shown in FIG. 12. The first table T1 is selected while a control change signal CHS input in the priority determining section 18 is in inactive and the second table T2 is selected while the control change signal CHS is in active.

The first table T1 is identical to the priority table used for the conventional DMA controller 100. Bus-use priority ranking for the first table T1 is assigned with the following order (start with the highest): the DMA control section 1; the DMA control section 2; the DMA control section 3; and the access control section 4. For the second table T2, priority is assigned with the following order: the DMA control section 1; the DMA control section 2; the access control section 4; and the DMA control section 3.

Accordingly, the second table T2 is selected when request signals req1, req2, req3, and req4 are intensively generated at the DMA control sections 1 to 3 and the access control section 4, respectively, bus-use rate gets to higher, and this makes a control change signal CHS active. When the second table T2 is selected, the access control section 4 (CPU 14) ranks up by one and the DMA control section 3 (hard disk 13) ranks down by one. Thereby, the CPU 14 in lower ranking can surely obtain time to get access to the bus 5.

Next, operation of the DMA controller directed to this embodiment will be described by referring to FIG. 5. However, since the DMA controller of this embodiment operates the same as the one directed to the First Embodiment between time $t_0$ and time $t_3$, description about this time zone is omitted.

Bus-occupancy rate S1 to S3 calculated at time $t_4$ are input in the adder 25. Then the adder outputs "90" as a calculation result and inputs the resultant value in the comparator 26. Since the comparator 26 determines that the value "90" exceeds the threshold "50", a control change signal CHS is made active (Hi). Since the priority determining section 18 selects the second table T2 while the control change signal CHS is in active (Hi), ranking of the access control section 4 at the T2 is higher than at the first table T1 (see FIG. 12). Thereby, the CPU 14 can surely get access to the bus 5. Since the priority determining section 18 thus selects a suitable priority table for bus-use reconcilement in accordance with bus-use rate, each of the control sections can get access to the bus 5 appropriately.

Time lapses further and between time $t_5$ and time $t_7$, the DMA controller 150 operates the same as the DMA controller 10 directed to the First Embodiment. After that, the counters 21 to 23 counts their respective signals. When an occupancy-rate setting signal SSS is sent to each of the DFFs 31 to 33, occupancy-rate S1 to S3 for respective DMA control sections are calculated and the priority determining section 18 selects a priority table in accordance with the calculation result. Then, bus-use reconcilement is exercised based on the selected priority table. Since priority tables are thus changed in accordance with use-rate of the bus 5, each of the control sections can get access to the bus 5 appropriately.

As described in detail, according to the DMA controller directed to the Third Embodiment, the bus monitor section 8 calculates bus-occupancy rate S1 to S3 for the DMA control sections 1 to 3, respectively, based on how many times each of the DMA control sections 1 to 3 connected to the bus 5 send their respective bus-use permission signals ack1 to ack3 to the bus 5. Furthermore, if a sum of the occupancy-rate S1 to S3 exceeds the predetermined threshold "50", a control change signal CHS becomes in active and the priority-determining section 18 changes priority tables from the first table T1 to the second table T2. Therefore, when the bus-use rate gets high, the priority ranking of the access control section 4 in the first table T1, the lowest therein, ranks up and the CPU 14 can surely get access to the bus 5. That is, each of the DMA control sections 1 to 3 and the access control section 4 can appropriately get access to the bus 5.

The present embodiment is only an example and does not limit the present invention in any respect. Needless to say, the present invention can be variously improved and changed within the scope not departing the subject matter thereof.

[Fourth Embodiment]

Next, a Fourth Embodiment will be described. A DMA controller directed to the Fourth Embodiment is basically structured the same as the DMA controller directed to the Third Embodiment other than structure of a priority determining section. Accordingly, descriptions for the same aspects as the Third Embodiment will be omitted and only different aspects will be described in this Embodiment. For figures directed to this Embodiment, the same numerals are assigned to the parts structured the same as those of the Third Embodiment.

The DMA controller of the Fourth Embodiment has a structure such that the bus-use reconcilement section 6 shown in FIG. 1 is replaced with a bus-use reconcilement section 166. That is, the DMA controller includes: a memory 7; DMA control sections 1, 2, and 3; an access control section 4; and a bus monitor section 8, wherein the DMA control sections 1 to 3 and the access control section 4 get access to the memory 7 through a common bus 5. The DMA controller further includes a bus-use reconcilement section 166 which reconciles pluralities of bus-access made by each of the DMA control sections and the access control section 4.

Figure 13:
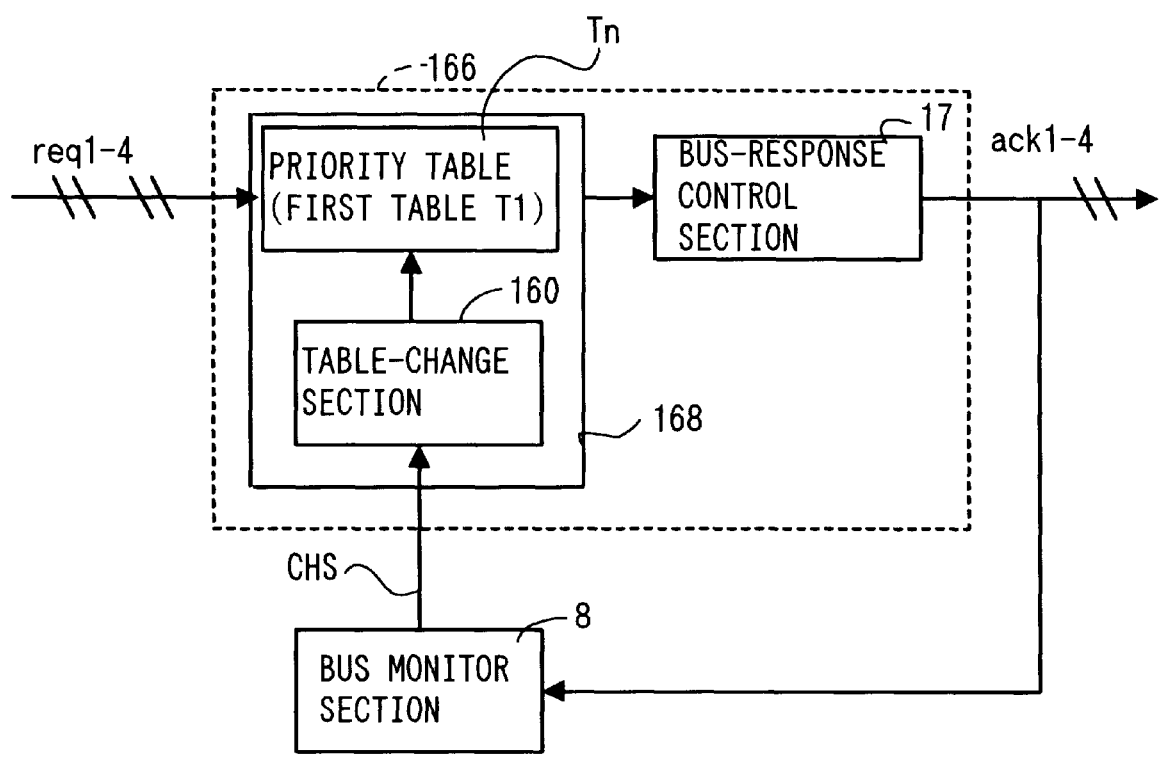
FIG. 13 is a block chart showing the structure of a bus-use reconcilement section for a DMA controller directed a fourth embodiment.

As shown in FIG. 13, the bus-use reconcilement section 166 includes a priority determining section 168 which determines bus-use priority for reconcilement control in accordance with use-rate of the bus 5 calculated by the bus monitor section 8. Bus-use reconcilement is exercised in accordance with priority ranking determined by the priority determining section 168. The priority determining section 168 includes a table-change section 160. While a control change signal CHS generated from the bus monitor section 8 is in active, the table-change section 160 reduces access chances for a DMA control section assigned to lower ranking in a priority table so as to make its bus-access interval longer. In other words, the table-change section 160 changes contents of a priority table Tn.

A control change signal CHS is set active when a sum of bus-occupancy rate of the DMA control sections 1 to 3 calculated by the bus monitor section 8 based on generation times of bus-use permission signals ack1, ack2, and ack3 exceeds a predetermined threshold "50". Contents of the priority table Tn begins with table data read-out at an initial state. But later on, they are changed by the table-change section 160.

The table-change section 160 changes contents of the priority table Tn as follows. In this embodiment, it is provided that the first table T1 (see FIG. 12) is read-out as a initial state of a priority table Tn. For example, it is provided that bus occupancy rate S1 to S3 for each of the DMA control sections 1 to 3 indicate "50", "30", and "10", respectively, and the bus monitor section 8 sets a control change signal CHS active, as shown in FIG. 5.

Under such a condition as provided in the above, the table-change section 160 changes data contents of the first table T1 as follows: ⅓ of request signals req3 sent from the DMA control section 3 (the hard disk 13), the lowest in the bus-occupancy rate, should be output to the bus-response control section 17; and ⅔ of request signals req2 sent from the DMA control section 2 (the scanner 12), the second lowest in the bus-occupancy rate, should be output to the bus-response control section 17. That is, when a total of bus-use rate directed to the DMA control sections 1 to 3 becomes higher, contents of the table data are changed such that access intervals for the DMA control sections 2 and 3 are still longer, wherein DMA control section 1 which is the highest in the bus-occupancy rate is excluded from the data change. The table-change section 160 does not work on the access control section 4 (CPU 14) and a DMA control section the highest in bus-occupancy rate (the DMA controller 1 corresponds to it herein).

Thereby, the highest priority for the DMA control section 1 remains, priority for the DMA control sections 2 and 3 substantially rank down, and priority for the access control section 4 ranks up instead, when bus-use rate of the DMA control sections 1 to 3 becomes higher and this makes a control change signal CHS active. Accordingly, even if requests from each of the control sections concentrate and this makes bus-use rate high, the access control section 4 ranking the lowest in the priority table can surely obtain bus-access time without affecting bus-access of the DMA control section 1 ranking the highest.

As described in detail, according to the DMA controller directed to the Fourth Embodiment, if a sum of the occupancy-rate Si to S3 calculated by the bus monitor 8 exceeds the predetermined threshold "50", a control change signal CHS becomes in active and the table change section 160 changes data contents of a priority table Tn (identical to the first table T1, in this embodiment). Therefore, when the bus-use rate gets high, the table-change section 160 makes the priority of the access control section 4, the lowest in Tn, substantially higher so that the CPU 14 can surely get access to the bus 5. That is, each of the DMA control sections 1 to 3 and the access control section 4 can appropriately get access to the bus 5.

The present embodiment is only an example and does not limit the present invention in any respect. Accordingly, the present invention can be variously improved and changed within the scope not departing the subject matter thereof. For example, the table-change section 160 for the DMA controller of the Fourth Embodiment changes data contents of the first table T1 in proportion to output times that the DMA control sections 2 and 3 generate their respective request signals req2 and,req3, however, data contents may be changed in accordance with length of interval between a request signal and the next signal for req2 and req3.

[Fifth Embodiment]

Next, a Fifth Embodiment will be described. A DMA controller directed to the Fifth Embodiment is basically structured the same as the DMA controllers directed to the First, Third, and Fourth Embodiments other than structure of a bus-use reconcilement section. Accordingly, descriptions for the same aspects as the First Embodiment will be omitted and only different aspects will be described in this Embodiment. For figures directed to this Embodiment, the same numerals are assigned to the parts structured the same as those of the First Embodiment.

The DMA controller of the Fifth Embodiment has a structure such that the bus-use reconcilement section 6 shown in FIG. 1 is replaced with a bus-use reconcilement section 206. That is, the DMA controller includes: a memory 7; DMA control sections 1, 2, and 3; an access control section 4; and a bus monitor section 8, wherein the DMA control sections 1 to 3 and the access control section 4 get access to the memory 7 through a common bus 5. The DMA controller further includes a bus-use reconcilement section 206 which reconciles pluralities of bus-access made by each of the DMA control sections and the access control section 4.

Figure 14:
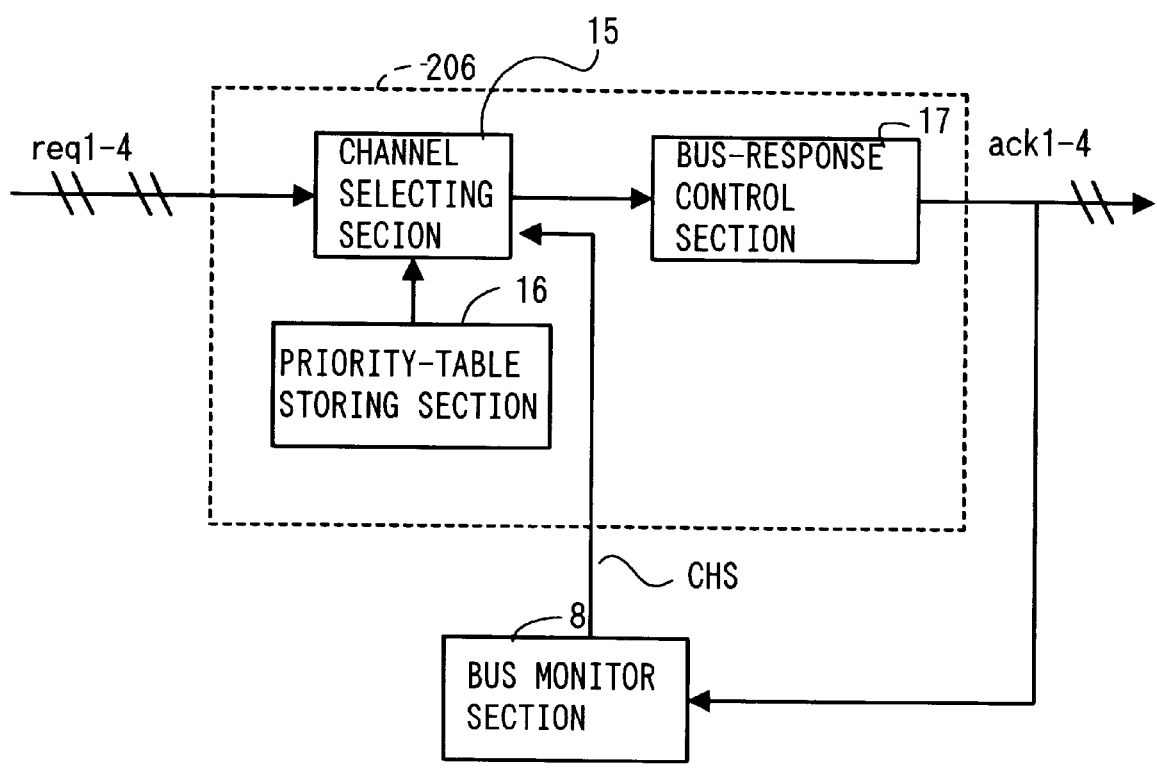
FIG. 14 is a block chart showing the structure of a bus-use reconcilement section for a DMA controller directed a fifth embodiment.

When the DMA control sections 1 to 3 and the access control section 4 generate their respective request signals req1, req2, req3, and req4, the bus-use reconcilement section 206 appropriately returns bus-use permission signals ack1, ack2, ack3, and ack4 to the DMA control sections 1 to 3 and the access control section 4, respectively. That is, as shown in FIG. 14, the bus-use reconcilement section 206 includes a channel selecting section 15 for receiving request signals req1 to req4 sent from respective control sections, a priority-table storing section 16 for storing a table used when determining priority for bus use reconcilement control, and a bus-response control section 17 for sending bus-use permission signals ack1, ack2, ack3, and ack4 to their respective control sections. While a bus-use permission signal sent from the bus-response control section 17 is in active, only a control section that receives its bus-use permission signal from the bus-response control section 17 can get access to the bus 5.

In case the DMA control sections 1 to 3 and the access control section 4 concurrently output their respective request signals req1, req2, req3, and req4, the bus-response control section 17 sends one of the bus-use permission signals ack1 to ack4 following a priority table (see FIG. 50) stored in the priority-table storing section 16. For priority ranking, the DMA control section 1 for the printer 11 and the control section 2 for the scanner 12 rank higher because they need real time processing on. The other hand, the DMA control section 3 for the hard disk 13 and the access control section 4 for the CPU 14 rank lower because they do not need real time processing.

Figure 15:
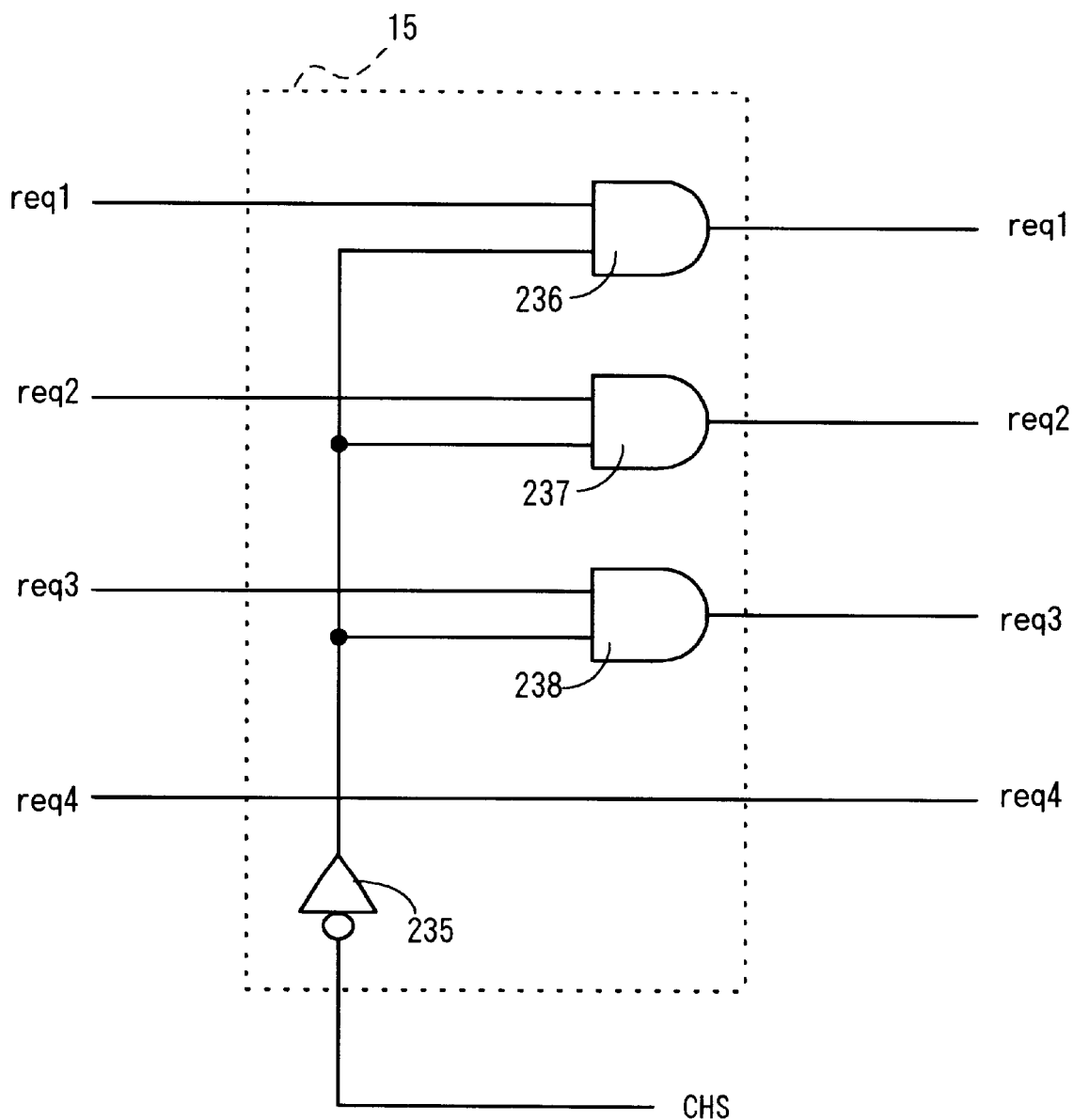
FIG. 15 is a circuit diagram showing structure of a channel-selecting section shown in FIG. 14.

As shown in FIG. 15, the channel selecting section 15 consists of a NOT-circuit 235, three AND-circuits 236, 237, and 238. That is, the channel selecting section 15 has request signals req1, req2, and req3 sent from their respective DMA control sections 1 to 3 and a control change signal CHS which has passed the NOT-circuit 235 get through the AND-circuits 236, 237, and 238, respectively, to output resultant request signals req1, req2, and req3. Thereby, request signals req1, req2, and req3 sent from their respective DMA control sections 1 to 3 are all cancelled while a control change signal CHS is in active. Therefore, in case the DMA control sections 1 to 3 and the access control section 4 send their respective request signals req1, req2, req3, and req4 concurrently and this makes bus-use rate high, the bus-use reconcilement section 206 accepts only the req4 from the access control section 4. As a result, the CPU 14 raking the lowest priority can use the bus 5 prior to the other devices. In connection, a control change signal CHS is sent from the bus monitor section 8.

Figure 16:
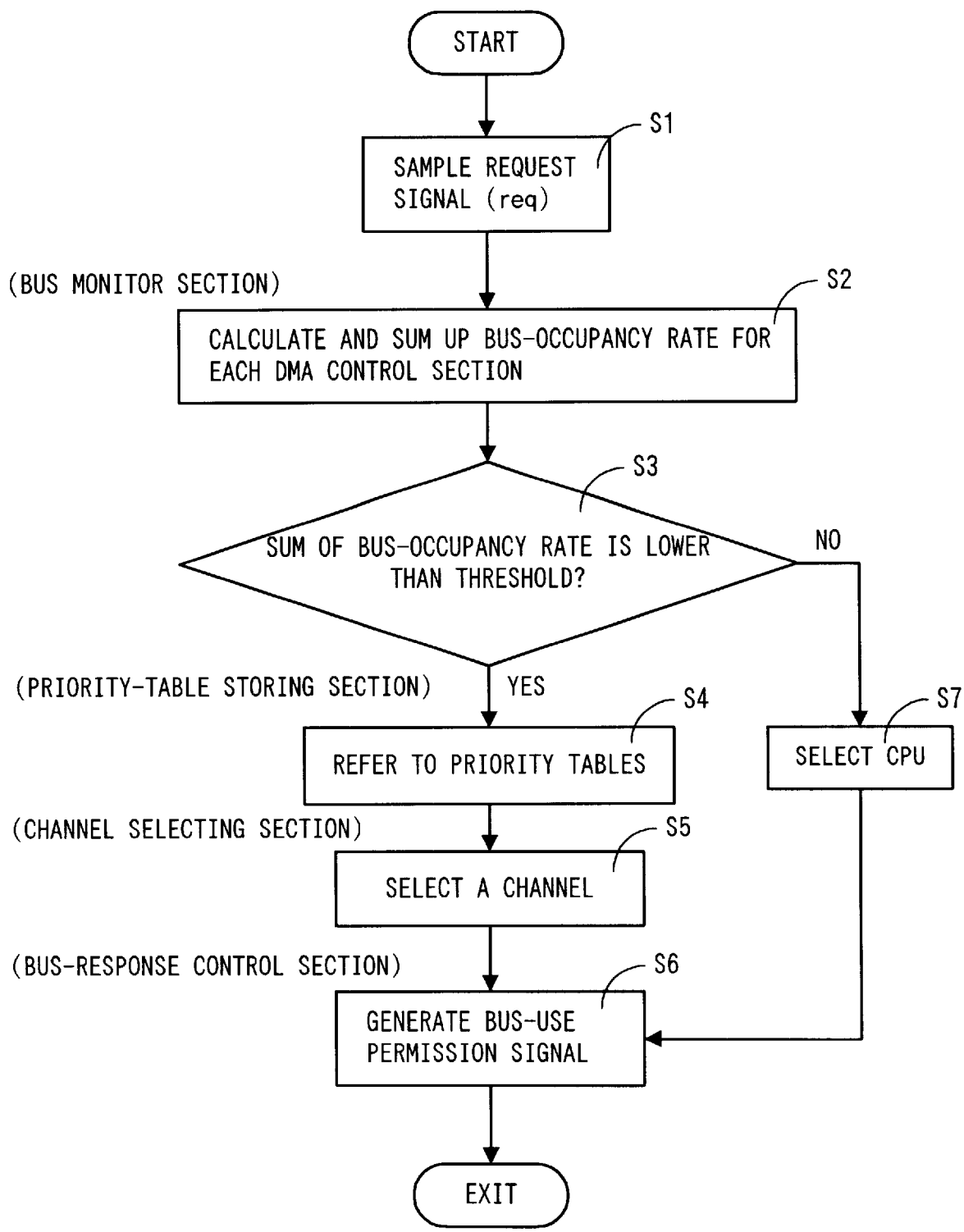
FIG. 16 is a flow chart showing routine of reconcilement control exercised in the bus-use reconcilement section.

Next, operation of the DMA controller directed to the Fifth Embodiment will be described by referring to a flow chart shown in FIG. 16. This flowchart shows routine of bus-use reconcilement control at the bus-use reconcilement section 206. Firstly, request signals req1 to req4 sent from their respective control sections are sampled (S1). A sum of bus-occupancy rate of the DMA control sections 1 to 3 is calculated at the bus monitor section 8 (S2). Next, it is determined whether the sum of bus-occupancy rate obtained in S2 is lower than the threshold "50" or not (S3). If the sum is lower than the threshold (S3: Yes), a channel to generate a bus-use permission signal is selected based on the priority table (see FIG. 50) stored in the priority-table storing section 16 (S5). After that, a bus-use permission signal is sent to the selected channel from the bus-response control section 17 (S6). Thereby, a control section which has received a bus-use permission signal gets access to the bus 5.

On the other hand, if the sum of bus-occupancy rate obtained in S2 exceeds the threshold (S3: No), only a control change signal CHS generated from the bus monitor section 8 is made active for a predetermined period. Accordingly, the channel selecting section 15 accepts only a request signal req4 sent from the access control section 4. Thereby, the CPU 14 is selected as a channel that should generate a bus-use permission signal (S7). After that, the bus-response control section 17 generates bus-use permission signal ack4 to the access control section 4. That is, the bus 5 is opened to the CPU 14 prior to other devices when a sum of bus-occupancy rate directed to the DMA control sections 1 to 3 gets higher and this may prevent the CPU 14 from getting access to the bus 5. Thereby, this avoids a situation that program for the entire system stops.

A predetermined period that the bus 5 is opened to the CPU 14 should be set to several msec per order. More specifically, the period should be set to between 40 and 50 msec at most, so as to avoid affecting processing for the printer 11 and scanner 12 both of which need real time processing.

Next, switching of inactive/active for the control change signal CHS will be described by referring to FIG. 5. Since the DMA controller of this embodiment operates the same as the DMA controller of the First Embodiment between time $t_0$ and time $t_3$, the operation of the specified time zone is omitted herein.

Bus-occupancy rate S1 to S3 obtained at $t_4$ is input in the adder 25. Then, the adder 25 outputs "90" as a sum of S1 to S3 and inputs the sum in the comparator 26. Since the comparator 26 determines that the sum exceeds the threshold "50", a control change signal CHS generated from the bus monitor section 8 to the bus-use reconcilement section 206 is made active (Hi). The channel selecting section 15 (see FIG. 15) cancels request signals req1 to req3, sent respectively from the DMA control sections 1 to 3, while the control change signal CHS is in active (Hi). This prohibits the printer 11, the scanner 12, and the hard disk 13 from getting access to the bus 5.

Thereby, the bus 5 is opened to the CPU 14 while a control change signal CHS is in active (Hi) since the channel selecting section accepts only a request signal req4 from the access control section 4. Accordingly, this avoids a situation that the CPU 14 cannot get access to the bus 5 and program stops.

Time lapses further on and the DMA controller of this embodiment operates the same as the DMA controller 10 of the First Embodiment between time $t_5$ and time $t_7$. After time $t_7$, each of the counters 21 to 23 counts signals. When an occupancy-rate setting signal SSS is sent to each of the DFFs 31 to 33, bus-occupancy rate S1 to S3 for their respective DMA control sections are calculated. In case a sum of bus-occupancy rate S1 to S3 exceed the threshold, the bus-reconcilement section 206 opens the bus 5 for the CPU 14.

As described in detail, according to the DMA controller directed to the Fifth Embodiment, the bus monitor section 8 calculates bus-occupancy rate S1 to S3 for the DMA control sections 1 to 3, respectively, based on how many times each of the DMA control sections 1 to 3 connected to the bus 5 sends their respective bus-use permission signals ack1 to ack3 to the bus 5. Furthermore, if a sum of the occupancy-rate S1 to S3 exceeds the predetermined threshold, a control change signal CHS sent from the bus monitor section 8 to the channel control section 15 becomes in active. Then, the request signals req1 to req3 respectively sent from their respective DMA control sections are cancelled at the channel selecting section 15. Since only a request signal req4 from the access control section 4 is accepted, bus-use permission signal ack4 is sent back by the bus-response control section 17. Thereby, the CPU 14 can surely get access to the bus 5 even if bus-use rate becomes higher.

The present embodiment is only an example and does not limit the present invention in any respect. Accordingly, the present invention can be variously improved and changed within the scope not departing the subject matter thereof. For example, the channel selecting section 15 for the Fifth Embodiment is integrated into the bus-use reconcilement section 206, however, the channel selecting section 15 may be integrated into each of the DMA control sections 1 to 3, or may be disposed between each of the DMA control sections 1 to 3 and the bus-use reconcilement section 206.

Furthermore, in the foregoing described First to Fifth Embodiments, if a summed bus-occupancy rate directed to the DMA control sections 1 to 3 is not required, bus-occupancy rate of the access control section 4 may be calculated so that bus-use reconcilement control can be changed based on the bus-occupancy rate of the access control section 4. Still further, bus-use reconcilement control at the bus-use reconcilement section may be changed based on either logical OR of bus-use permission signals ack1 to ack3 every predetermined period or that of regional signals R1 to R3.

[Sixth Embodiment]

Next, a Sixth Embodiment will be described. A DMA controller directed to the Sixth Embodiment includes a bus monitor section different from the one directed to the First to Fifth Embodiments. That is, the bus monitor section for the Sixth Embodiment detects operation-state of each of control sections whereas the one for the other Embodiments calculates bus-occupancy rate. Furthermore, structure of a bus-use reconcilement section and bus-use reconcilement control system for this Embodiment differ from the other Embodiments. For figures directed to this Embodiment, the same numerals are assigned to the parts structured the same as those of the above-specified Embodiments.

Figure 17:
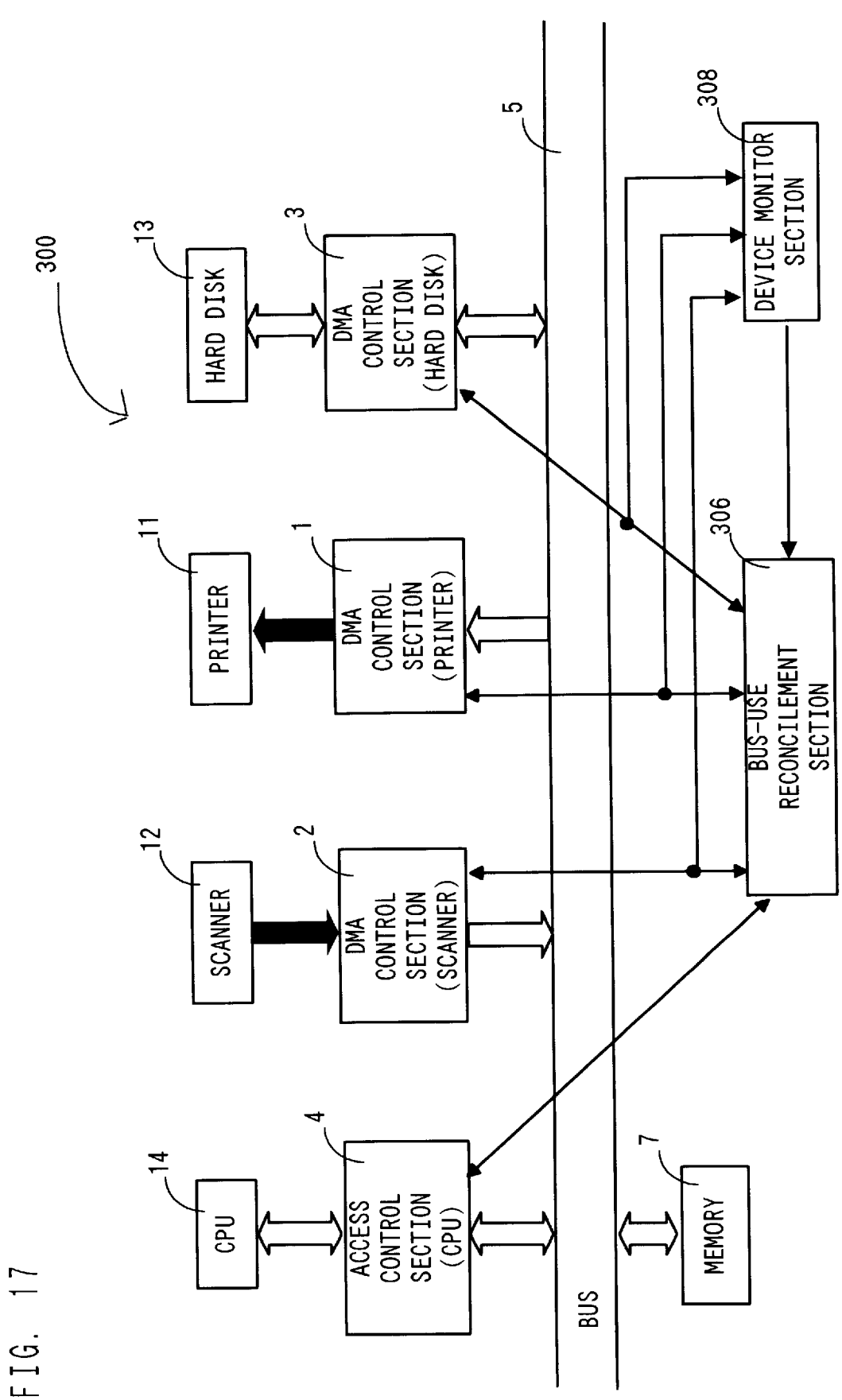
FIG. 17 is a schematic diagram of a DMA controller directed to a sixth embodiment.

As shown in FIG. 17, a DMA controller 300 includes: a memory 7; DMA control sections 1, 2, and 3; an access control section 4; and a device monitor section 308, wherein the DMA control sections 1 to 3 and the access control section 4 get access to the memory 7 through a common bus 5. The DMA controller 300 further includes a bus-use reconcilement section 306 which reconciles pluralities of bus-access made by each of the DMA control sections and the access control section 4 in accordance with a detection result obtained by the device monitor section 308. The device monitor section 308 detects access state with respect to each of the DMA controllers 1 to 3.

Figure 18:
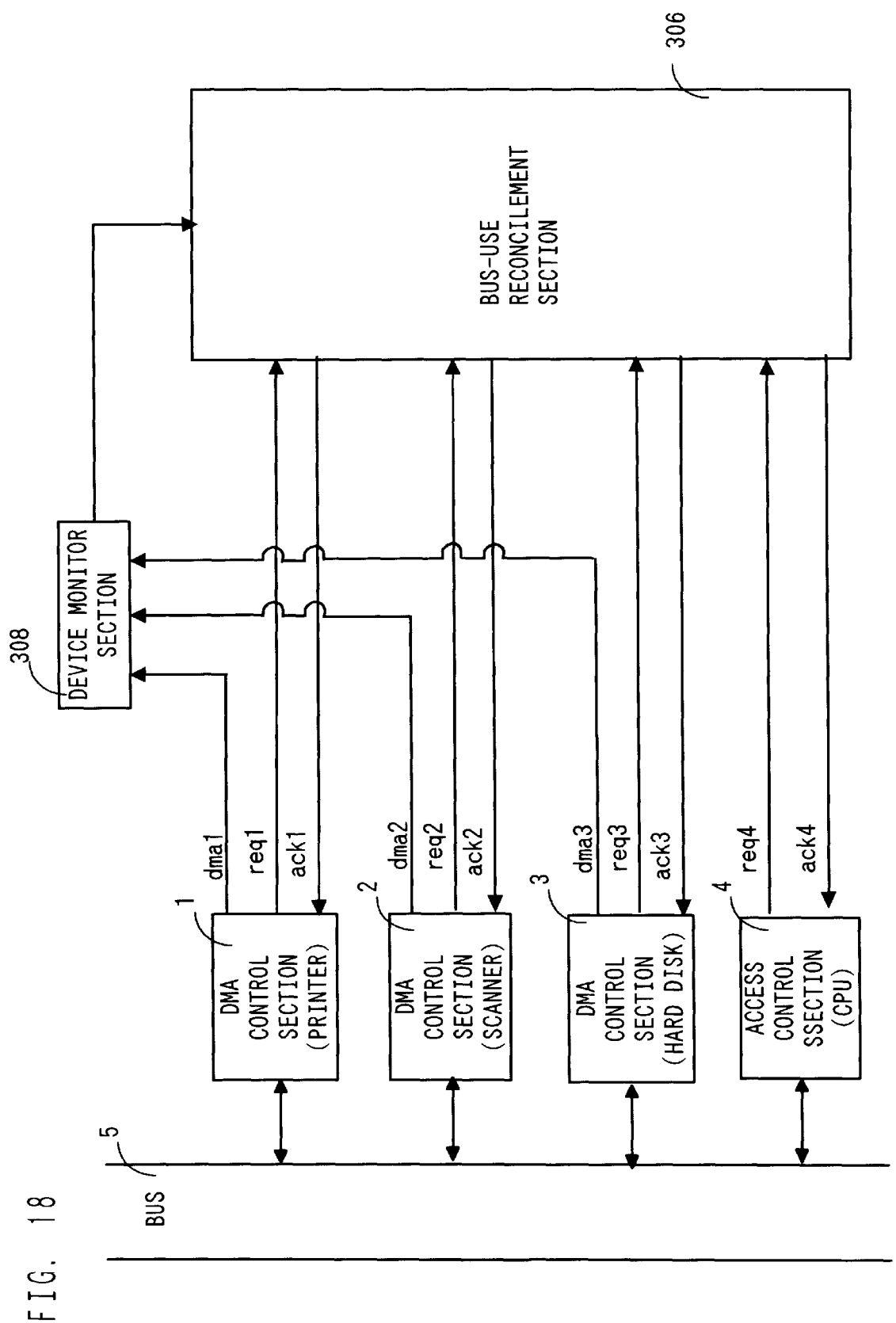
FIG. 18 is a diagram to explain the operation of a bus-use reconcilement section and a device monitor section shown in FIG. 17.
Figure 19:
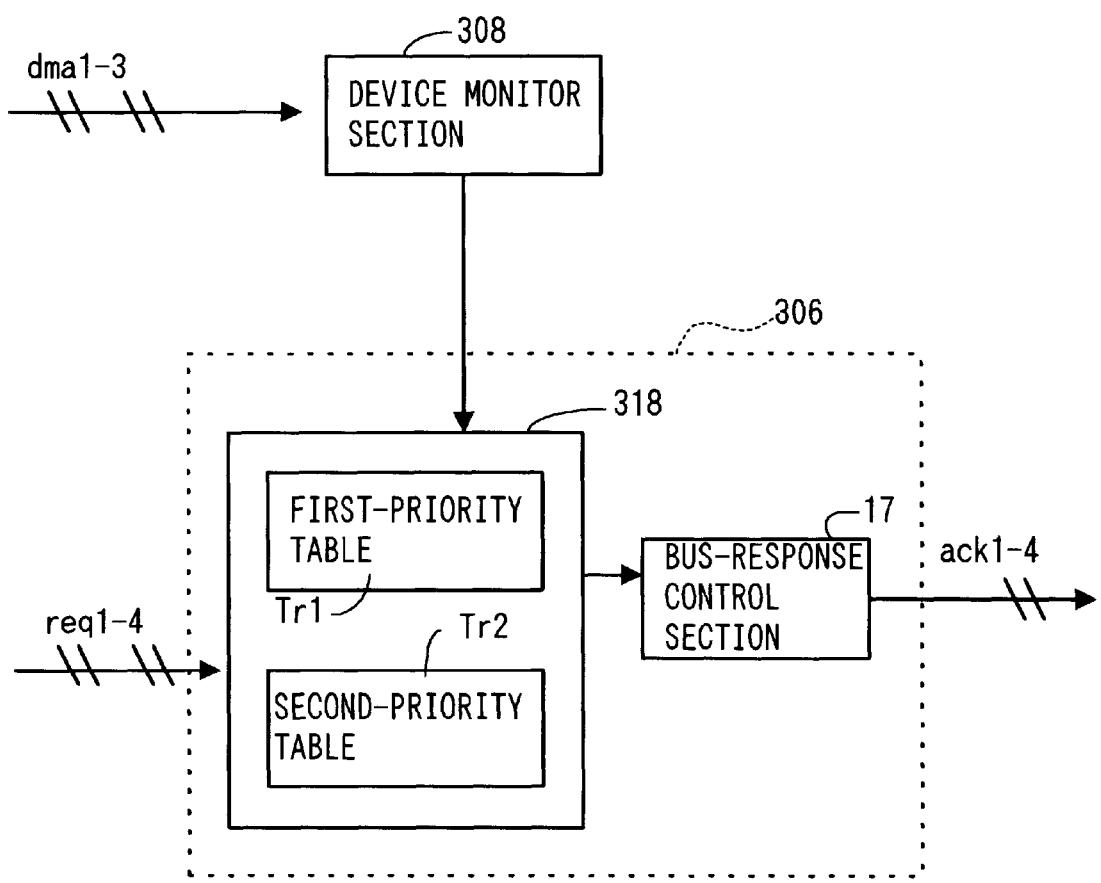
FIG. 19 is a block diagram showing the structure of a bus-use reconcilement section shown in FIG. 17.

As shown in FIG. 18, when the DMA control sections 1 to 3 and the access control section 4 generate their respective request signals req1, req2, req3, and req4, the bus-use reconcilement section 306 appropriately returns bus-use permission signals ack1, ack2, ack3, and ack4 to the DMA control sections 1 to 3 and the access control section 4, respectively. While those bus-use permission signals are in active, only control sections that receive their bus-use permission signal from the bus-use reconcilement section 306 can get access to the bus 5. A control section getting access to the bus 5 is designed to send a DMA-processing signal dma to the device monitor section 308. As shown in FIG. 19, the bus-use reconcilement section 306 includes a priority-table selecting section 318 which selects a suitable priority table in accordance with operation state of the DMA control section 1 to 3 and processes request signals req1 to 4, and a bus-response control section 17 for sending bus-use permission signals ack1 to 4.

The priority-table selecting section 318 selects one of the priority tables (two tables in this embodiment) previously stored therein in accordance with a detection result obtained by the device monitor section 308. A priority table is selected in accordance with a selection table Tcr shown in FIG. 20. For example, when the printer 11 (DMA control section 1) is in operation, the priority-table selecting section 318 selects a second-priority table Tr2.

The priority-table selecting section 318 stores priority tables as shown in FIG. 21. That is, a first-priority table Tr1 stores the same contents as the priority table (from the highest priority, DMA control section 1, DMA control section 2, DMA control section 3, access control section 4) used in the conventional DMA controller 100. The contents stored in a second-priority table Tr2 is such that, from the highest, DMA control section 1, DMA control section 2, access control section 4, DMA control section 3.

The device monitor section 308 detects operation-state of the DMA control sections 1 to 3 in accordance with DMA processing signals dma1 to dma3 sent from their respective DMA control sections. Operation-state herein means combination of DMA control sections getting access to the bus 5. While a DMA-processing signal generated from a DMA control section is in active, it is regarded the device directed to the signal is in operation, in other words, the DMA control section directed to the device is in operation, or getting access to the bus 5 and exercising DMA processing. Thereby, the device monitor section 308 detects operation-state for each of the DMA control sections. Specifically, the device monitor section 308 detects such four combination patterns of operation-state as shown in FIG. 20, namely, pattern 1: the printer 11 and the scanner 12 are in operation, pattern 2: the printer 11 is in operation, pattern 3: the scanner 12 is in operation, and pattern 4: any combinations other than the above three combination patterns.

Figure 22:
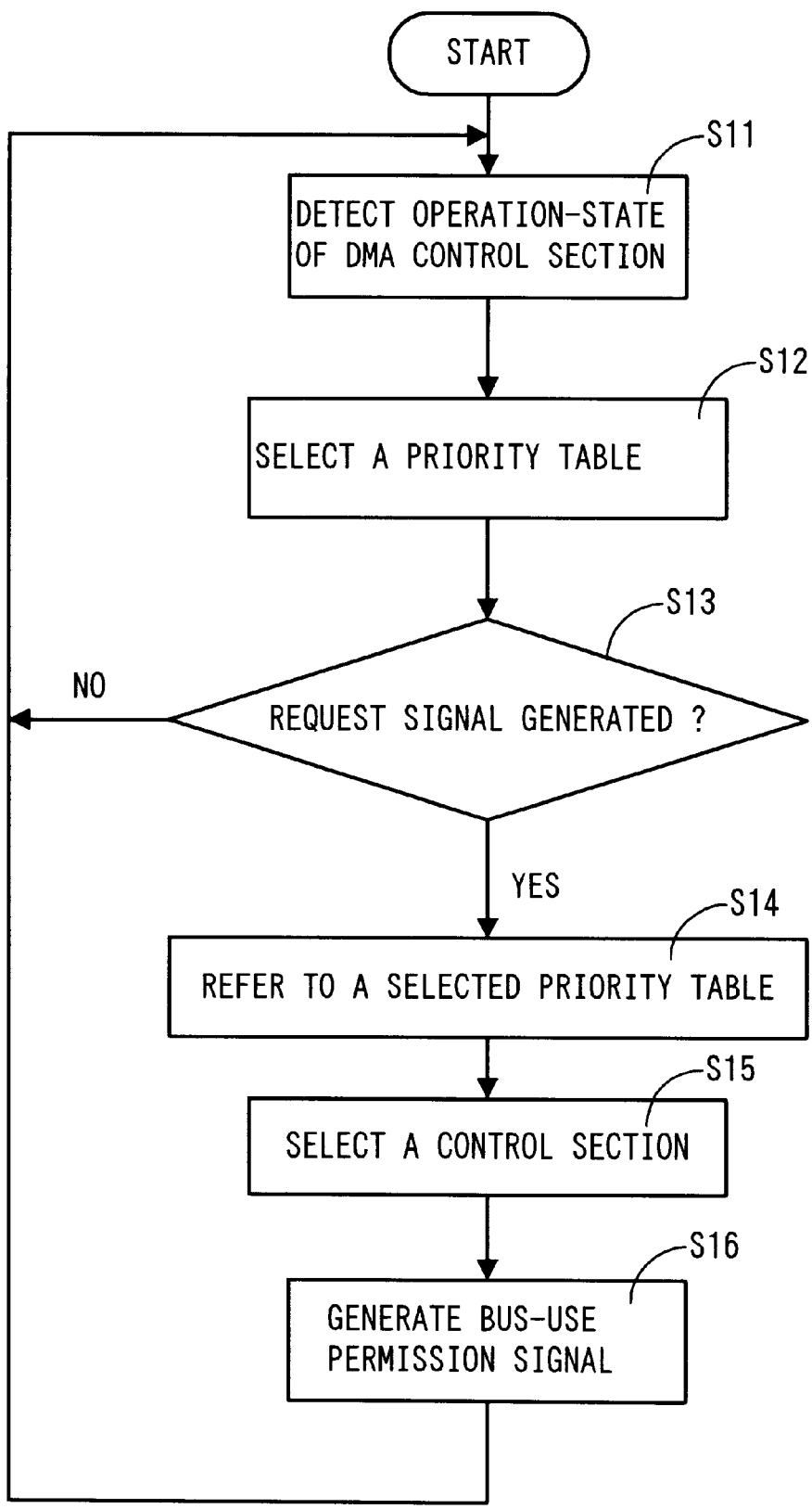
FIG. 22 is a flow chart showing routine of reconcilement control exercised in the bus-use reconcilement section.

Next, operation of the DMA controller 300 having such a structure as the above will be described by referring to a flow chart shown in FIG. 22. This flow chart shows routine of bus-use reconcilement exercised in the bus-use reconcilement section 306. Firstly, the device monitor section 308 detects operation-state of the DMA control sections 1 to 3 in S11. That is, operation-state of each device is determined in accordance with state (active/inactive) of the DMA-processing signals dma1–3 generated from their respective DMA control sections 1 to 3.

Next, in S12, the priority-table selecting section 318 selects an appropriate priority table from the selection table Tcr (see FIG. 20) for bus-use reconcilement control in accordance with a detection result obtained by the device monitor section 308. Then, in S13, it is determined whether a request signal is generated or not. If a request signal is generated (S13: Yes), processing goes onto S14. If no request signal is generated (S13: No), processing goes back to S11 and repeats the three steps S11 to S13.

If a request signal is generated in S13 and the processing goes on to S14, bus-use reconcilement is executed in accordance with the priority table selected by the priority-table selecting section 318 in S14. Subsequently, control section (s) to receive bus-use permission signal(s) is selected in S15. Then, in S16, the bus-response control section 17 sends bus-use permission signal(s) to the control section(s) selected in S15. Hence, the control section(s) which has received the bus-use permission signal gets access to the bus 5. Afterward, processing repeats steps S11 to S16.

Thus, in the bus-use reconcilement section 306, a priority table for bus-use reconcilement is selected in accordance with operation-state of the DMA control section 103 and pluralities of bus-access to be made in reply to request signals req1 to 4 are reconciled along with the selected priority table. That is, appropriate bus-use reconcilement is exercised to meet operation-state of the DMA control sections 1 to 3.

As described in detail, as for the DMA controller 300 directed to the Sixth Embodiment, the device monitor section 308 detects operation-state of the DMA control sections 1 to 3 based on DMA processing signals dma1 to 3. The priority-table selecting section 318 selects an appropriate priority table in accordance with a detection result obtained by the device monitor section 308. Thereby, appropriate bus-use reconcilement is exercised to meet operation-state of the DMA control sections 1 to 3. Accordingly, bus-occupation by the DMA control sections 1 to 3 is avoided and the CPU 14 can obtain necessary access time. Thereby, this manner of bus-use reconcilement surely prevents system program from stopping.

The present embodiment is only an example and does not limit the present invention in any respect. Accordingly, the present invention can be variously improved and changed within the scope not departing the subject matter thereof. For example, the device monitor section 308 for the Sixth Embodiment is provided independent of other sections, however, the device monitor section 308 may be integrated into the bus-use reconcilement section 306 or 356. Furthermore, the device monitor section 308 detects operation-state of the DMA control sections 1 to 3 based on their respective DMA processing signals dma1 to dma3 in this embodiment, however, the device monitor section 308 may detect operation-state based on bus-use permission signal ack1 to ack3 sent to their respective DMA control sections. Thereby, the number of signals each of the DMA control sections 1 to 3 sends can be reduced.

[Seventh Embodiment]

Figure 23:
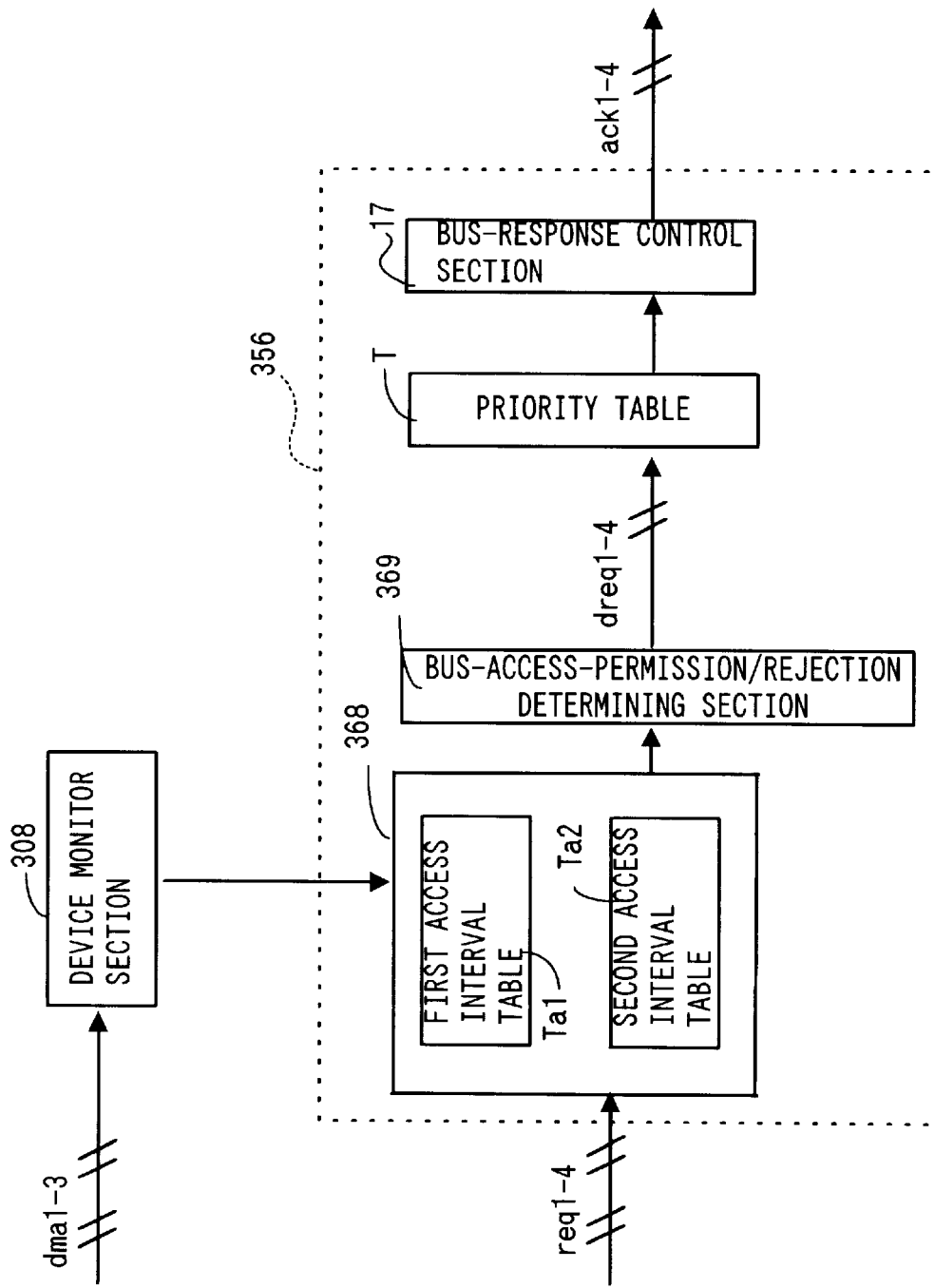
FIG. 23 is a block chart showing the structure of a bus-use reconcilement section for a DMA controller directed a seventh embodiment.

Next, a Seventh Embodiment will be described. A DMA controller directed to the Seventh Embodiment is basically structured the same as the DMA controller 300 directed to the Sixth Embodiment. However, as shown in FIG. 23, a bus-use reconcilement section 356 for this Embodiment includes an access-interval-table selecting section 368. That is, the access-interval-table selecting section 368 delays acceptance of request signals req1 to 3 sent from each of the DMA control sections 1 to 3. Accordingly, descriptions for the same aspects as the Sixth Embodiment will be omitted and only different aspects, especially, the access-interval-table selecting section 368, will be described in this Embodiment. For figures directed to this Embodiment, the same numerals are assigned to the parts structured the same as those of the Sixth Embodiment.

As shown in FIG. 23, the bus-use reconcilement section 356 includes the access-interval-table selecting section 368 for selecting an access interval table, a bus-access-permission/rejection determining section 369 for delaying acceptance of request signals req1 to req4, a priority table T for controlling and reconciling delay request signals req1 to req4, and a bus-response control section 17 for sending bus-use permission signals ack1 to ack4 to their respective control sections, and exercises bus-use reconcilement control in accordance with a detection result obtained by a device monitor section 308.

The access-interval-table selecting section 368 selects one of the access interval tables previously stored (two tables are stored in this embodiment) in accordance with a detection result obtained by a device monitor section 308. A priority table is selected in accordance with a selection table Tca as shown in FIG. 24. For example, when the scanner 12 (DMA control section 2) is in operation, the access-interval-table selecting section 368 selects a first access interval table Ta1.

The access-interval-table selecting section 368 stores access-interval tables as shown in FIG. 25. That is, the first access interval table Ta1 stores minimum-access-interval-time data: 2000 nsec for request signal req1, 3000 nsec for req2, and 5000 nsec for req3. The second access interval table Ta2 stores minimum-access-interval-time data: 2000 nsec for request signal req1, 3000 nsec for req2, and 50000 nsec for req3. Accordingly, when the second access interval table Ta2 is selected, bus-access interval for the hard disk 13 (DMA control section 3) is longer than the one for the first access interval table Ta1 (longer than ten times of the interval stored in the first access interval table Ta1). Acceptance of req4 from the CPU 14 (access control section 4) is not delayed. The priority table T used for bus-use reconcilement control is identical to the priority table stored in the conventional DMA controller 100 (see FIG. 50).

A bus-access-permission/rejection determining section 369 delays acceptance of request signals req1 to req4 sent from their respective control sections in accordance with an access interval table selected by the access-interval-table selecting section 368, and sends delay request signals req1 to req4. Since acceptance of request signals req1 to req4 are delayed by the bus-access-permission/rejection determining section 369, access intervals among the control sections are adjusted.

Figure 26:
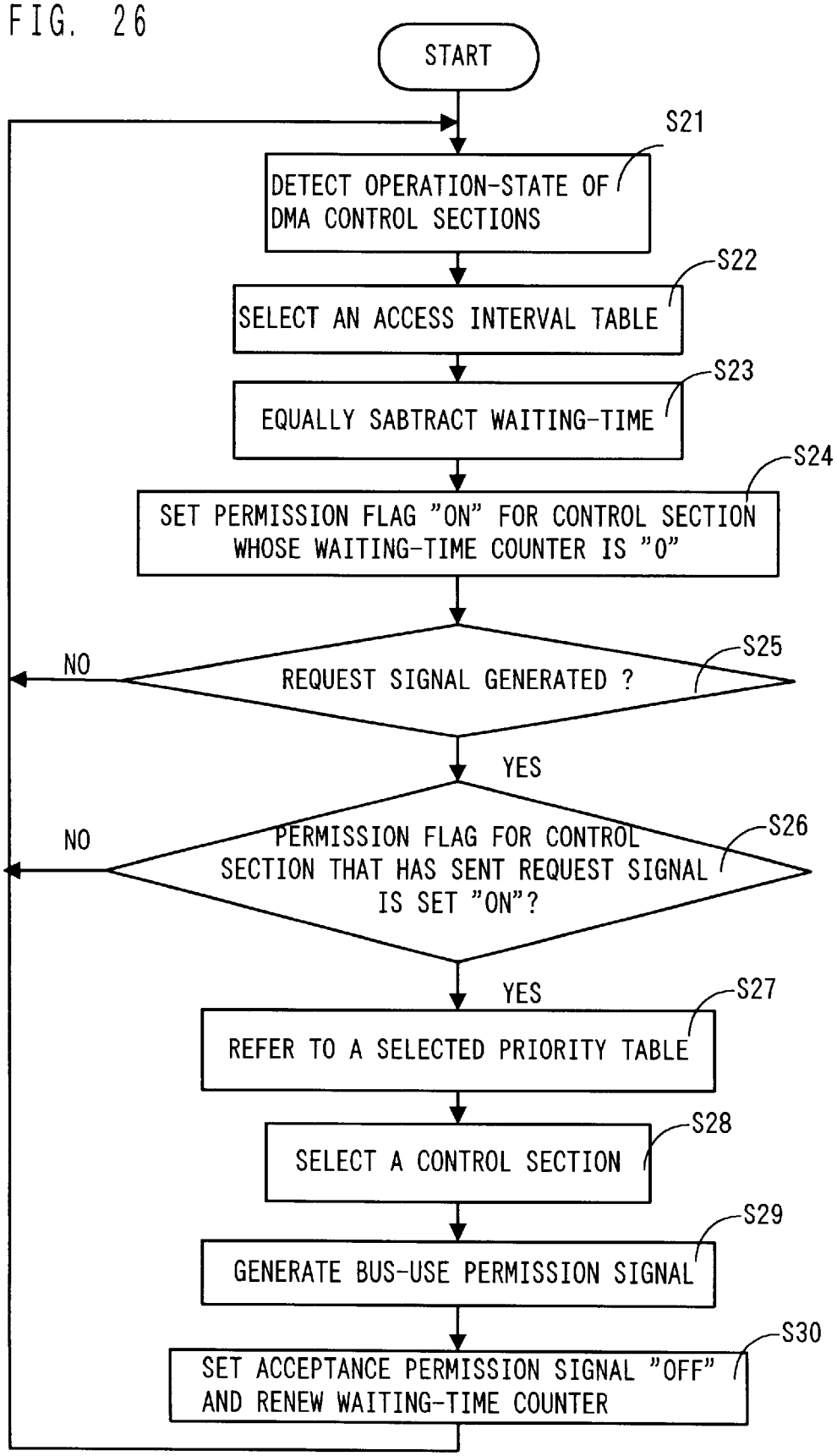
FIG. 26 is a flow chart showing routine of reconcilement control exercised in a bus-use reconcilement section.

Next, operation of the DMA controller having such a structure as the above will be described by referring to a flow chart shown in FIG. 26. This flow chart shows routine of bus-use reconcilement in the bus-use reconcilement section 356. The DMA controller directed to this embodiment includes a waiting-time counter which counts delayed time of request acceptance with respect to each control section so as to adjust access interval among the control sections.

Firstly, the device monitor section 308 detects operation-state of the DMA control sections 1 to 3 in S21. That is, combination of devices in operation-state is determined by state (active/inactive)of DMA processing signals dma1 to dma3 sent by the DMA control sections 1 to 3, respectively.

Next, the access-interval-table selecting section 368 selects an appropriate access interval table stored in the selection table Tca (FIG. 24) in S22. Then, access interval time recorded in the selected access interval table is written on the waiting-time counter. Waiting time value is written on the counter only when processing enters step S22 for the first cycle of processing. In the following cycles, processing is exercised as follows. When an access interval table the same as the one selected in the preceding cycle is selected, i.e., access interval tables are not changed, waiting time value written on the counter is not changed. On the other hand, when an access interval table different from the one selected in the preceding cycle is selected, i.e., access interval tables are changed, access-interval-time difference between this cycle and the preceding cycle is added to waiting time value written on the counter.

More specifically, when the access interval tables are changed from Ta1 to Ta2, a value "45000"(=50000−5000) is added to a waiting-time counter directed to the DMA control section 3 (hard disk 13). Vice versa, when the tables are changed from Ta2 to Ta1, a value "−45000"(=5000−50000) is added to a waiting-time counter directed to the DMA control section 3 (hard disk 13). Although processing similar to the above is exercised for other control sections, waiting-time values recorded on their respective counters do not change because their access interval data stored on Ta1 and Ta2 do not differ, whereby waiting-time values recorded in the counters do not change.

Next, waiting-time values in their respective counters are equally subtracted in S23. However, if a waiting-time value subject to subtraction is "0", this value is excluded from the subject of subtraction. If a waiting-time counter for a certain control section indicates "0", a permission flag for the control section is set "on" in S24. Then, whether a request signal is generated or not is checked in S25. If a request signal is generated (S25: Yes), the processing goes on to S26. If not generated (S25: No), the processing goes back to S21 and repeats steps S21 to S25.

If a request signal is generated in S25, the processing goes on to S26. In S26, the bus-access-permission/rejection determining section 369 determines whether a control section generates a request signal or not and a permission flag of the control section is set "on" or not. If a permission signal is set "on"(S26; Yes), reconcilement control in S27 and the following steps are executed. If all of the permission flags for the control sections generating request signals are set "off" (S26: No), the processing goes back to S21.and repeats steps S21 to S26.

After that, the priority table T is referred to in S27. Then, bus-use reconcilement control is exercised in accordance with the priority table T and a control section to receive bus-use permission is selected in S28. Consequently, the bus-response control section 17 sends a bus-use permission signal to the control section selected in S28. Thereby, the control section which has received the bus-use permission signal gets access to the bus 5. Once the selected control section gets access to the bus 5, permission flag directed to its control section is set "off" in S30. Furthermore, as for the control section whose permission signal is set "off", the value written on the waiting-time counter for the corresponding control section is renewed. That is, data recorded in an access interval table is written and renewed. After that, processing repeats steps S21 to S30.

Thus, the bus-use reconcilement section 356 delays acceptance of request signals req1 to req3 sent from their respective DMA control sections 1 to 3 in accordance with operational conditions of the control sections 1 to 3. For example, in case the printer 11, scanner 12, and hard disk 13 are all getting access to the bus 5 and this makes bus-occupancy rate high, the second access interval table Ta2 is picked and acceptance of request signals is delayed. Thereby, the DMA controller considerably delays acceptance of request signals from the hard disk 13 (DMA control section 3).

That is, since access interval is switched to 50000 nsec from 5000 nsec, access interval for the hard disk 13 becomes longer by the ten times or more. Accordingly, priority for the DMA control section 3 substantially ranks down whereas the access control section 4 substantially ranks up. Therefore, even when bus-occupancy rate is high, the CPU 14 can surely get access to the bus 5. That is, bus-use reconcilement control is appropriately exercised in accordance with operational conditions of the DMA control sections 1 to 3, whereby each of the control sections can obtain appropriate length of bus-access time.

As described in detail, in the DMA controller directed to the Seventh Embodiment, the device monitor section 308 detects operation-state of the DMA control sections 1 to 3 based on DMA processing signals dma1 to dma3. Then, the access-interval-table selecting section 368 selects an appropriate access interval table along with a detection result obtained by the device monitor section 308. Next, the bus-access-permission/rejection determining section 369 delays acceptance of request signals req1 to req4 based on the access interval table selected by the access-interval-table selecting section 368. Then, in response to delay request signals req1 to req4 indicating delay of request signal acceptance, bus-use reconcilement control is exercised in accordance with the priority table T. That is, since bus-use reconcilement control is appropriately exercised in accordance with operational conditions of the DMA control sections 1 to 3, bus-occupancy by the DMA control sections 1 to 3 is avoided and bus-access time needed for the CPU 14 is obtained. Thereby, this manner of bus-use reconcilement surely prevents system program from stopping.

The present embodiment is only an example and does not limit the present invention in any respect. Accordingly, the present invention can be variously improved and changed within the scope not departing the subject matter thereof. For example, the device monitor section 308 for the Seventh Embodiment can be integrated into the bus-use reconcilement section 356. Further, the DMA controller for the Seventh Embodiment has only one priority table, however, the controller may have a plurality of different priority tables and select one of the table in accordance with operation-state of the DMA control sections 1 to 3, similar to the Sixth Embodiment.

[Eighth Embodiment]

Next, an Eighth Embodiment will be described. A DMA controller directed to the Eighth Embodiment is basically structured the same as the DMA controller directed to the foregoing Embodiments other than transfer method control of DMA transfer. Accordingly, descriptions for the same aspects as the foregoing Embodiments will be omitted and only different aspects will be described in this Embodiment. For figures directed to this Embodiment, the same numerals are assigned to the parts structured the same as those of the foregoing Embodiments.

Figure 27:
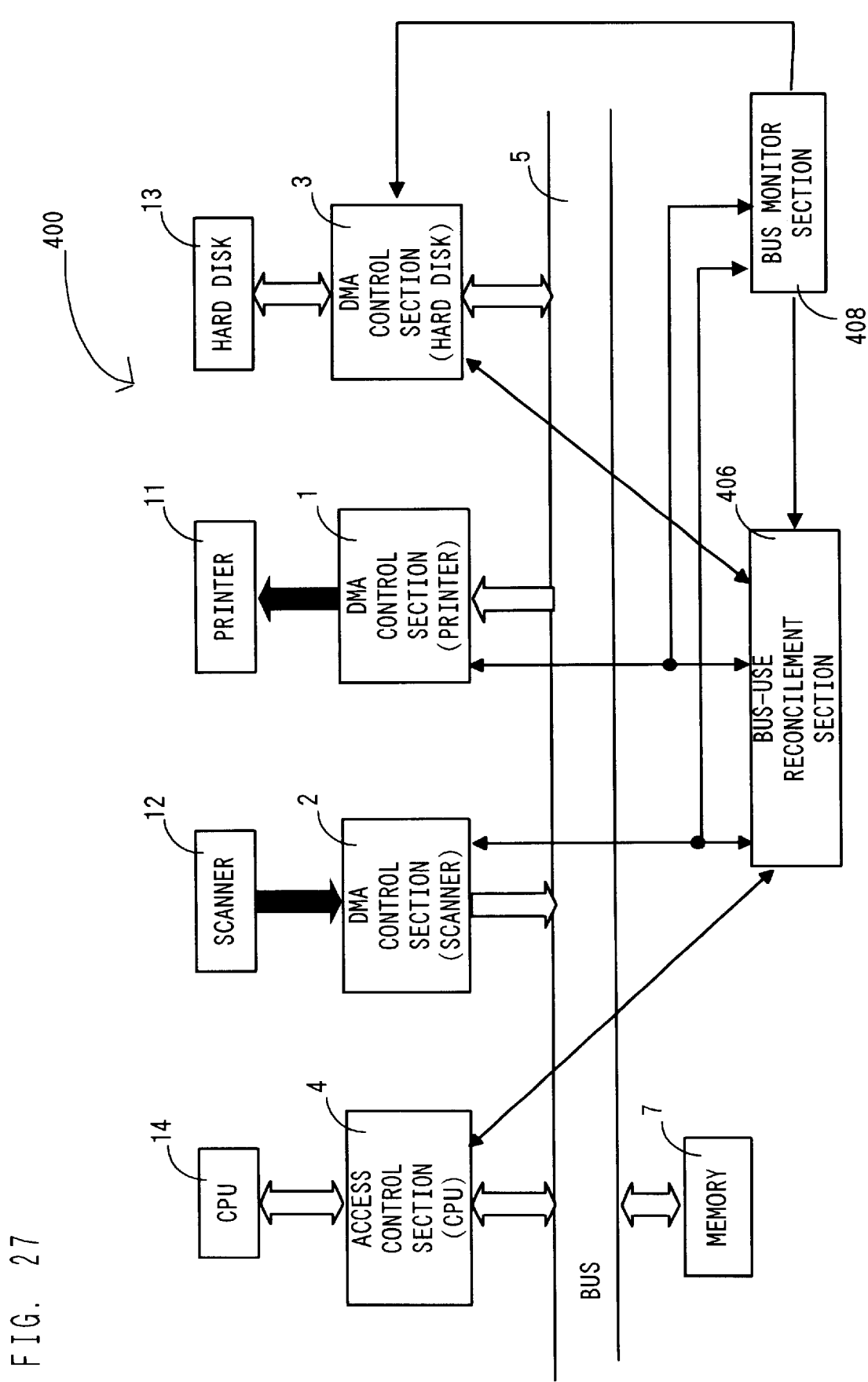
FIG. 27 is a schematic diagram of a DMA controller directed to an eighth embodiment.

As shown in FIG. 27, a DMA controller 400 includes: a memory 7; DMA control sections 1, 2, and 3; an access control section 4; and a bus monitor section 408, wherein the DMA control sections 1 to 3 and the access control section 4 get access to the memory 7 through a common bus 5. The DMA controller 400 further includes a bus-use reconcilement section 406 which reconciles pluralities of bus-access made by each of the DMA control sections and the access control section 4. The bus monitor section 408 detects bus-use state with respect to each of the control sections 1 to 4.

As shown in FIG. 28, when the DMA control sections 1 to 3 and the access control section 4 generate their respective request signals req1, req2, req3, and req4, the bus-use reconcilement section 406 appropriately returns bus-use permission signals ack1, ack2, ack3, and ack4 to the DMA control sections 1 to 3 and the access control section 4, respectively. When request signals req1, req2, req3, and req4 are concurrently sent from their respective control sections, any one of the bus-use permission signals ack1, ack2, ack3, and ack4 is sent back in accordance with the priority table (see FIG. 50), similar to the conventional DMA controller.

The bus monitor section 408 detects operation-state with respect to the printer 11 and the scanner 23 both of which require real time processing. That is, as shown in FIG. 28, the bus monitor section 408 counts active period of bus-use permission signals ack1 and ack2 sent from the bus-use reconcilement section 406. Then, the bus monitor section 408 sends a DMA-transfer-method changing signal CHT to the DMA control section 3.

Figure 29:
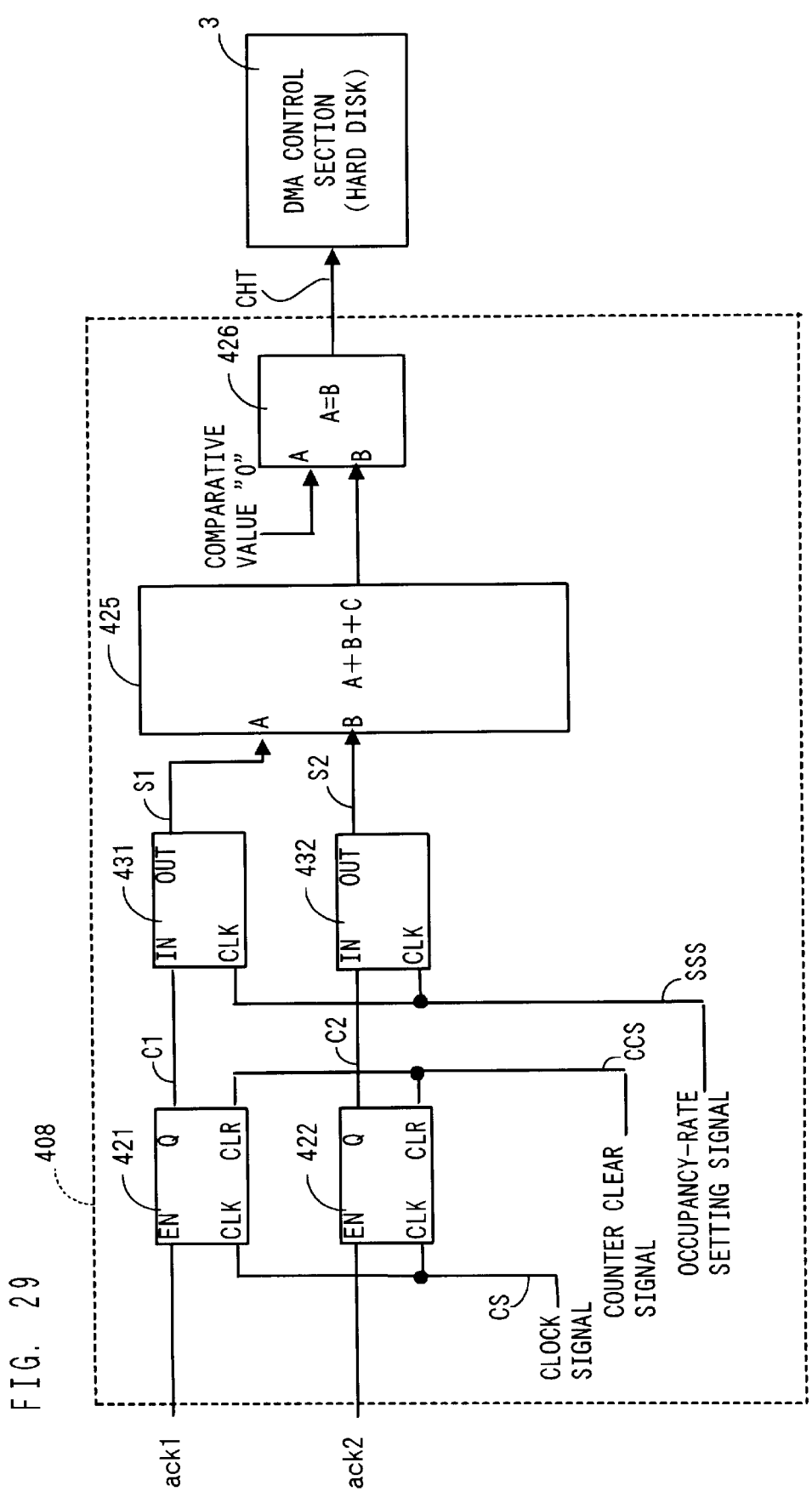
FIG. 29 is a block diagram showing the structure of a bus monitor section shown in FIG. 27.

As shown in FIG. 29, the bus monitor section 408 includes counters 421, and 422, DFFs 431, and 432, an adder 425, and a comparator 426. As for the counter 421, a bus-use permission signal ack1 comes into a terminal EN, a clock signal CS comes into a terminal CLK, and a counter-clear signal CCS comes into a terminal CLR. On the other hand, C1, a count value, goes out from a terminal Q for the counter 421, and comes into a terminal IN for the DFF 431. Further, as for the DFF 431, an occupancy-rate setting signal SSS comes into a terminal CLK and occupancy rate S1 goes out from a terminal OUT, and then, the occupancy rate Si is input in the adder 425.

When a clock signal CS input in the terminal CLK for the counter 421 starts up, the counter 421 counts the signal if a bus-use permission signal ack1 which has come in the terminal EN is in active. Then, the counter 421 outputs C1, a count value of the signal, from the terminal Q and C1 reaches the terminal IN for the DFF 431. Once a counter-clear signal CCS generated in every predetermined period is sent to the terminal CLK for the counter 421, the count value C1 is reset. The counter 422 operates the same as the counter 421.

When an occupancy-rate setting signal SSS generated every predetermined period is sent to the terminal CLK for the DFF 431, the DFF 431 outputs the count value C1 sent by the counter 421 from the terminal OUT for the counter 421. That is, the DFF 431 calculates generation rate of bus-use permission signal ack1 within an input period of the occupancy-rate setting signal SSS, in other words, bus-use rate of the DMA control section 1. The DFF 432 also operates the same as the DFF 431: DFF 432 calculates bus-use rate of DMA control section 2. All of the clock signal CS, counter-clear signal CCS, and occupancy-rate setting signal SSS are generated in the bus monitor section 408.

The adder 425 sums up bus-occupancy rate S1 and S2 calculated by DFF 431 and 432, respectively. The comparator 426 compares a sum obtained by the adder 425 and a comparative value (the comparative value is set to "0" in this embodiment). If the sum is equal to the comparative value, the comparator 426 makes a DMA-transfer-method changing signal input in the DMA control section 3 active.

Figure 30:
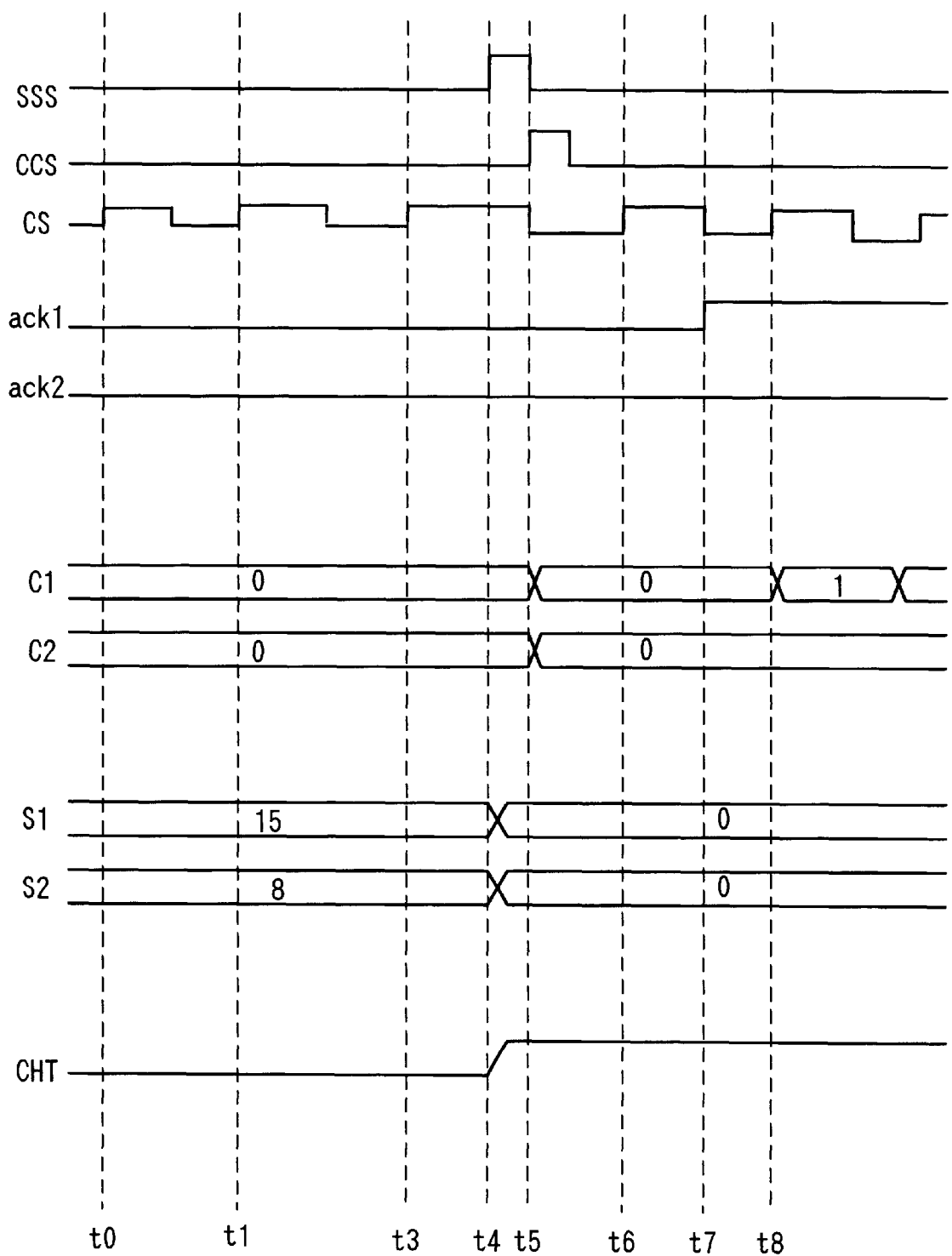
FIG. 30 is a timing chart showing states of respective signals.

Next, switching of state (active/inactive) with respect to the DMA-transfer-method changing signal CHS will be described by referring to FIG. 30 showing a timing chart. In this embodiment, both an occupancy-rate setting signal SSS and a counter-clear signal CCS are generated every 100 $\mu$sec. Immediately after an occupancy-rate setting signal SSS is generated (125 nsec later), a counter-clear signal CCS is generated. A period of clock signal CS is set to 1 $\mu$sec and the following relationship is satisfied:

(clock signal CS)×100=(occupancy-rate setting signal SSS).

Before time $t_0$, both count values C1 and C2 are "0". As to bus-occupancy rate S1 for the DMA control section 1 and S2 for the section 2, "15" and "8" have been input in the adder 425. This means those respective values were read-out when an occupancy-rate setting signal SSS was last generated. Accordingly, the adder 425 summed up those two values and output "23" as a result. Although the value "23" has been input in the comparator 426, a control change signal CHS at time $t_0$ is in inactive (Lo) because the value "23" does not equal to the comparative value "0". Subsequently, the bus monitor section 408 determines that a device that needs real time processing now operates. Therefore, DMA-transfer-method changing signal CHS is set inactive (Lo). Accordingly, data-transfer-method directed to the DMA control section 3 is not changed and data are transferred by small volume of unit. Bus-occupancy rate mentioned herein indicates bus-use rate at every predetermined period.

A clock signal CS starts up at time t0. However, the counters 421 and 422 do not count the signal because both the bus-use permission signals ack1 and ack2 are in inactive (Lo). Therefore, both of the count values C1 and C2 remain unchanged and indicate "0". A clock signal CS starts up again at time $t_1$, 1 $\mu$sec after $t_0$. However, since both the bus-use permission signals ack1 and ack2 are in inactive (Lo), the counters 421 and 422 do not count the signal. Therefore, their respective count values C1 and C2 remain unchanged as "0". Further, a clock signal CS starts up at time $t_3$, 1 µsec after $t_1$. However, since both the bus-use permission signals ack1 and ack2 are in inactive (Lo), the counters 421 and 422 do not count the signal. Therefore, their respective count values C1 and C2 remain unchanged as "0".

An occupancy-rate setting signal SSS is sent to each of the DFFs 431 and 432 at time $t_4$, 375 nsec after $t_3$. Then, the DFFs 431 and 432 output their respective count values C1 and C2 obtained at time $t_4$ as bus-occupancy rate S1 and S2, respectively. That is, the DFF 431 outputs "0" as its bus-occupancy rate S1, and the DFF 432 outputs "0" as S2. Since an occupancy-rate setting signal SSS and a counter-clear signal CCS are sent to the DFFs 431 and 432 and their respective counters 421 and 422 every 100 µsec period, count values C1 and C2 thus can be output as respective bus-occupancy rate S1 and S2.

Next, the above bus-occupancy rate S1 and S2 are input in the adder 425. Then, the adder 425 outputs "0" as a calculation result and inputs the resultant value in the comparator 426. Since the comparator 426 determines that the resultant value "0" is equal to the comparative value "0", a DMA-transfer-method changing signal CHT sent from the bus monitor section 408 to the DMA control section 3 becomes in active (Hi). While the DMA-transfer-method changing signal CHT is in active (Hi), DMA-transfer method directed to the DMA control section 3 is changed.

Furthermore, a counter-clear signal CCS is sent to each of the counter 421 and 422 at time $t_5$, 125 nsec after $t_4$ (500 nsec after $t_3$). This counter-clear signal CSS clears both of the count values C1 and C2 to "0".

A clock signal CS starts up again at time $t_6$, 500 nsec after $t_5$. However, bus-use permission signals ack1 and ack2 are in inactive (Lo) this time, the counters 421 and 422 do not count the signals, whereby their count values C1 and C2 remain "0".

Next, provided that a bus-use permission signal ack1 is in active (Hi). Then, a clock signal CS starts up again at time $t_8$, 1 µsec after $t_6$. Therefore, the counter 421 counts and its count value C1 becomes "1". On the other hand, since a bus-use permission signal ack2 is in inactive (Lo), the counter 422 does not count the signal, whereby its count value C2 remains "0".

Afterward, each of the counters 421 and 422 counts signals. When an occupancy-rate setting signal SSS is sent to their respective DFFs 431 to 432, occupancy rate S1 and S2 for the DMA control sections 1 and 2 are calculated, respectively. Then, DMA-transfer-method changing signal CHT is set active (Hi) or inactive (Lo) in accordance with the calculation result.

Figure 31:
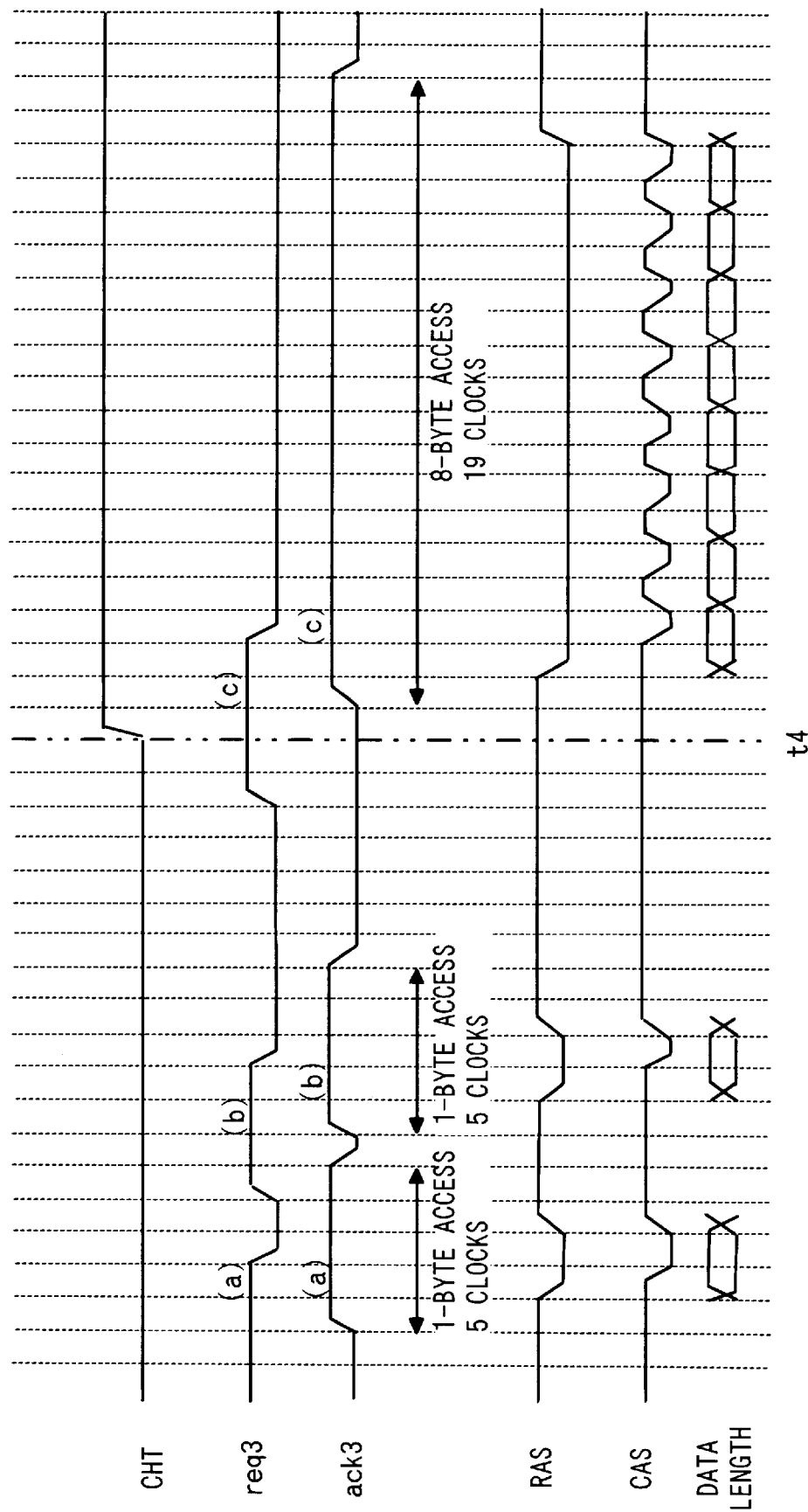
FIG. 31 is a timing chart to explain data-transfer method.

Next, change of data transfer method executed when the DMA-transfer-method changing signal CHT is switched between active (Hi) and inactive (Lo) will be described by referring to FIG. 31. FIG. 31 is a timing chart showing a request signal req3 and a bus-use permission signal ack3 both directed to the DMA control section 3, signals RAS and CAS for writing data on a DRAM integrated into the memory 7, and length of data written on the DRAM.

Firstly, a condition that the DMA-transfer-method-changing signal CHT is in inactive (Lo), that is, states of each signal before time $t_4$, will be described. The timing chart indicates that at least any one of the DMA control sections 1, and 2 for which real time processing are exercised gets access to the bus 5 before time $t_4$. Provided that the DMA control section 3 generates a request signal req3(a) and the bus-use reconcilement section 406 sends back bus-use permission signal ack3(a) to DMA the control section 3 under a condition such as the above. Then, DMA transfer between the hard disk 13 and the memory 7 is exercised by one byte. Further, DMA transfer with the same manner as the above is exercised when the DMA control section 3 generates a request signal req3(b) and the bus-use reconcilement section 406 sends back bus-use permission signal ack3 (b) to DMA the control section 3. Under this condition, DMA transfer between the DMA control sections 1 or 2 and the memory 7 is exercised by one byte.

That is, while a DMA-transfer-method-changing signal CHT is in inactive (LO),DMA transfer between each of the DMA control section 1 to 3 and the memory 7 is exercised by the one byte and it takes five clocks (625 nsec) for one byte of DMA transfer. Since DMA transfer is exercised by one byte, this DMA transfer method does not at all affect real time processing for DMA control sections 1 and 2.

On the other hand, a condition that the DMA-transfer-method-changing signal CHT is in active (Hi), that is, states of each signal after time $t_4$, will be described. The timing chart indicates that both the DMA control sections 1 and 2 for which real time processing are exercised do not get access to the bus 5 after time $t_4$. Provided that the DMA control section 3 generates a request signal req3(a) before and after time $t_4$,and the bus-use reconcilement section 406 sends back bus-use permission signal ack3(a) to DMA the control section 3 after time $t_4$. Then, DMA transfer between the hard disk 13 and the memory 7 is exercised by the eight bytes.

Thus, while both of the DMA control sections 1 and 2 to be processed on real time do not get access to the bus 5, DMA transfer between the DMA control section 3 and the memory 7 can be exercised by the length of data eight times longer than the length transferred when at least one of the control sections 1 or 2 gets access to the bus 5, at a time. It takes 19 clocks (2375 nsec). If eight-byte data transfer is exercised by the one byte, it takes 5×8=40 clocks (5000 nsec). Therefore, this data transfer method halves data transfer time and significantly enhances data transfer efficiency.

As described in detail, in the DMA controller 400 directed to this embodiment, the bus monitor section 408 detects bus-access made by the DMA control sections 1 and 2 both of which need real time processing. Based on a detection result obtained by the bus monitor section 408, DMA transfer methods for between each of the DMA control sections 1 to 3 and the memory 7 are appropriately changed. Thereby, DMA transfer is efficiently exercised without affecting real time processing.

The present embodiment is only an example and does not limit the present invention in any respect. Accordingly, the present invention can be variously improved and changed within the scope not departing the subject matter thereof. For example, if the DMA controller for the Eighth Embodiment does not need to calculate bus-occupancy rate of the DMA control sections 1 to 3, data transfer methods may be changed based on presence/absence of bus-use permission signals ack1 and ack2 (or request signals req1, req2) directed to the DMA control section 1 and 2 which need real time processing. The bus monitor 408 may detect information about the bus 5 instead of bus-use permission signals ack1 and ack2 in order to detect operation-state of the DMA control section 1and 2 which need real time processing. In the Eighth Embodiment, to-be-transferred-word units are changed between a large-volume unit and a small-volume unit, however, word units may be changed among large volume, medium volume, and small volume, or subdivided to-be-transferred-word units may be applied thereto. Thereby, DMA transfer is exercised more efficiently.

[Ninth Embodiment]

Next, a Ninth Embodiment will be described. A DMA controller directed to the Ninth Embodiment is basically structured the same as the DMA controller directed to the foregoing Embodiments other than a point that this DMA controller can lower power consumption of the system. Accordingly, descriptions for the same aspects as the foregoing Embodiments will be omitted and only different aspects will be described in this Embodiment. For figures directed to this Embodiment, the same numerals are assigned to the parts structured the same as those of the foregoing Embodiments.

Figure 32:
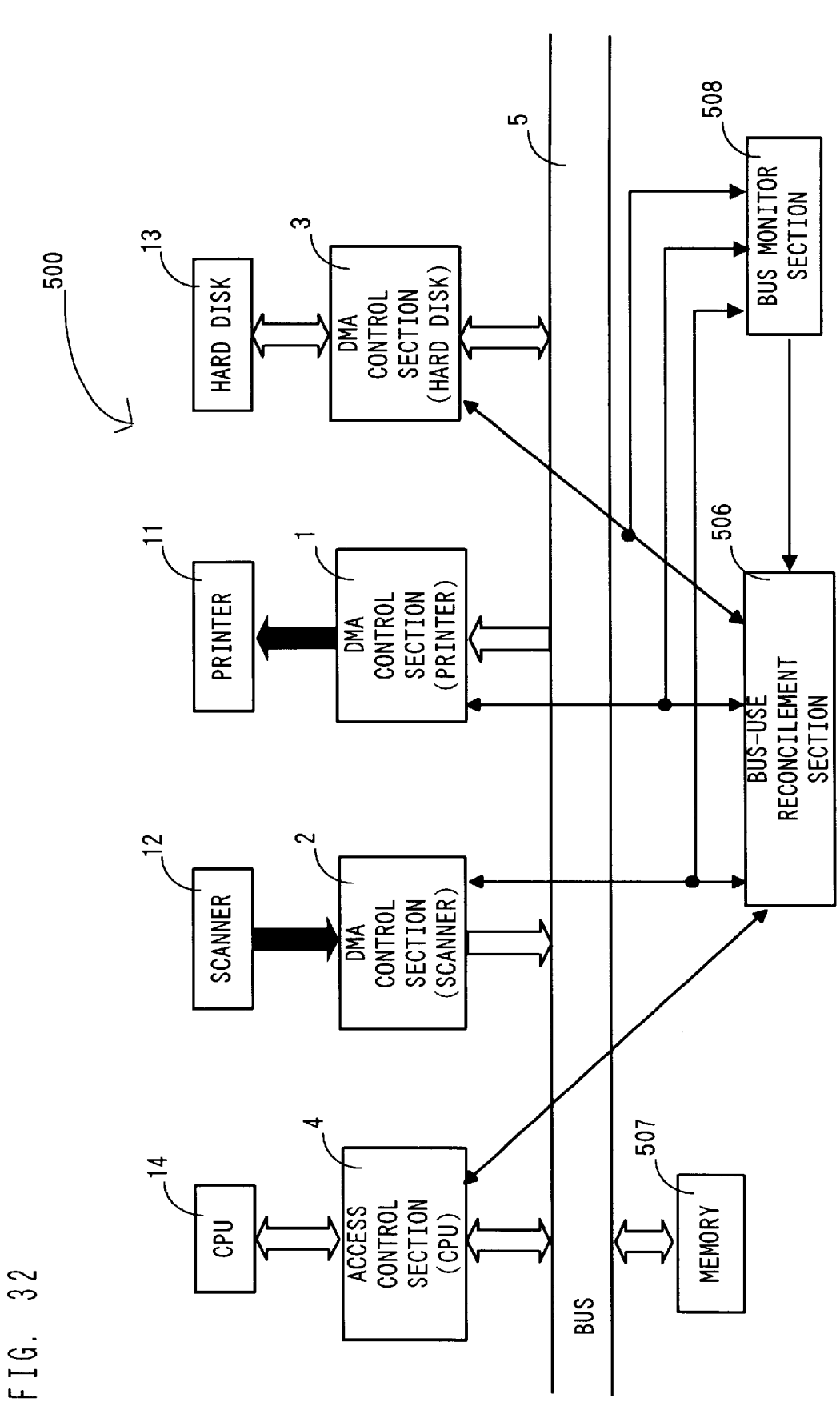
FIG. 32 is a schematic diagram of a DMA controller directed to a ninth embodiment.
Figure 33:
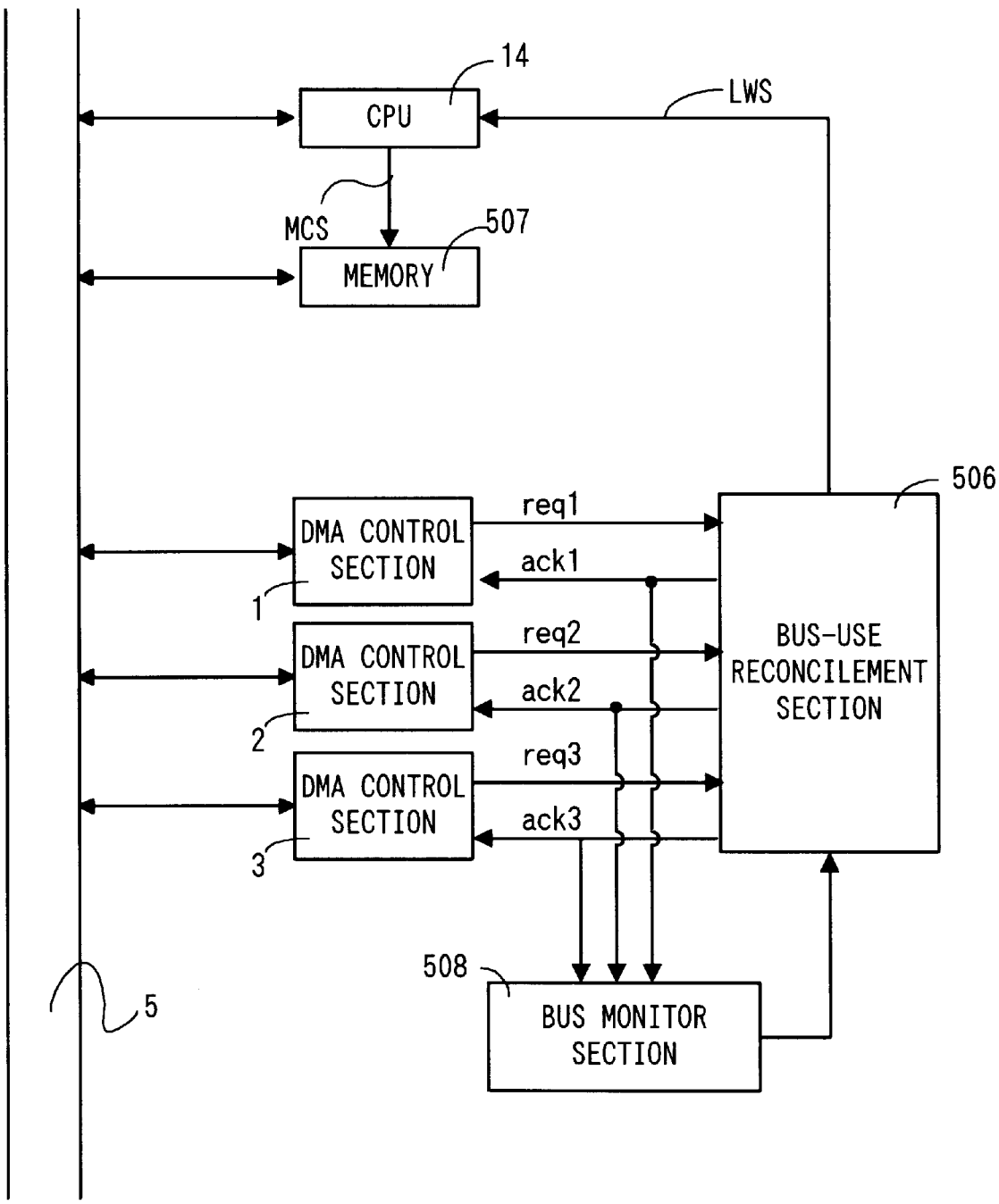
FIG. 33 is a diagram to explain the operation of bus-use reconcilement section and bus monitor section shown in FIG. 32.

As shown in FIG. 32, a DMA controller 500 of the Ninth Embodiment includes: a memory 507 provided with a DRAM; DMA control sections 1, 2, and 3; an access control section 4; and a bus monitor section 508, wherein the DMA control sections 1 to 3 and the access control section 4 get access to the memory 507 through a common bus 5. The DMA controller 500 further includes a bus-use reconcilement section 506 which reconciles pluralities of bus-access made by each of the DMA control sections and the access control section 4 in accordance with bus-use rate calculated by the bus monitor section 508.

When the DMA control sections 1 to 3 and the access control section 4 generate their respective request signals req1, req2, req3, and req4, the bus-use reconcilement section 506 appropriately returns bus-use permission signals ack1, ack2, ack3, and ack4 to the DMA control sections 1 to 3 and the access control section 4, respectively. The bus-use reconcilement section 506 sends the CPU 14 a mode-switch signal LWS for switching to a low-power-consumption mode in accordance with bus-use rate.

Figure 34:
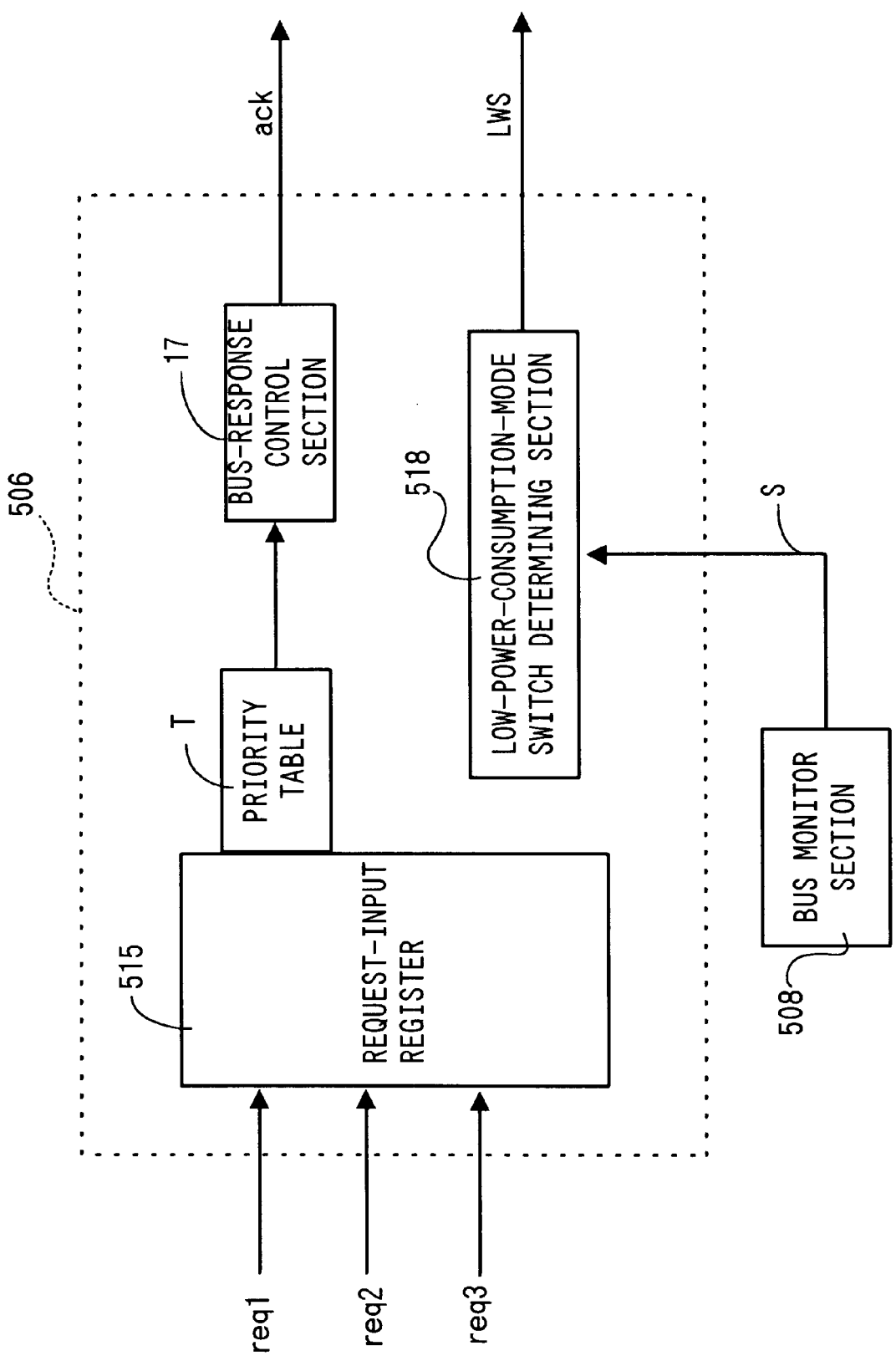
FIG. 34 is a block chart showing the structure of the bus-use reconcilement section shown in FIG. 32.

As shown in FIG. 34, the bus-use reconcilement section 506 includes a request-input register 515 in which the request signals req1 to req3 sent from their respective DMA control sections 1 to 3 are input and registered, a priority table T (see FIG. 50) in which bus-access priority ranking for each of the devices is recorded, a bus-response control section 17 which sends back a bus-use permission signal ack, and a low-power-consumption-mode switch determining section 518 which sends a mode-switch signal LWS for switching a mode of a device to low-power-consumption mode based on bus-occupancy rate S obtained by a bus monitor section 508 details of which will be described later.

Only while a bus-use permission signal sent from the bus-use reconcilement section 506 is in active, only a control section that receives its bus-use permission signal can get access to the bus 5. When the DMA control sections 1 to 3 and the access control section 4 concurrently output their respective request signals req1, req2, req3, and req4, pluralities of bus-access are reconciled based on the priority table T (see FIG. 50) in which a predetermined priority ranking is stored.

Figure 35:
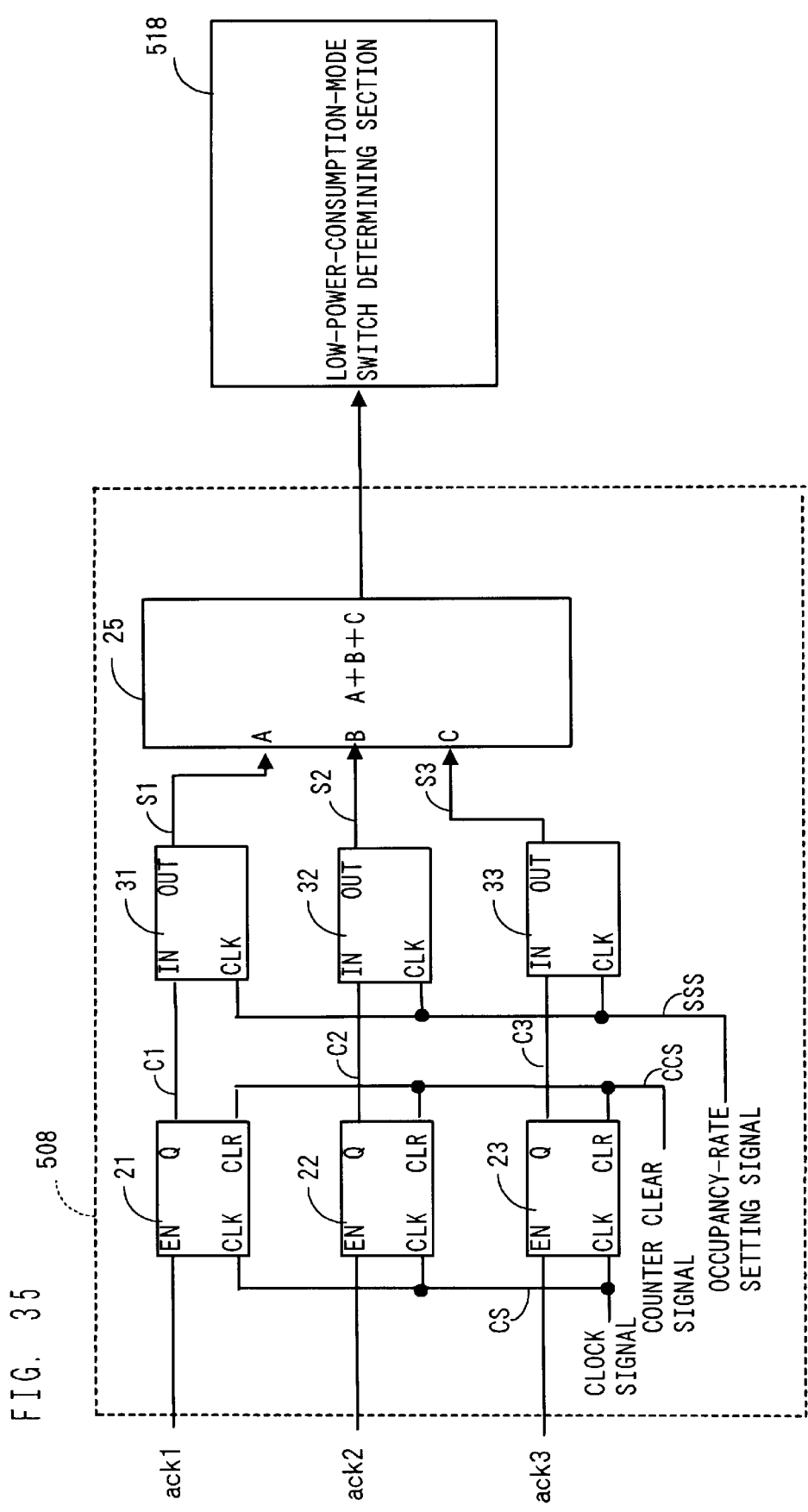
FIG. 35 is a block chart showing the structure of the bus monitor section shown in FIG. 32.

Next, as shown in FIG. 35, the bus monitor section 508 counts active periods directed to bus-use permission signals ack1, ack2, ack3 sent from the bus-use reconcilement section 506, calculates bus-occupancy rate S, and then, inputs the bus-occupancy rate S in the low-power-consumption-mode switch determining section 518. The bus monitor section 508 has the same structure as the bus monitor section 8 (see FIG. 4) from which the comparator 26 is eliminated.

The DMA controller 500 structured such as the above operates as follows. Firstly, the bus monitor section 508 calculates bus-occupancy rate S based on bus-use permission signals ack1 to ack3. The bus-occupancy rate S is input in the low-power-consumption-mode-switch determining section 518. Then, the low-power-consumption-mode-switch determining section 518 determines whether the bus-occupancy rate S is lower than a determination value "10%" or not. If the bus-occupancy rate S is lower than the determination value "10%", a mode-switch signal LWS is sent to the CPU 14.

When the CPU 14 receives the mode-switch signal LWS sent from the low-power-consumption-mode-switch determining section 518, operational mode of the CPU 14 is switched to low-power-consumption mode. Additionally, the CPU 14 sends a memory control signal MCS to the memory 507. The memory control signal MCS switches operational mode of the memory 507 to low-power-consumption mode. More specifically, the operational mode is switched to self-refresh mode. Alternatively, the operational mode may be switched to power-down mode (without refresh). Thereby, power consumption is lowered to about 1/50 of normal mode. If bus-occupancy rate S calculated by the bus monitor section 508 is higher than the determination value "10%", a mode-switch signal LWS is not generated and the DMA controller 500 is not switched to low-power-consumption mode.

If bus-occupancy rate exceeds the determination value "10%" after operational mode is once switched to self-refresh mode, it gets back to normal mode. A command input from an external section is needed so as to switch self-refresh mode to normal mode. Therefore, processing speed with self-refreshing mode is slightly lower than the speed with auto-refresh mode. However, this mode-switch does not affect data processing at the memory 507. Afterward, mode-switch in response to bus-occupancy rate S can effectively lower power consumption.

As described in detail, in the DMA controller 500 directed to the Ninth Embodiment, the bus monitor section 508 calculates bus-occupancy rate S with respect to the bus 5 based on the bus-use permission signals ack1 to ack3. If the bus-occupancy rate S is lower than the predetermined determination value "10%", a mode-switch signal LWS is sent to the CPU 14. Thereby, operational mode of the DMA controller 500 surely switches to low-power-consumption mode when the DMA control sections 1 to 3 scarcely operate. Accordingly, power consumption can be lowered effectively.

The present embodiment is only an example and does not limit the present invention in any respect. Accordingly, the present invention can be variously improved and changed within the scope not departing the subject matter thereof. For example, the low-power-consumption-mode switch determining section 518 is integrated into the bus-use reconcilement section 506 in the Ninth Embodiment, however, the low-power-consumption-mode switch determining section 518 may be disposed independent of the bus-use reconcilement section 506. Furthermore, as described in the Second Embodiment, bus-occupancy rate S may be calculated by detecting information about the bus 5 instead of bus-use permission signals ack1 to ack3.

[Tenth Embodiment]

Figure 36:
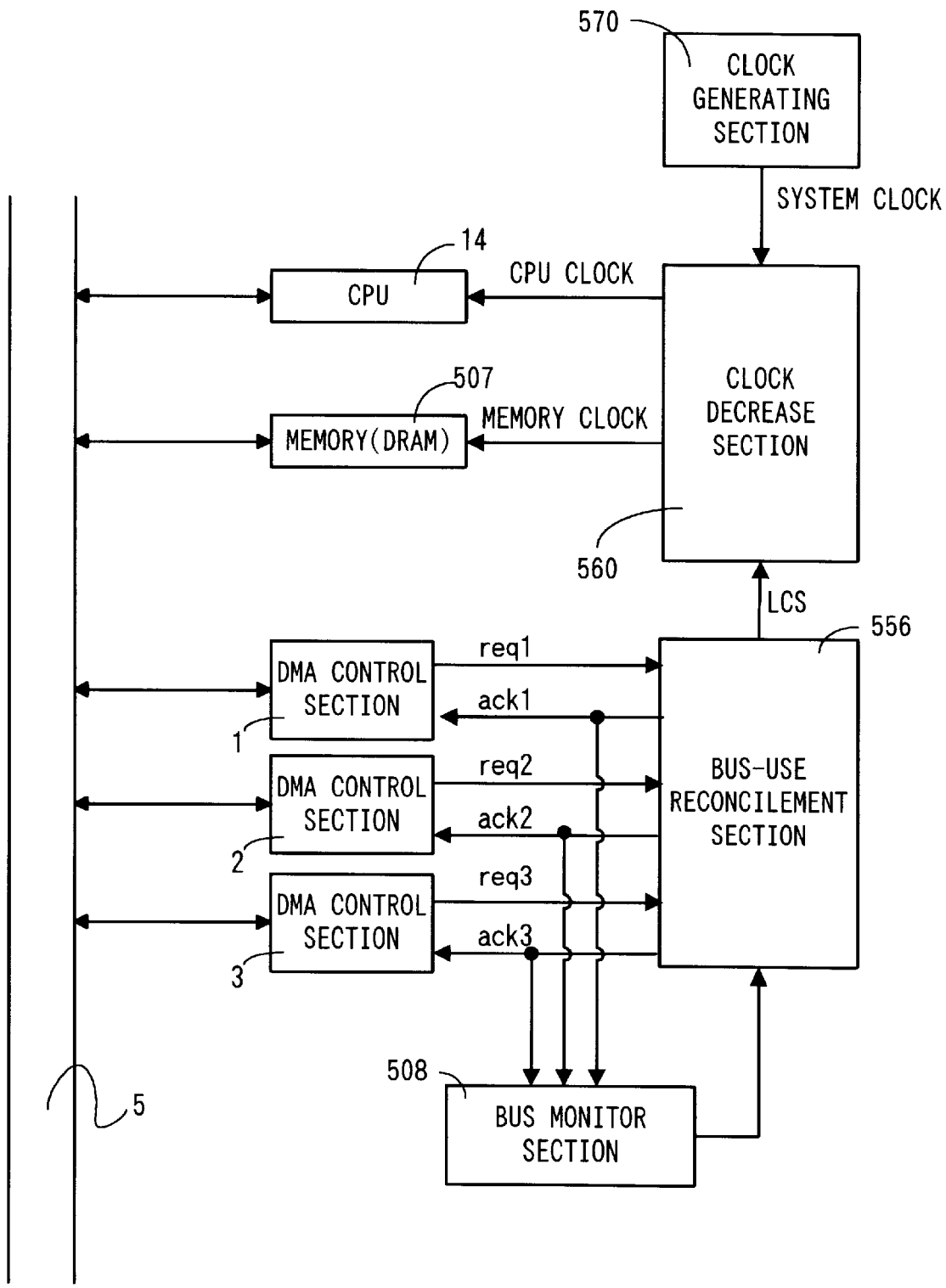
FIG. 36 is a block diagram showing the structure of a DMA controller directed to a tenth embodiment.

Next, a Tenth Embodiment will be described. A DMA controller directed to the Tenth Embodiment is structured almost the same as the DMA controller directed to the Ninth Embodiment other than a point. Particularly, a bus-use reconcilement section for the DMA controller includes a clock-decrease determining section 568 (see FIG. 37) instead of a low-power-consumption-mode switch determining section 518, and further includes a clock decrease section 560. That is, as shown in FIG. 36, the bus-use reconcilement section 556 reconciles pluralities of bus-access and sends the clock decrease section 560 a clock-decrease signal LCS for decreasing frequency of system clock in response to bus-occupancy rate S. The clock decrease section 560 decreases frequency of system clock generated in a clock generating section 570 and supplies the system clock with frequency decreased for the CPU 14 and the memory 507. Clock frequency to be supplied for the CPU 14 and the one for the memory 507 may be same or may be different.

Figure 37:
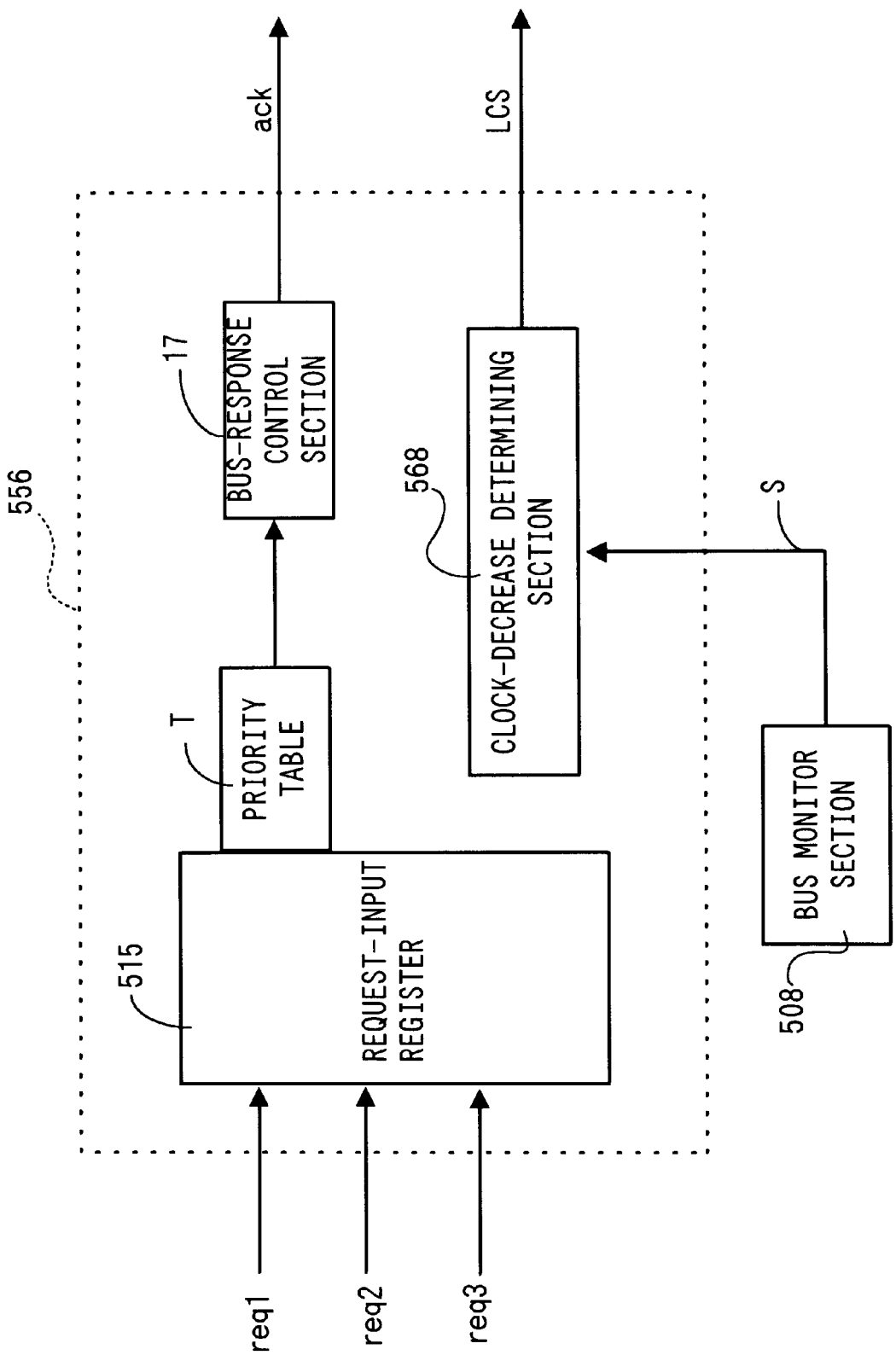
FIG. 37 is a block chart showing the structure of the bus-use reconcilement section shown in FIG. 36.

As shown in FIG. 37, the bus-use reconcilement section 556 includes a request-input register 515 in which the request signals req1 to req3 sent from their respective DMA control sections 1 to 3 are input and registered, a priority table T (see FIG. 50) in which bus-access priority ranking for each of the devices is recorded, a bus-response control section 17 which sends back a bus-use permission signal ack, and the clock-decrease determining section 568 which generates a clock decrease signal LCS based on bus-occupancy rate S calculated by the bus monitor section 508. When the clock-decrease determining section 508 determines that bus-occupancy rate S is lower than a determination value "10%", clock decrease signal LCS is sent to the clock decrease section 560.

The DMA controller structured such as the above operates as follows. Firstly, the bus monitor section 508 calculates bus-occupancy rate S based on bus-use permission signals ack1 to ack3. The bus-occupancy rate S is input in the clock-decrease determining section 568. Then, the clock-decrease determining section 568 determines whether the bus-occupancy rate S is lower than a determination value "10%" or not. If the bus-occupancy rate S is lower than the determination value "10%", a clock decrease signal LCS is sent to the clock decrease section 560.

Receiving a clock decrease signal LCS sent by the clock-decrease determining section 568, the clock decrease section 560 decreases frequency of system clock sent from a clock generating section 570 and inputs the system clock with frequency being decreased for the CPU 14 and the memory 507. Since data do not need high-speed processing and processing speed for the CPU 14 and the memory 507 can be delayed when the DMA control sections 1 to 3 scarcely operate, frequency of the system clock can be decreased. Thereby, power consumption for the CPU 14 and the memory 507 and total power consumption for the DMA controller can be lowered. If bus-occupancy rate S calculated by the bus monitor section 508 is higher than the determination value "10%", a clock decrease signal LCS is not generated and system clock frequency is not decreased.

If bus-occupancy rate exceeds the determination value "10%" after system clock frequency is once decreased by the clock decrease section 560, the clock decrease section 560 supplies system clock with normal frequency for the CPU 14 and the memory 507. Thus, decrease of system clock frequency in response to bus-occupancy rate S can effectively lower power consumption.

As described in detail, in the DMA controller directed to the Tenth Embodiment, the bus monitor section 508 calculates bus-occupancy rate S with respect to the bus 5 based on the bus-use permission signals ack1 to ack3. If the bus-occupancy rate S is lower than the predetermined determination value "10%", the clock-decrease determining section 568 send a clock decrease signal LCS to the clock section 560. Consequently, the clock decrease section 560 decreases system clock frequency and the system clock with frequency being decreased is supplied for the CPU 14 and the memory 507. Thereby, power consumption for the CPU 14 and the memory 507 can be lowered when the DMA control sections 1 to 3 scarcely operate.

The present embodiment is only an example and does not limit the present invention in any respect. Accordingly, the present invention can be variously improved and changed within the scope not departing the subject matter thereof. For example, the clock-decrease determining section 568 may be disposed independent of the bus-use reconcilement section 556 in the Tenth Embodiment. Furthermore, as described in the Second Embodiment, bus-occupancy rate S may be calculated by detecting information about the bus 5 instead of bus-use permission signals ack1 to ack3. Furthermore, the Tenth Embodiment describes a case where system clock frequency supplied for both the CPU 14 and the memory 507 are decreased as an example, however, either clock frequency for only the CPU 14, or clock frequency for only the memory 507 may be decreased. Still further, clock frequency supplied for the DMA control sections 1 to 3 may be decreased in addition to the CPU 14 and the memory 507. Thereby, total power consumption for the DMA controller is further lowered.

[Eleventh Embodiment]

Finally, an Eleventh Embodiment will be described. Similar to the Ninth and Tenth Embodiments, a DMA controller for the Eleventh Embodiment also aims to lower power consumption. However, different from the Tenth Embodiment, the DMA controller herein especially aims to lower power consumption of a memory. Accordingly, descriptions for the same aspects as the foregoing Embodiments will be omitted and only different aspects will be described in this Embodiment. For figures directed to this Embodiment, the same numerals are assigned to the parts structured the same as those of the foregoing Embodiments.

Figure 38:
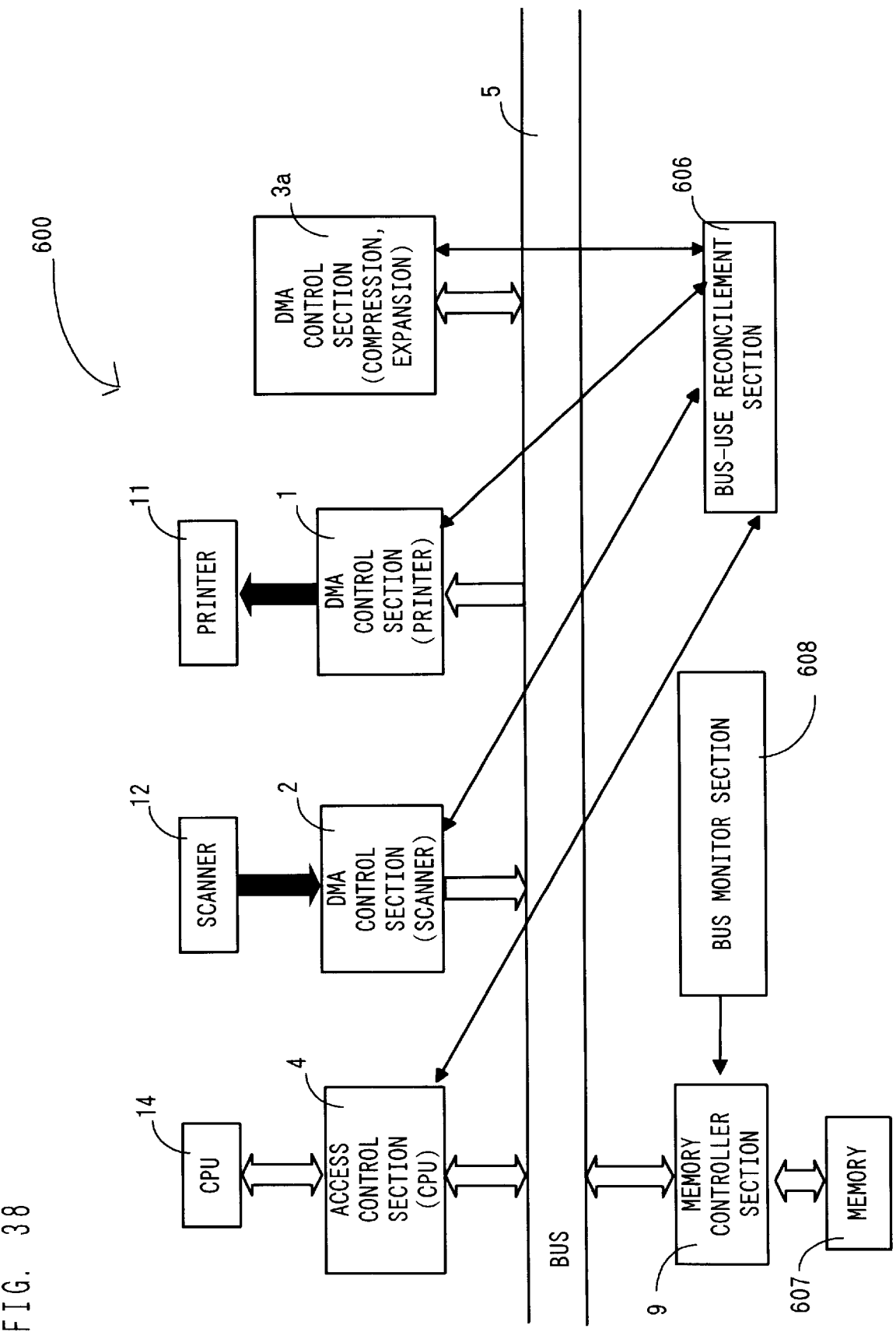
FIG. 38 is a block diagram showing the structure of a DMA controller directed to an eleventh embodiment.
Figure 39:
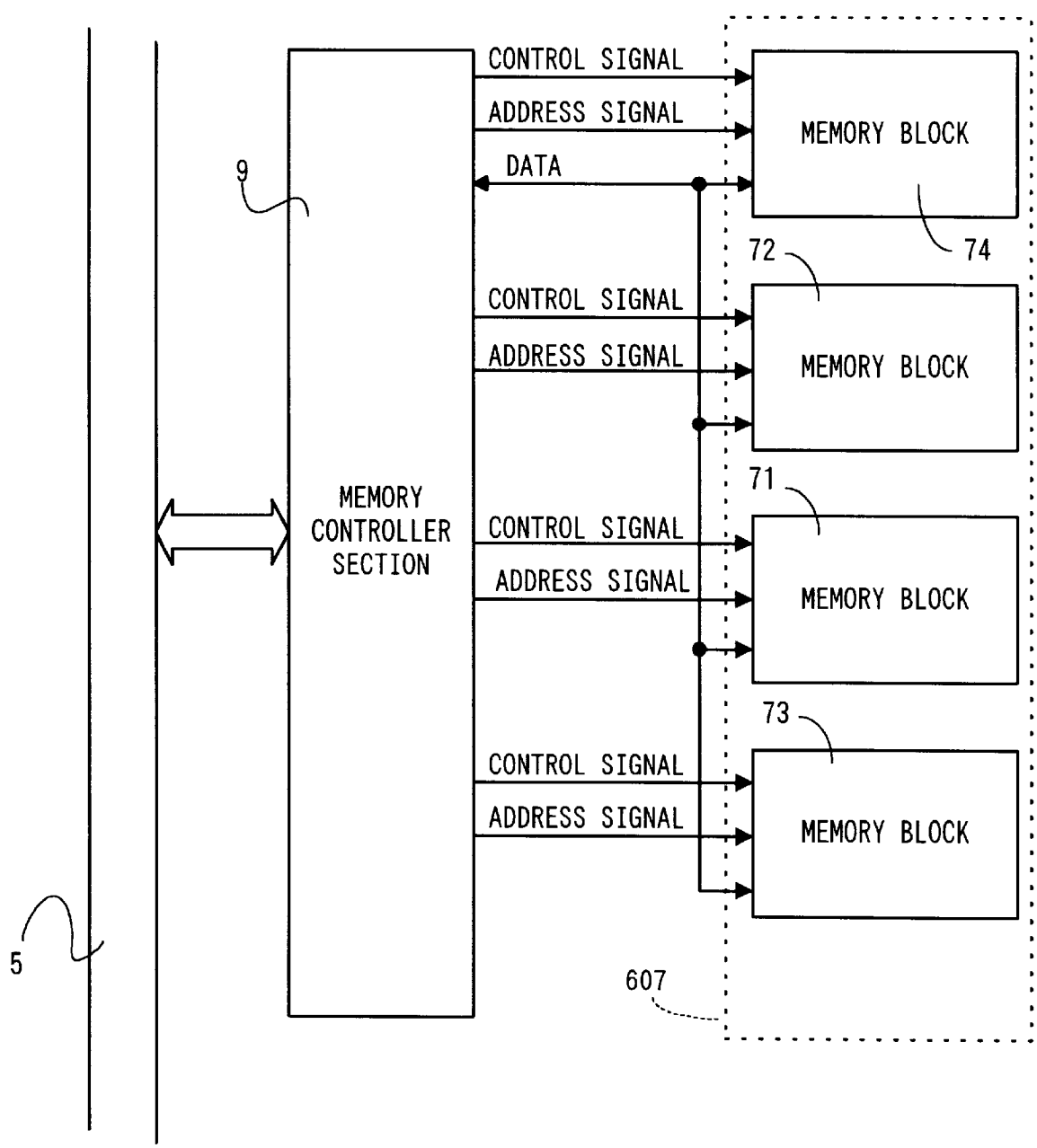
FIG. 39 is a block chart of a memory and a memory controller section shown in FIG. 38.

As shown in FIG. 38, a DMA controller 600 of the Eleventh Embodiment includes: a memory 607 provided with memory blocks (DRAM) 71 to 74 (see FIG. 39), which will be described later; DMA control sections 1, 2, and 3*a*; and an access control section 4, wherein the DMA control sections 1, 2, 3*a* and the access control section 4 get access to the memory 607 through a common bus 5. The DMA controller 600 further includes: a bus-use reconcilement section 606 which reconciles pluralities of access to the bus 5 by each of the DMA control sections 1, 2, 3*a* and the access control section 4 in accordance with bus-use rate calculated by a bus monitor section 608; and memory controller section 9 which controls operation mode for each of the memory blocks disposed in the memory 607 in accordance with the bus-use rate.

The memory 607 includes four memory blocks 71 to 74. The memory blocks 71, 72, 73, and 74 correspond to the DMA control sections 1, 2, 3*a*, and the access control section 4, respectively. More specifically, the DMA control sections 1, 2, 3*a*, and the access control section 4 get access to the memory blocks 71, 72, 73, and 74, respectively.

The memory controller section 9 sends control signals and address signals to each of the memory blocks 71 to 74 so as to control receiving of data, switching of operational modes, and the like. The memory controller section 9 stores an operation-mode selecting table Tm shown in FIG. 40 which determines operational mode for each of the memory blocks 71 to 74 based on active/inactive-state combination of big-occupancy-rate signal BS and access signals ac1 to ac3.

According to the operation-mode selecting table Tm, basic operational mode quite differs depending on whether the big-occupancy-rate signal BS is in active or inactive. That is, operational mode for all of the memory blocks 71 to 74 are set to normal mode when the big-occupancy-rate signal BS is in active. This is because processing speed for the each of memory blocks 71 to 74 must be increased to lower bus-occupancy rate S when the big-occupancy-rate signal BS is in active.

On the other hand, operational mode for all of the memory blocks 71 to 74 are basically set to power-down mode when a big-occupancy-rate signal BS is in inactive. Self-refresh mode would be better than power-down mode to lower power consumption, however, the self-refresh mode takes longer to start access (recovery time) than the power-down mode. Therefore, operational mode is basically set to power-down mode when a big-occupancy-rate signal BS is in inactive. In connection, recovery time from power-down mode is several ten nsec and recovery time from self-refresh mode is several hundred $\mu$sec.

When a big-occupancy-rate signal BS is in inactive and all of the access signals ac2 to ac3 are in active, operational mode for only the memory block 74 is set to normal mode. For this case, although occupancy-rate S with respect to the bus 5 is low (lower than 50%), all of the DMA control sections 1, 2, and 3a are in operation and the CPU 14 needs high-speed processing.

When a big-occupancy-rate signal BS is in inactive and both the access signals ac2 and ac3 are in inactive, operational mode for the memory block 73 is set to self-refresh mode. Thereby, power consumption can be lowered furthermore. Thus, operational mode of the memory block 73 can be set to self-refresh mode because it takes several hundred msec for image data expansion processing whereas it takes several hundred $\mu$sec for recovery time with self-refresh mode, or a first access start time that the memory block 73 starts reading expansion data. That is, several hundred $\mu$sec of recovery time is no big deal for image data expansion processing that needs several hundred msec. Therefore, even if self-refresh mode switches to power-down mode after access for reading expansion data, it never rises any problem.

Figure 42:
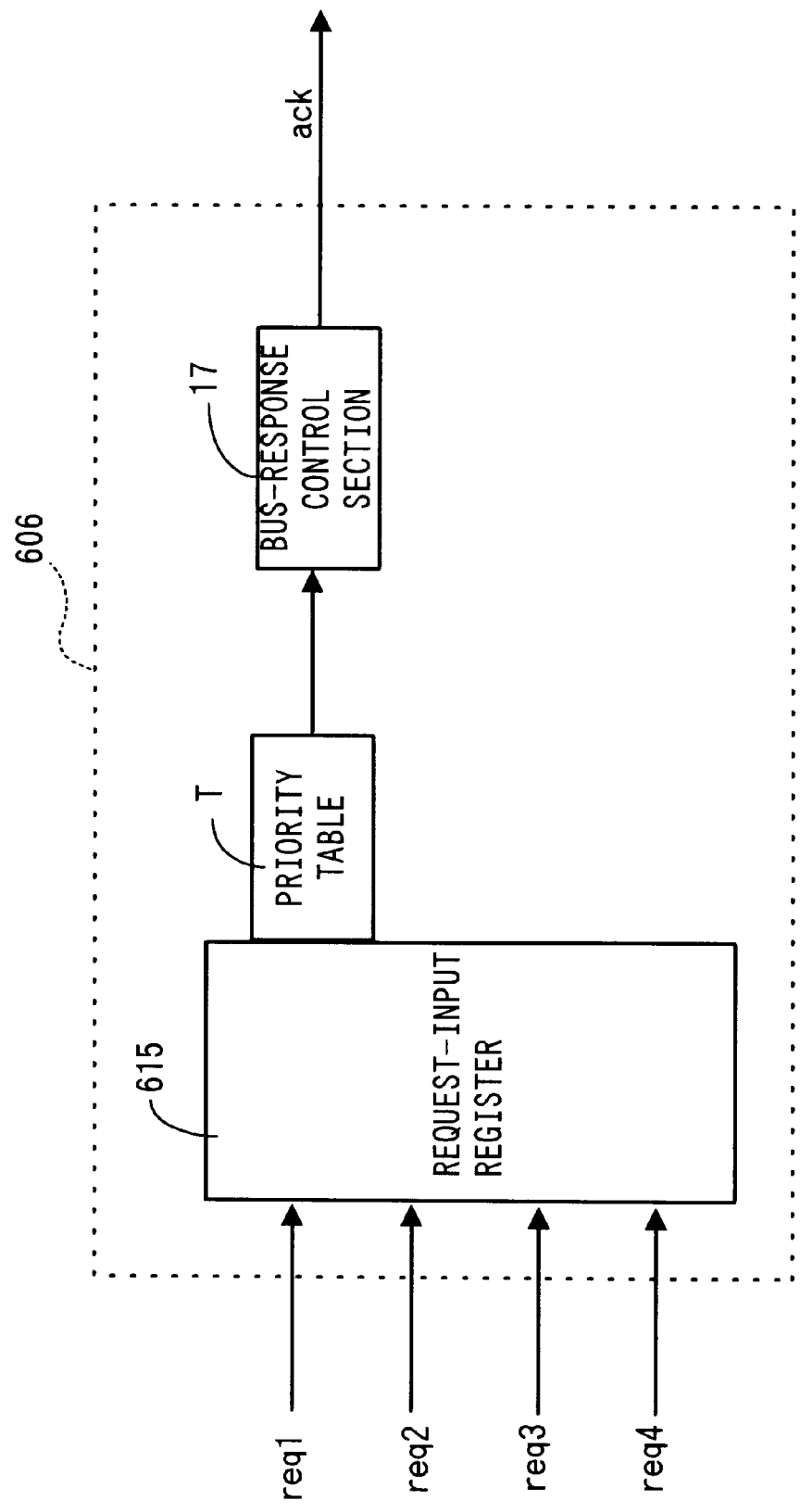
FIG. 42 is a block diagram showing the structure of a bus-use reconcilement section shown in FIG. 38.

When the DMA control sections 1, 2, 3a and the access control section 4 generate their respective request signals req1, req2, req3, and req4, the bus-use reconcilement section 606 appropriately returns bus-use permission signals ack1, ack2, ack3, and ack4 to the DMA control sections 1, 2, 3a and the access control section 4, respectively. As shown in FIG. 42, the bus-use reconcilement section 606 includes a request-input register 615 in which the request signals req1, req2, req3, and req4 sent from their respective DMA control sections 1, 2, 3a, and the access control section are input and registered, a priority table T (see FIG. 50) in which bus-access priority for each of devices is recorded, and a bus-response control section 17 which sends back a bus-use permission signal ack. Only while a bus-use permission signal sent from the bus-response control section 17 is in active, only a control section that receives its bus-use permission signal can get access to the bus 5.

Figure 41:
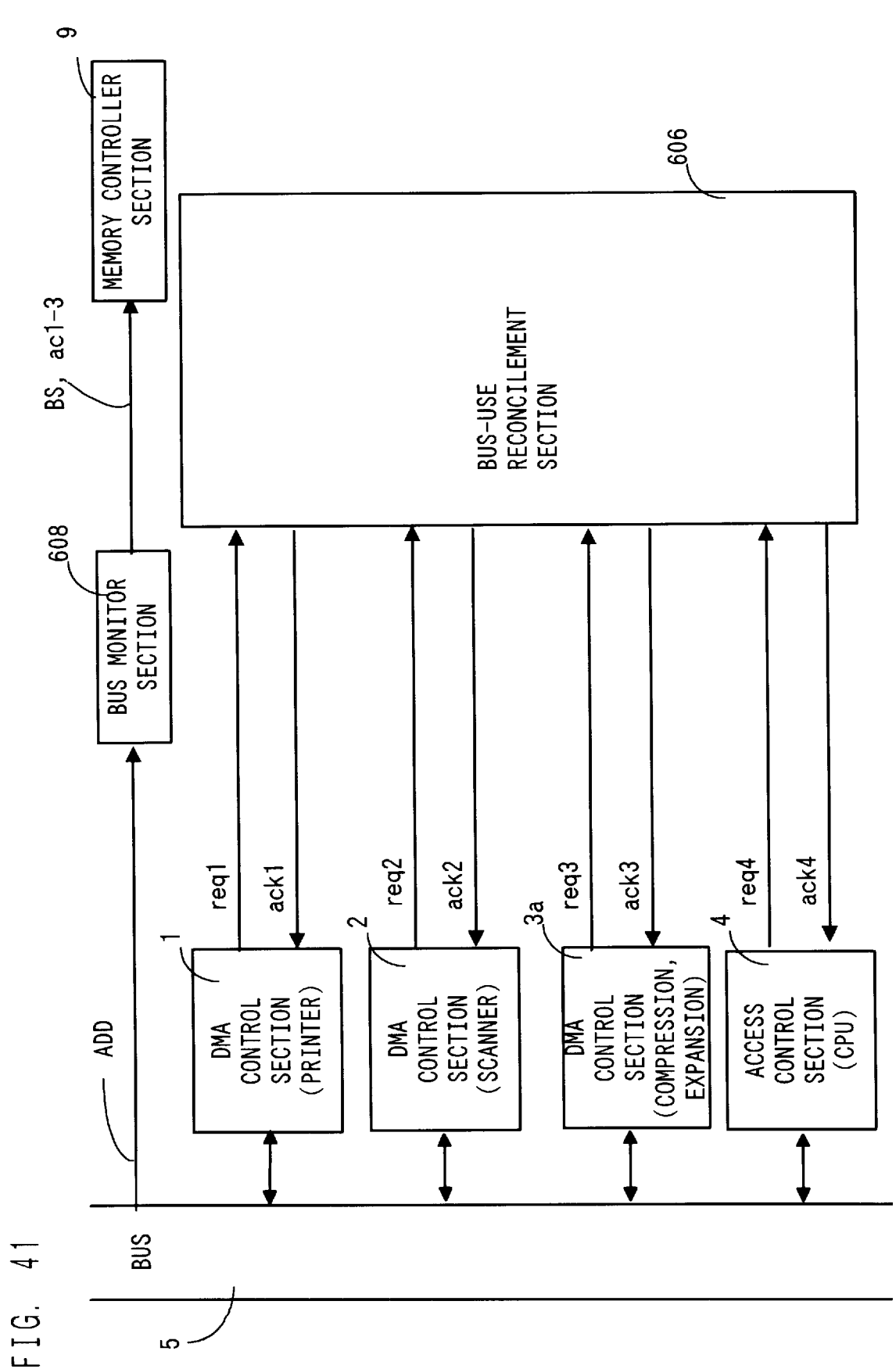
FIG. 41 is a diagram to explain the operation of a bus-use reconcilement section and a bus monitor section shown in FIG. 38.

Go back to FIG. 41. The bus monitor section 608 detects address signal ADD sent from the bus 5, calculates bus-occupancy rate S, detects operation-state of each of the DMA control sections 1, 2, and 3a, and then, inputs the information in the memory controller section 9. Since addresses to which the DMA control sections 1, 2, 3a and the access control section 4 can get access are previously allocated in the bus 5, the bus monitor section 608 can calculate bus-occupancy rate S by monitoring address signal ADD.

As shown in FIG. 43, in this embodiment, for example, addresses 0000000h–0FFFFFFh are allocated to the DMA control section 1 (memory block 71), and so are addresses 1000000h–1FFFFFFh to the DMA controls section 2 (memory block 72), 2000000h–2FFFFFFh to the DMA controls section 3 (memory block 73), and 3000000h–3FFFFFFh to the access controls section 4 (memory block 74). Regional signals R1 to R3 indicated in FIG. 43 will be described later.

Figure 44:
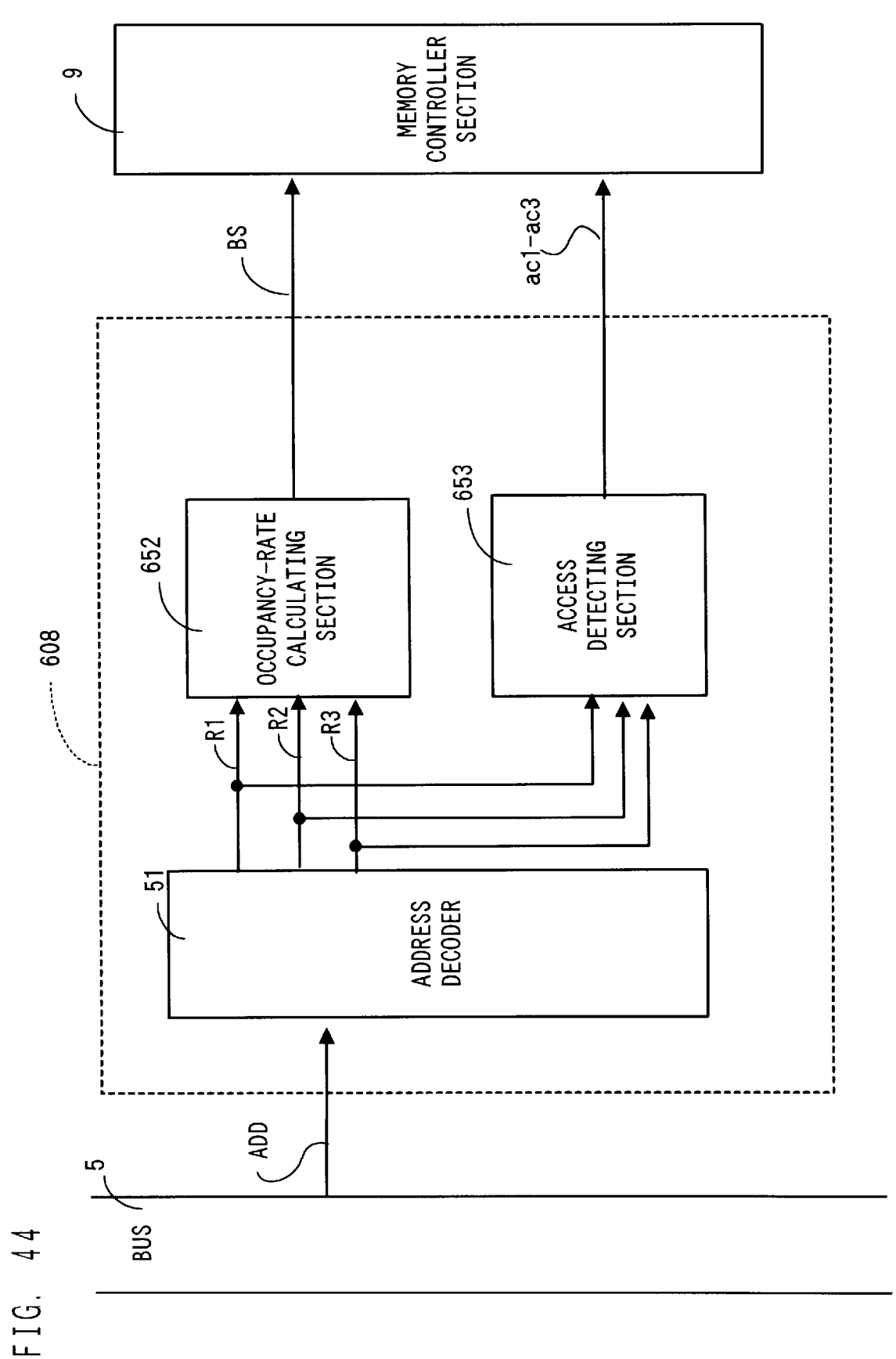
FIG. 44 is a block diagram showing the structure of a bus monitor section shown in FIG. 38.

As shown in FIG. 44, the bus monitor section 608 includes an occupancy-rate calculating section 652 for calculating bus-occupancy rate S, an access detecting section 536 for detecting bus-access by the DMA control sections 1, 2, 3a, and an address decoder 51. The address decoder 51 reads-out an address signal ADD sent from the bus 5 and makes any one of the regional signals R1 to R3 active in response to the signal address ADD. As shown in FIG. 43, the relationship between regional signals R1 to R3 and address signal ADD is as follows: Regional signal R1 is made active in response to addresses 0000000h–0FFFFFFh; Regional signal R2 is made active in response to addresses 1000000h–1FFFFFFh; and Regional signal R3 is made active in response to addresses 2000000h–2FFFFFFh.

Figure 45:
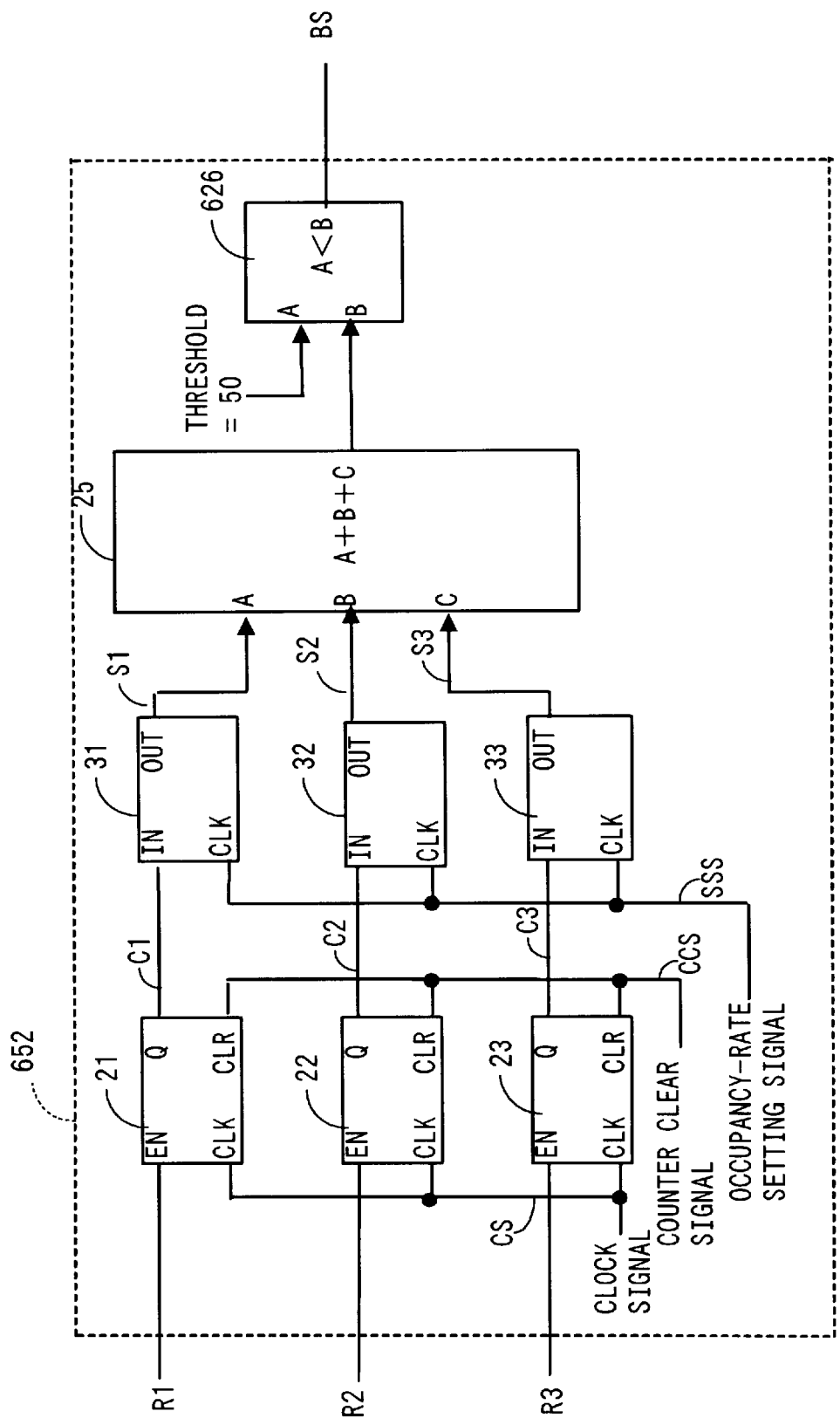
FIG. 45 is a block diagram showing the structure of an occupancy-rate calculating section shown in FIG. 44.

As shown in FIG. 45, an occupancy-rate calculating section 652 is almost the same as the bus monitor section 58 directed to the Second Embodiment (FIG. 9) except for signals sent from a comparator 626. Therefore, description of portions structured the same as those of the Second Embodiment is omitted herein. The comparator 526 compares a resultant value obtained by the adder 25 and a threshold (the threshold herein is "50") and sets big-occupancy-rate signal BS input in the memory controller 9 active when the resultant value is larger than the threshold.

Figure 46:
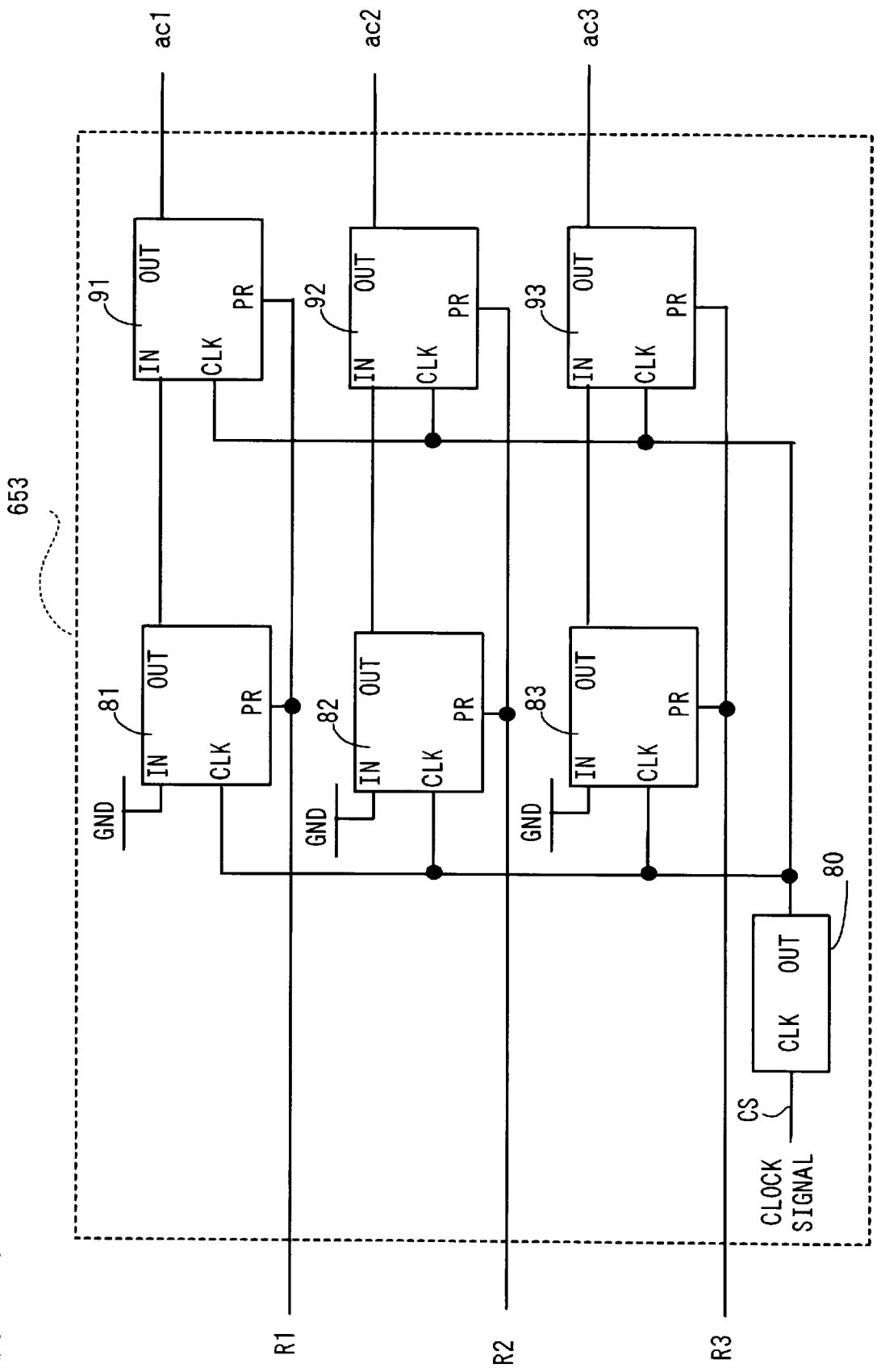
FIG. 46 is a block diagram showing the structure of an access detecting section shown in FIG. 44.

An access detecting section 653 outputs access signals ac1 to ac3 which begin with regional signals R1 to R3, respectively, every 1 msec. As shown in FIG. 46, the access detecting section 653 includes DFFs 81, 82, 83, 91, 92, 93, and a counter 80. The counter 80 generates a signal every 1 msec. As to the counter 80, a clock signal CS (1 $\mu$sec period) is sent to a terminal CLK and output from a terminal OUT every 1 msec. The clock signals output from the terminal OUT for the counter 80 are sent to terminals CLK for each of the DFFs 81, 82, 83, 91, 92, and 93.

Regional signal R1 is sent to terminals PR for DFFs 81 and 91, R2 is sent to terminals PR for DFFs 82 and 92, and R3 is sent to terminals PR for DFFs 83 and 93. Thereby, an access signal ac1 is immediately set active when a regional signal R1 is input in the terminals PR for DFFs 81 and 91 irrespective to signals generated by the 1 msec period. Similar to this, ac2 is immediately set active when R2 is input in the terminals PR for DFFs 82 and 92, and so is ac3 when R3 is input in the terminals PR for DFFs 83 and 93.

Furthermore, grounds for terminals IN for DFFs 81, 82, and 83 are established (fixed in Lo level), and terminals OUT for DFFs 81, 82, and 83 are connected to terminals IN for DFF 91, 92, and 93, respectively. Therefore, if a regional signal R1 has not been input in the terminal PR for DFF 81 and 91 for longer than 1 msec, an access signal ac1 is set inactive. Similar to this, if R2 has not been input in the terminal PR for DFF 82 and 92, ac2 is set inactive, and so is ac3 if R3 has not been input in the terminal PR for DFF 83 and 93.

Thus, both the occupancy-rate calculating section 652 for calculating occupancy rate S with respect to the bus 5 and the access detecting section 653 for detecting pluralities of bus-access made by each of the DMA control sections 1, 2, and 3a are integrated into hardware. Therefore, complicated control is not required for the CPU 14 to calculate occupancy rate S and detect pluralities of bus-access made by each of the DMA control sections 1, 2, and 3a.

Figure 47:
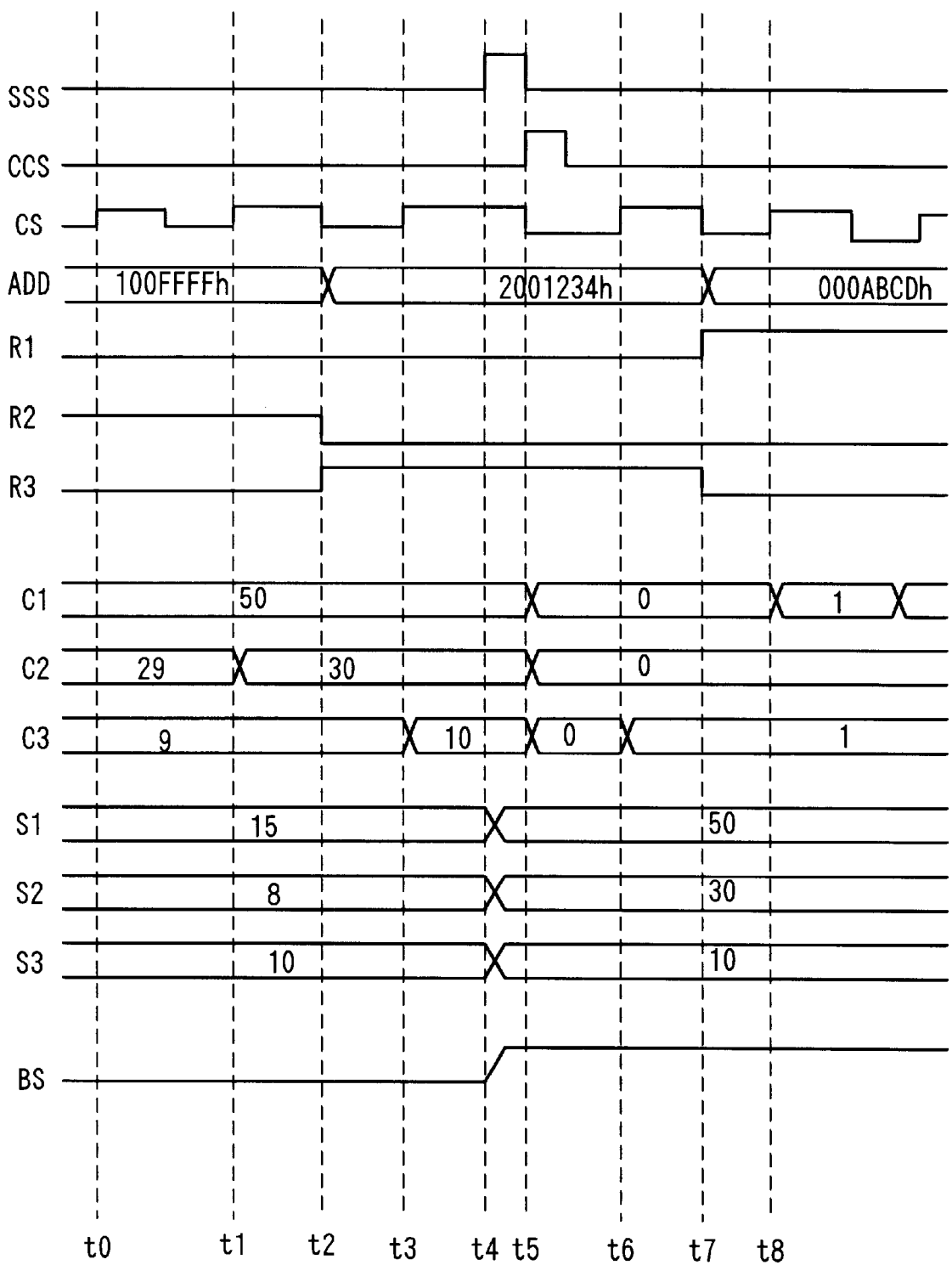
FIG. 47 is a timing chart showing states of respective signals.

Next, operation of the DMA controller 600 will be described by referring to FIG. 47. FIG. 47 is a timing chart showing states of various signals. In this embodiment, both an occupancy-rate setting signal SSS and counter-clear signal CCS are generated every 100 μsec and immediately after an occupancy-rate setting signal SSS is generated (125 nsec later), a counter-clear signal CCS is generated. A period of clock signal CS is set to 1 μsec.

Before time $t_0$, count values C1, C2, and C3 are "50", "28", and "9", respectively. A to bus-occupancy rate S1 to S3 for each of the DMA control sections 1 to 3, values "15", "8", and "10" have been input in the adder 25. Accordingly, the adder 25 summed up those three values and output "33" as a result. Although the value "33" has been input in the comparator 626, a big-occupancy-rate signal BS at time $t_0$ is in inactive (Lo) because the value "33" does not exceeds the threshold "50".

At time $t_0$, a clock signal CS starts up and an address signal ADD indicates "100FFFFh". Therefore, the address decoder 51 makes the regional signal R2 active (Hi), and makes R1 and R3 inactive (Lo). As a result, the counter 22 counts R2 and its count value C2 becomes "29". On the other hand, count values "50" for C1 and "9" for C3 remain unchanged at time $t_0$.

Provided that regional signals R1 and R3 had been in inactive for longer than 1 msec before time $t_0$. Then, at time $t_0$, an access signal ac1 is in inactive, ac2 is in active, and ac3 is in inactive. As a result, the memory controller 9 sets to power-down mode for operational mode of all the memory blocks 71 to 74.

Further, a clock signal CS starts up again at time $t_1$, 1 μsec after $t_0$. Since an address signal ADD at this point is "100FFFFh", the address decoder 51 makes the regional signal R2 active (Hi), and makes R1 and R3 inactive (Lo). Therefore, the counter 22 counts the signal and its count value C2 becomes "30". On the other hand, count values "50" for C1 and "9" for C3 remain unchanged at time $t_1$ because the counters 21 and 23 do not count their signals. Similar to at time $t_0$, operational mode of all the memory blocks 71 to 74 are left in power-down mode.

Provided that the address signal ADD changes to "2001234h" at time $t_2$, 500 nsec after $t_1$. Then, the address decoder 51 makes the regional signal R3 active (Hi), and makes R1 and R2 inactive (Lo). Accordingly, an access signal ac3 becomes in active (Hi) whereas operation modes of the memory blocks 71 to 74 remain in power-down mode similar to time $t_0$ which follows the operation-mode selecting table Tm shown in FIG. 40.

The counter 23 counts the R3 and its count value C3 becomes "10" because a clock signal CS starts up again at time $t_3$, 1 μsec after $t_1$. On the other hand, count values "50" for C1 and "30" for C2 remain unchanged at $t_3$ because the counters 21 and 22 do not count their signals.

An occupancy-rate setting signal SSS is sent to each of the DFFs 31 to 33 at time $t_4$, 375 nsec after $t_3$. Then, the DFFs 31 to 33 output count values C1 to C3 at time $t_4$ as bus-occupancy rate S1 to S3, respectively. That is, the DFF 31 outputs "50" as its bus-occupancy rate S1, the DFF 32 outputs "30", as S2, and the DFF 33 outputs "10" as S3. Since an occupancy-rate setting signal SSS and a counter-clear signal CCS are sent to the DFFs 31 to 33 and their respective counters 21 to 23 every 100 μsec period, count values C1 to C3 thus can be output as respective bus-occupancy rate S1 to S3.

Next, the above bus-occupancy rate S1 to S3 are input in the adder 25. Then, the adder 25 outputs "90" as a calculation result and inputs the resultant value in the comparator 626. Since the comparator 626 determines that the value "90" exceeds the threshold "50", a big-occupancy-rate signal BS is made active (Hi). As a result, the memory controller section 9 sets all the memory blocks 71 to 74 normal, which follows the operation-mode selecting table Tm shown in FIG. 40.

Furthermore, a counter-clear signal CSS is sent to each of the counters 21 to 23 at time $t_5$, 125 nsec after $t_4$ (500 nsec after $t_3$). This counter-clear signal CSS makes all of the count values C1 to C3 "0".

A clock signal CS starts up again at time $t_6$, 500 nsec after $t_5$. Since the address signal ADD "2001234h" remains and the regional signal R3 is in active (Hi), the counter 23 counts the signal and its count value is renew to "1". On the other hand, since the regional signals R1 and R2 are in inactive (Lo) at this point, the counters 21 and 22 do not count their respective signals, whereby their count values C1 and C2 remain "0".

Next, provided that the address signal ADD changes to "000ABCDh" at time $t_7$, 500 nsec after $t_6$. Then, the address decoder 51 makes the regional signal R1 active (Hi), and makes R2 and R3 inactive (Lo). After that, a clock signal CS starts up again at time $t_8$, 1 μsec after $t_6$. The counter 21 counts this time and its count value C1 becomes "1". On the other hand, count values "0" for C2 and "1" for C3 remain unchanged at $t_8$ because the counters 22 and 23 do not count their signals.

Since the address decoder 51 makes any one of the regional signals R1 to R3 active (Hi) as similar as before, a counter corresponding to a regional signal counts the signal when a clock signal CS starts up. When an occupancy-rate setting signal is sent to each of the DFFs 31 to 33, occupancy rate S1 to S3 for each of the DMA control sections 1 to 3 are calculated. After that, the memory controller section 9 controls operational mode for each of the memory blocks 71 to 74 in accordance with a calculation result and states of access signals ac1 to ac3. Thereby, the memory blocks 71 to 74 operate in appropriate operational mode that lowers power consumption without affecting processing thereat. Accordingly, power consumption can be lowered effectively.

As described in detail, in the DMA controller 600 directed to the Eleventh Embodiment, the bus monitor section 608 calculates bus-occupancy rate S with respect to the bus 5 and detects operation state of each of the DMA control sections 1, 2 and 3a. The memory controller section 9 controls operational mode for each of the memory blocks 71 to 74 in accordance with bus-occupancy rate S calculated by the bus monitor section 608 and operation state of each of the DMA control sections 1, 2 and 3a. Thereby, the memory blocks 71 to 74 operate in appropriate operational mode that lowers power consumption without affecting processing thereat. Accordingly, power consumption can be lowered effectively. Additionally, the occupancy-rate detecting section 652 and the access detecting section 653 both integrated into hardware calculates bus-occupancy rate S and detects operation state of each of the DMA control sections 1, 2, and 3a. Therefore, operational mode control for each of the memory blocks 71 to 74 does not get complicated.

The present embodiment is only an example and does not limit the present invention in any respect. Accordingly, the present invention can be variously improved and changed within the scope not departing the subject matter thereof.

The First to Eleventh Embodiments describe DMA controllers for copier, however, the present invention is applicable to any devices that need DMA control. Needless to say, specific numerical values shown in the embodiments are only examples.

What is claimed is:

1. A DMA controller including:
   a memory;
   a common bus connected to the memory;

a plurality of devices connected to the common bus and accessible to the memory through the common bus;

bus monitor means for detecting use-state of the common bus with respect to each of the devices every predetermined period; and bus-use reconcilement means for reconciling pluralities of bus-access made by the devices based on a detection result obtained by the bus monitor means.

2. A DMA controller according to claim 1 further including permission-signal-generation-time integrating means for integrating generation time of bus-use permission signals generated by the bus-use reconcilement means, wherein the bus monitor means detects use-state of the common bus based on an integration result obtained by the permission-signal-generation-time integrating means.

3. A DMA controller according to claim 1, wherein the bus monitor means detects use-state of the common bus based on presence/absence of in-use-state signal generated by the common bus.

4. A DMA controller according to claim 1 further including request rejecting means for rejecting a bus-use request from at least one of the devices in accordance with a detection result obtained by the bus monitor means.

5. A DMA controller according to claim 4, wherein the request rejecting means is provided with a device which ranks higher priority than a device which is intended to rank up for bus-use reconcilement and does not need real time processing.

6. A DMA controller according to claim 1 further including priority determining means for determining bus-use priority ranking for each of the devices in accordance with a detection result obtained by the bus monitor means, wherein the bus-use reconcilement means reconciles bus-access priority for each of the devices in accordance with the priority ranking determined by the priority determining means.

7. A DMA controller according to claim 6 further including a plurality of different priority tables, wherein the priority determining means selects one of the priority tables in accordance with a detection result obtained by the bus monitor means.

8. A DMA controller according to claim 6 further including a standard priority table, wherein the priority determining means makes necessary changes on the standard priority table in accordance with a detection result obtained by the bus monitor means and uses the changed priority table.

9. A DMA controller according to claim 1, wherein one of the devices corresponds to a processor, the bus monitor means calculates bus-use rate every predetermined period with respect to each of the devices other than the processor, and the bus-use reconcilement means allows the processor to get access prior to other devices for a predetermined period when bus-use rate calculated by the bus monitor means exceeds a predetermined value.

10. A DMA controller according to claim 9 further including request rejecting means which rejects bus-use requests from devices except requests from the processor when bus-use rate calculated by the bus monitor means exceeds a predetermined value.

11. A DMA controller including:

a memory;

a common bus connected to the memory;

a plurality of devices connected to the common bus and accessible to the memory through the common bus;

device monitor means for detecting operation-state of each of the devices; and bus-use reconcilement means for reconciling pluralities of bus-access made by the devices based on a detection result obtained by the device monitor means.

12. A DMA controller according to claim 11 further including a plurality of different priority tables on which priority ranking among the devices are recorded, and priority-table selecting means for selecting one of the priority tables in accordance with a detection result obtained by the device monitor means, wherein the bus-use reconcilement means reconciles pluralities of bus-access made by each of the devices in accordance with a priority table selected by the priority-table selecting means.

13. A DMA controller according to claim 11 further including a pluralities of different bus-access interval tables on which minimum bus-access interval time with respect to each of the devices are recorded, bus-access-interval-table selecting means for selecting one of the bus-access interval tables, and bus-access permission/rejection determining means for determining whether bus-access is permitted or rejected for each of the devices in accordance with a bus-access interval table selected by the bus-access-interval-table selecting means, wherein the bus-use reconcilement means reconciles pluralities of bus-access made by each of the devices in accordance with a determination made by the bus-access permission/rejection determining means.

14. A DMA controller according to claim 11, wherein one of the devices corresponds to a processor, and the device monitor means detects operation-state with respect to devices except for the processor.

15. A DMA controller according to claim 13, wherein one of the devices corresponds to a processor, the device monitor means detects operation-state with respect to the devices except for the processor, minimum bus-access interval time with respect to each of the devices except for the processor are recorded on the bus-access interval tables, and the bus-access permission/rejection determining means determines whether bus-access is permitted or rejected for each of the devices except for the processor.

16. A DMA controller including:

a memory;

a common bus connected to the memory;

a plurality of devices connected to the common bus and accessible to the memory through the common bus;

bus monitor means for detecting use-state of the common bus with respect to each of the devices every predetermined period; and DMA-transfer-method changing means for changing DMA transfer methods between the memory and at least one of the device in accordance with a detection result obtained by the bus monitor means.

17. A DMA controller according to claim 16, wherein devices are classified into two types, namely, devices that need real time processing and devices that do not need real time processing, and the bus monitor means detects operation-state of the devices that need real time processing.

18. A DMA controller according to claim 16, wherein the DMA-transfer-method changing means changes unit of word to be transferred between the memory and at least one of the devices.

19. A DMA controller including:

a memory;

a common bus connected to the memory;

a plurality of devices connected to the common bus and accessible to the memory through the common bus;

bus monitor means for detecting use-state of the common bus with respect to each of the devices every predetermined period; and mode-switch means for switching to low-power-consumption mode in accordance with a detection result obtained by the bus monitor means.

20. A DMA controller according to claim 19, wherein the mode-switch means is clock-decrease means for decreasing frequency of system clock.

21. A DMA controller according to claim 20, wherein one of the devices corresponds to a processor, and the clock-decrease means decreases operational frequency of control signal for the processor.

22. A DMA controller according to claim 20, wherein the memory includes recording means capable of writing and reading data on demand, and the clock-decrease means decreases operational frequency of control signal for the recording means.

23. A DMA controller according to claim 19, wherein the memory includes recording means capable of writing and reading data on demand, and the mode-switch means switches modes of the recording means to a self-refresh mode.

24. A DMA controller including:

a memory having a plurality of memory blocks;

a common bus connected to the memory;

a plurality of devices connected to the common bus and accessible to the memory through the common bus;

bus monitor means for detecting use-state of the common bus with respect to each of the devices every predetermined period; and memory controller means for controlling operation mode of each of the memory blocks in accordance with a detection result obtained by the bus monitor means.

25. A DMA controller according to claim 24, wherein each of the memory blocks is recording means capable of writing and reading on demand, and the memory controller means sets operational mode of the recording means in any one of the three modes, namely, normal mode, power-down mode, and self-refresh mode.

* * * * *